Feb. 24, 1925.

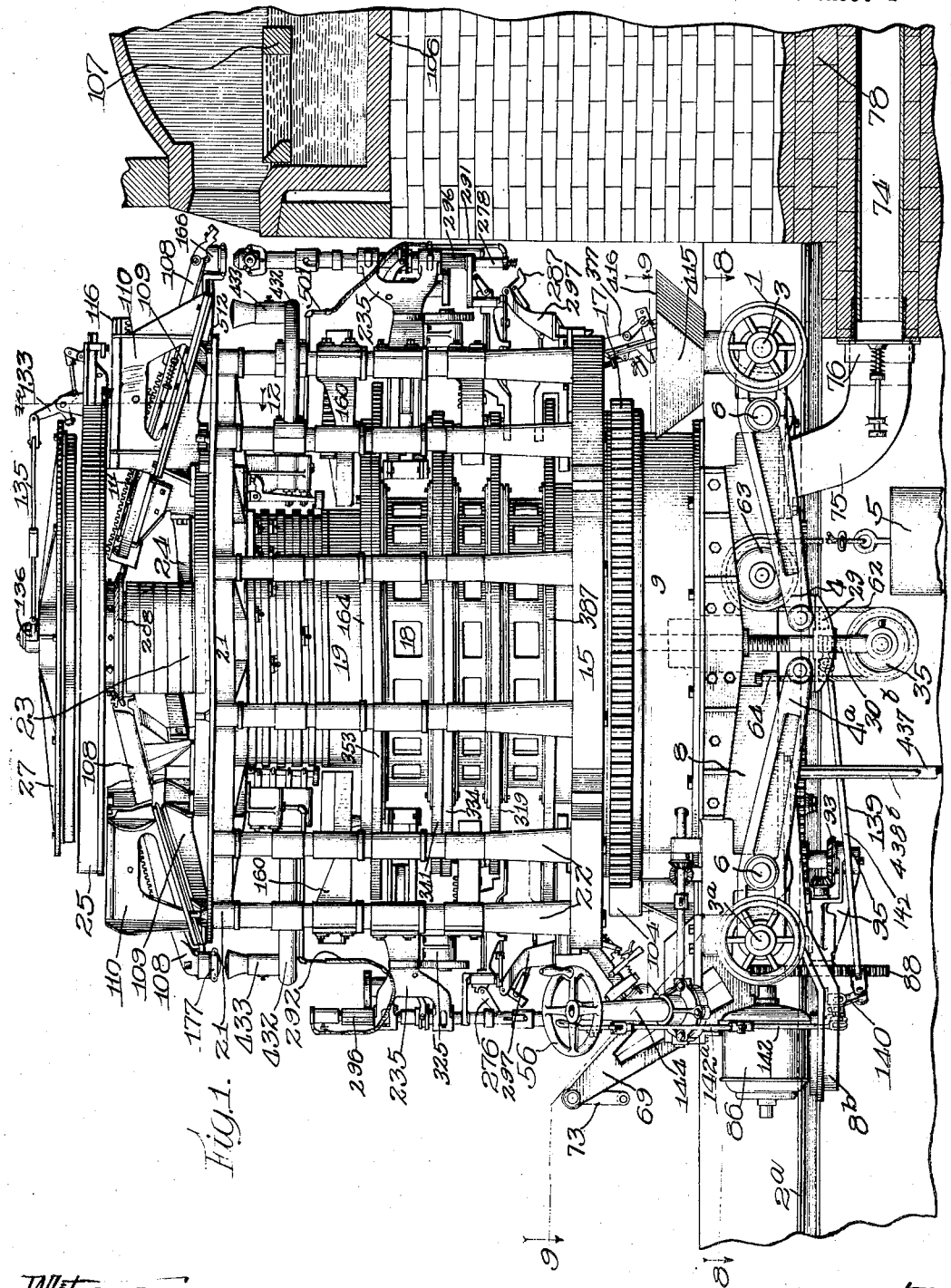

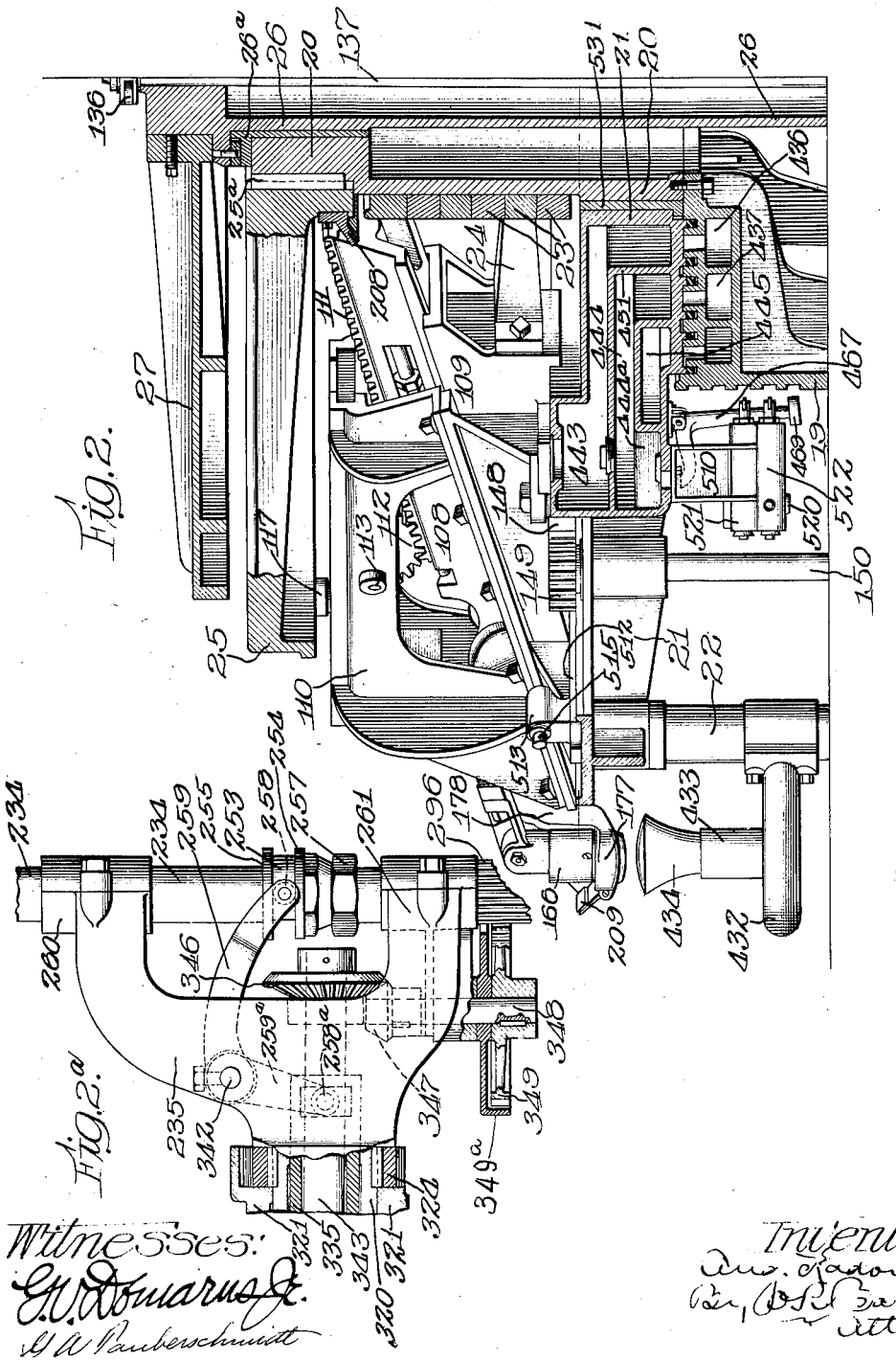

A. KADOW 1,527,556

GLASS WORKING MACHINE

Filed July 6 1910     66 Sheets—Sheet 3

Feb. 24, 1925.

A. KADOW 1,527,556

GLASS WORKING MACHINE

Filed July 6 1910

Witnesses:

Inventor

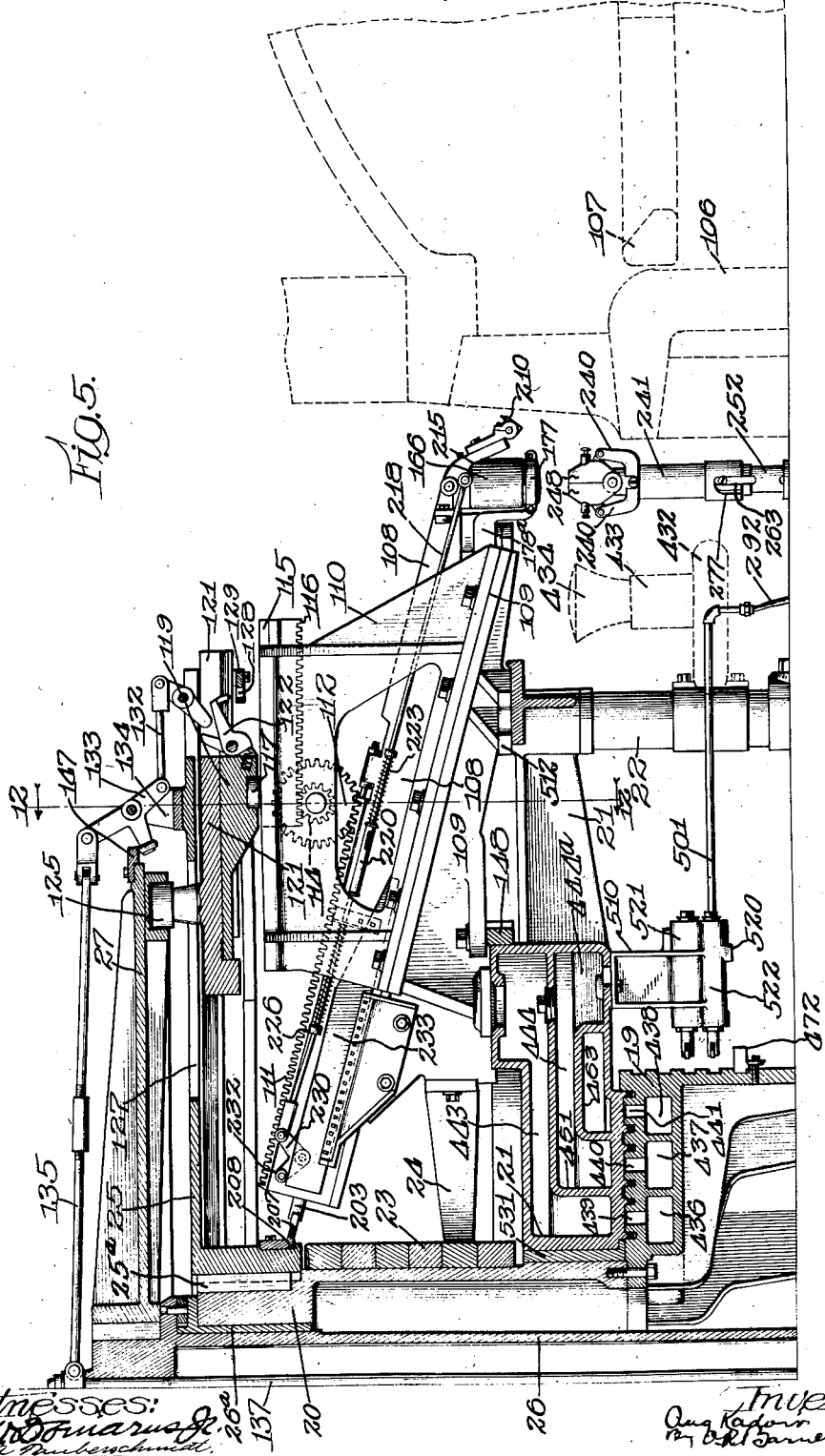

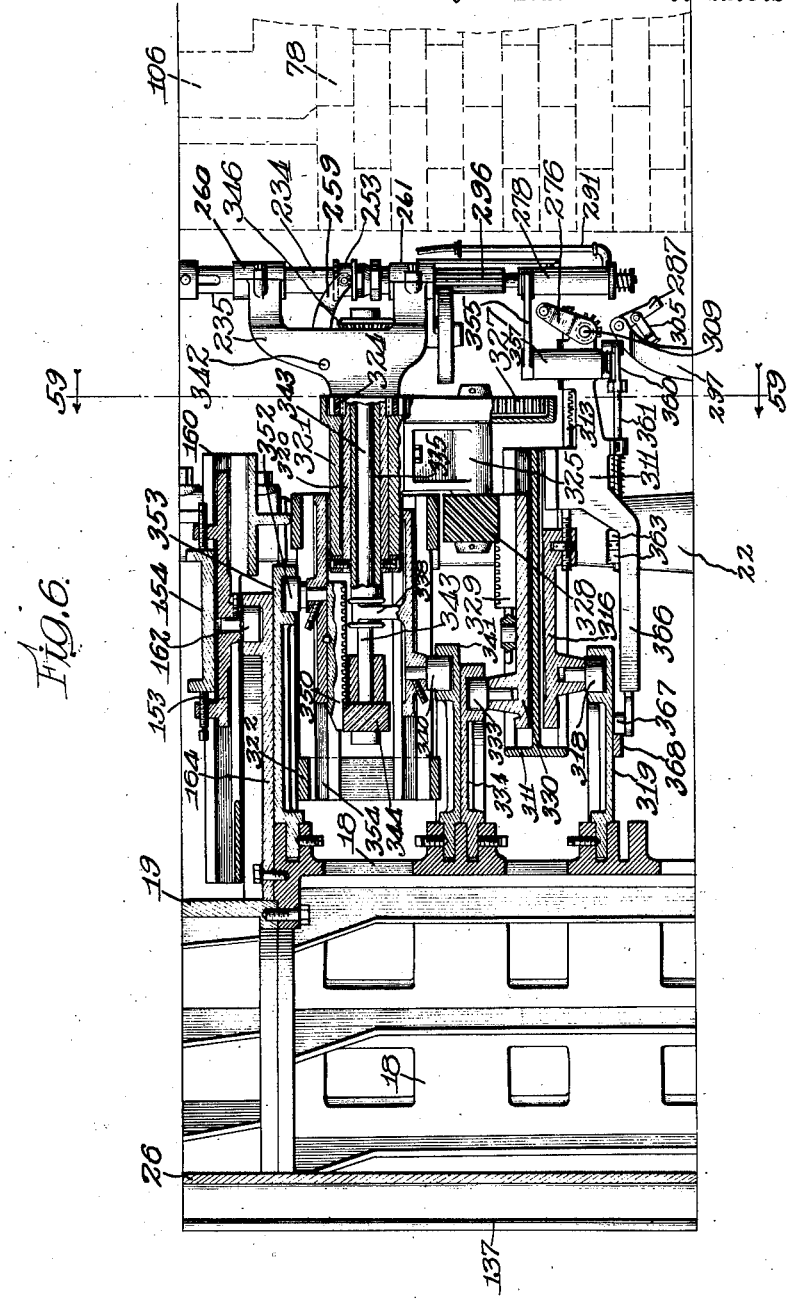

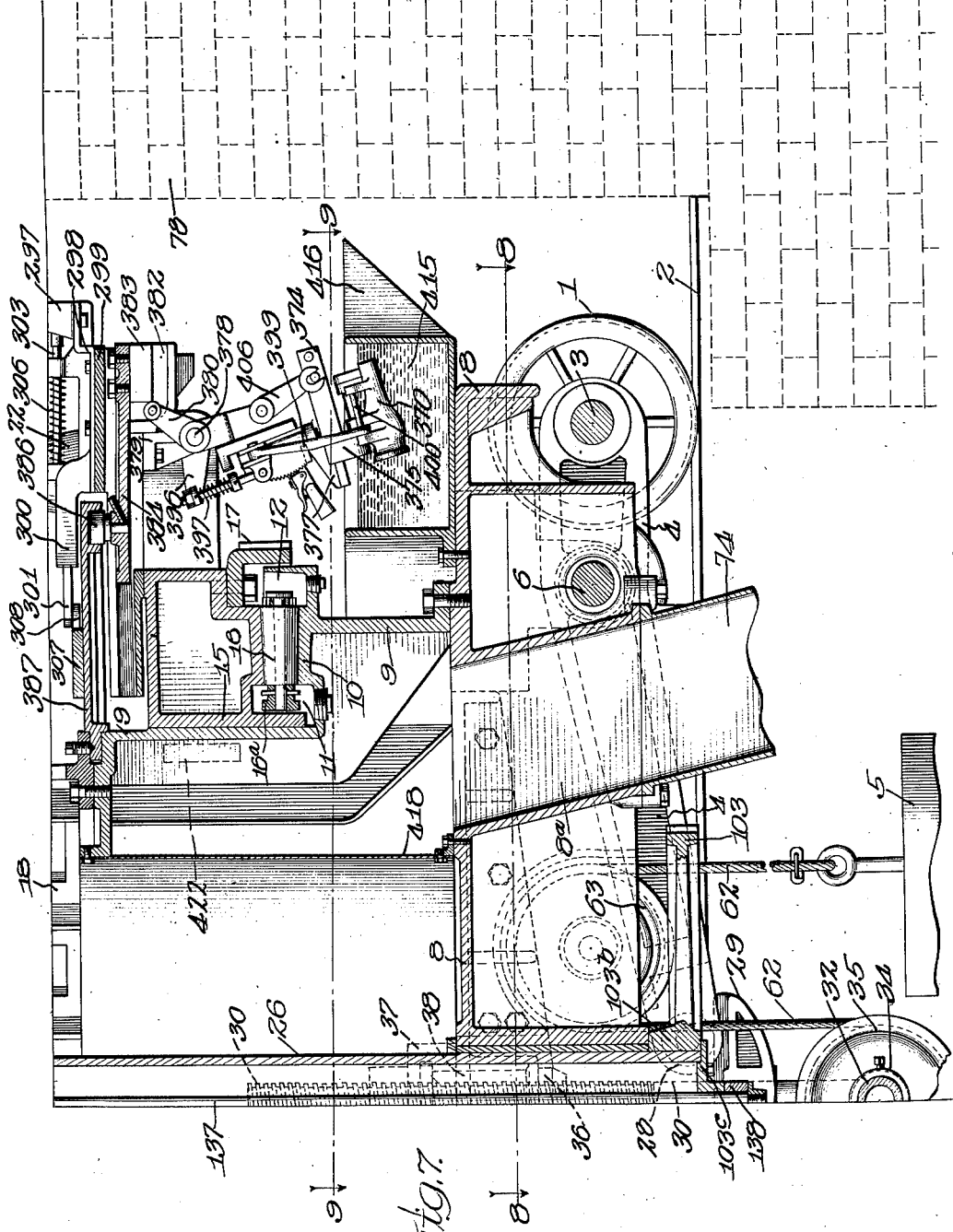

Feb. 24, 1925.                                                                                    1,527,556
                                        A. KADOW
                                  GLASS WORKING MACHINE
                              Filed July 6 1910        66 Sheets-Sheet 8
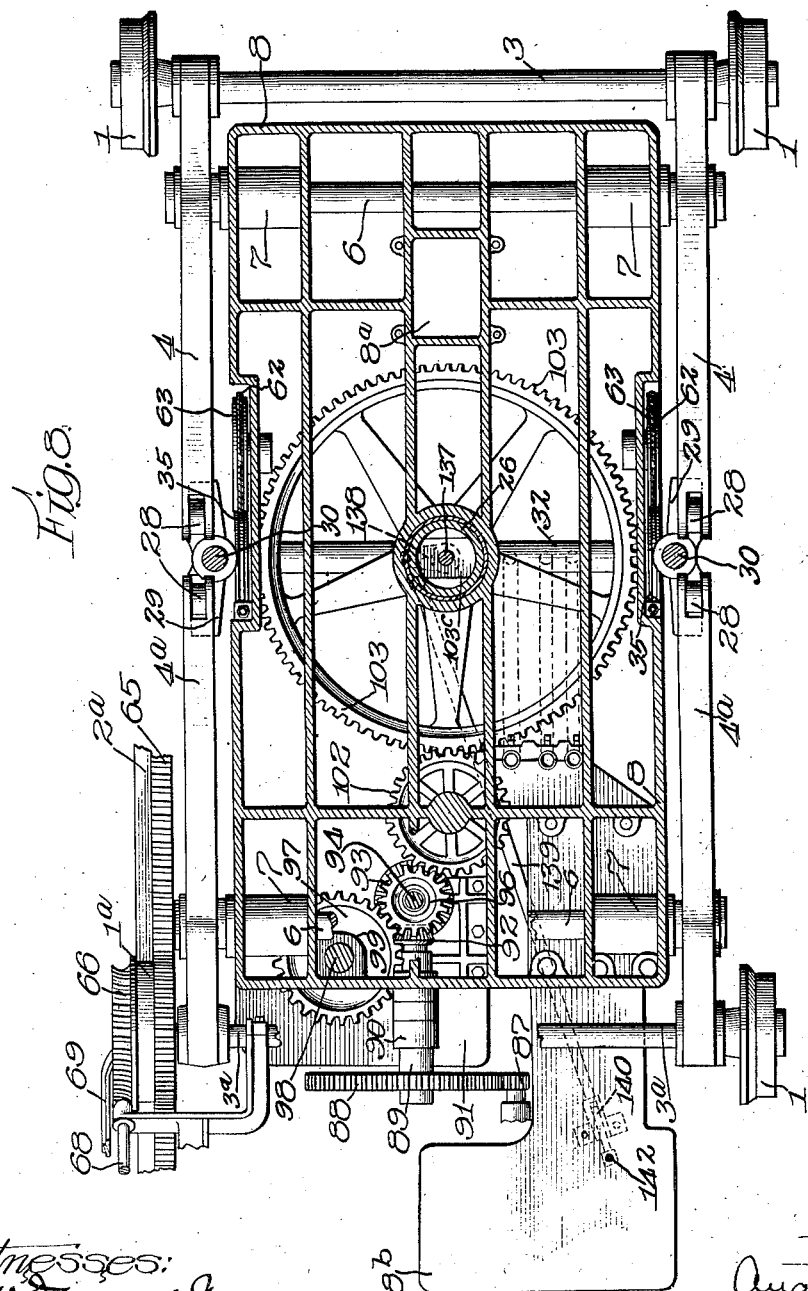

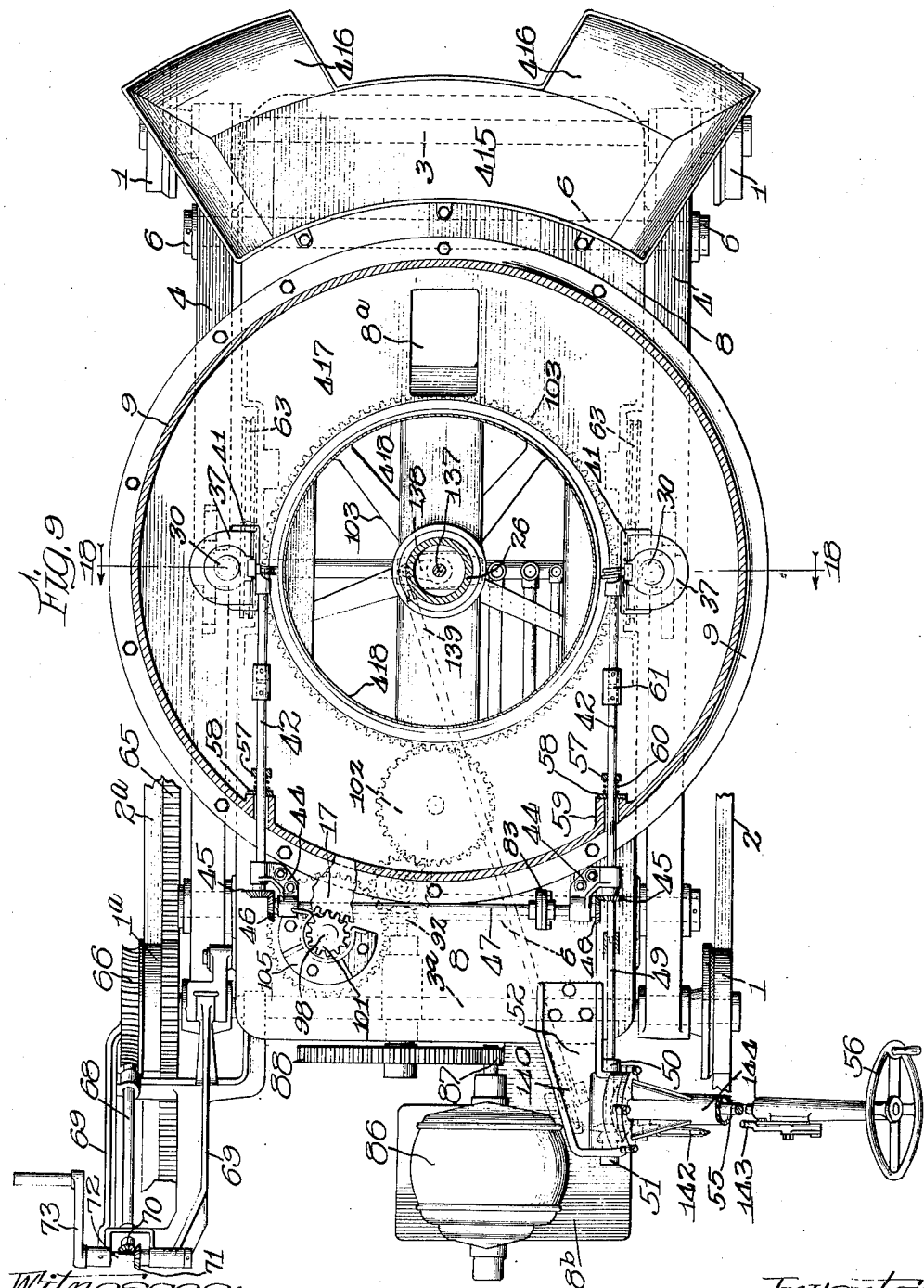

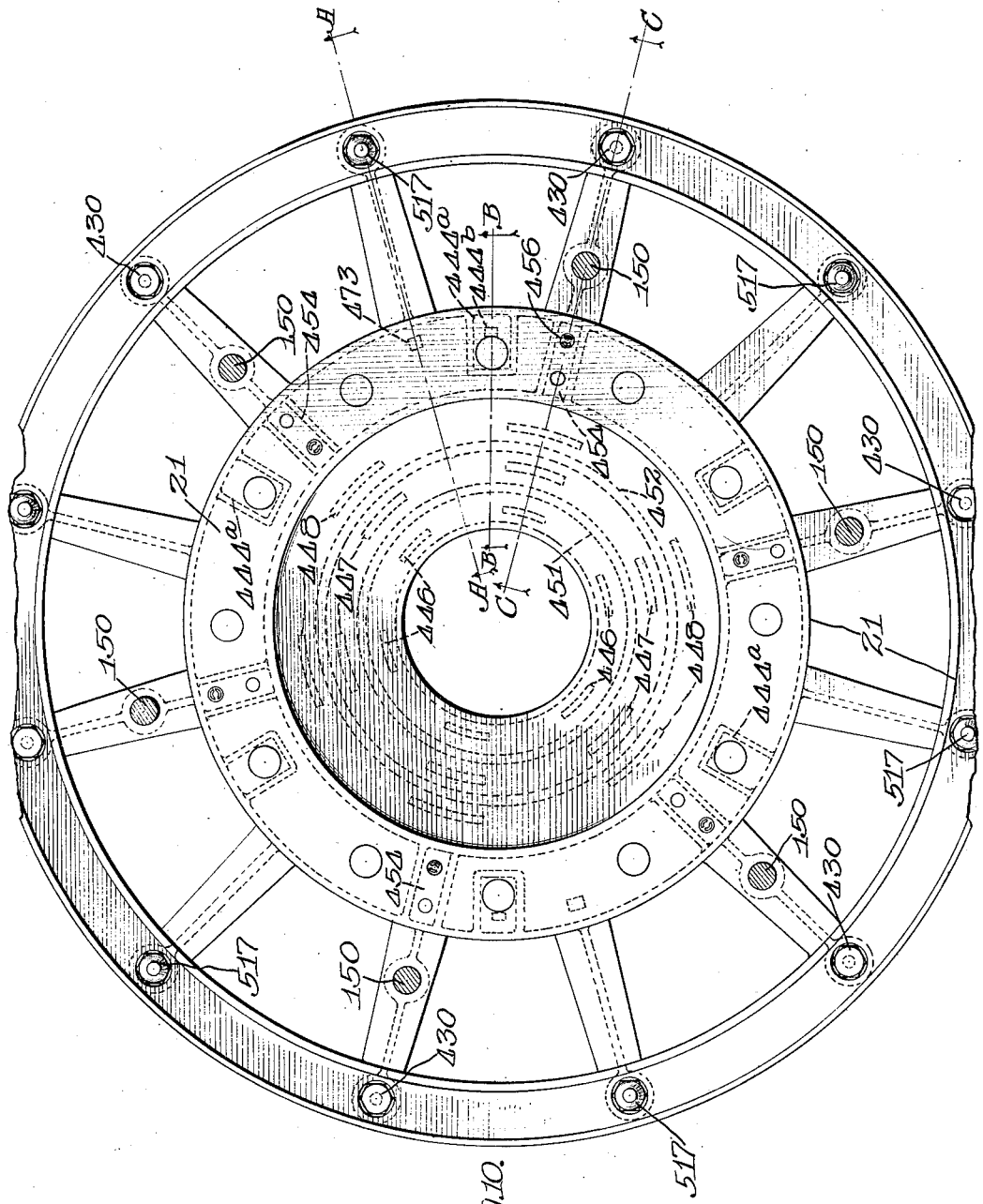

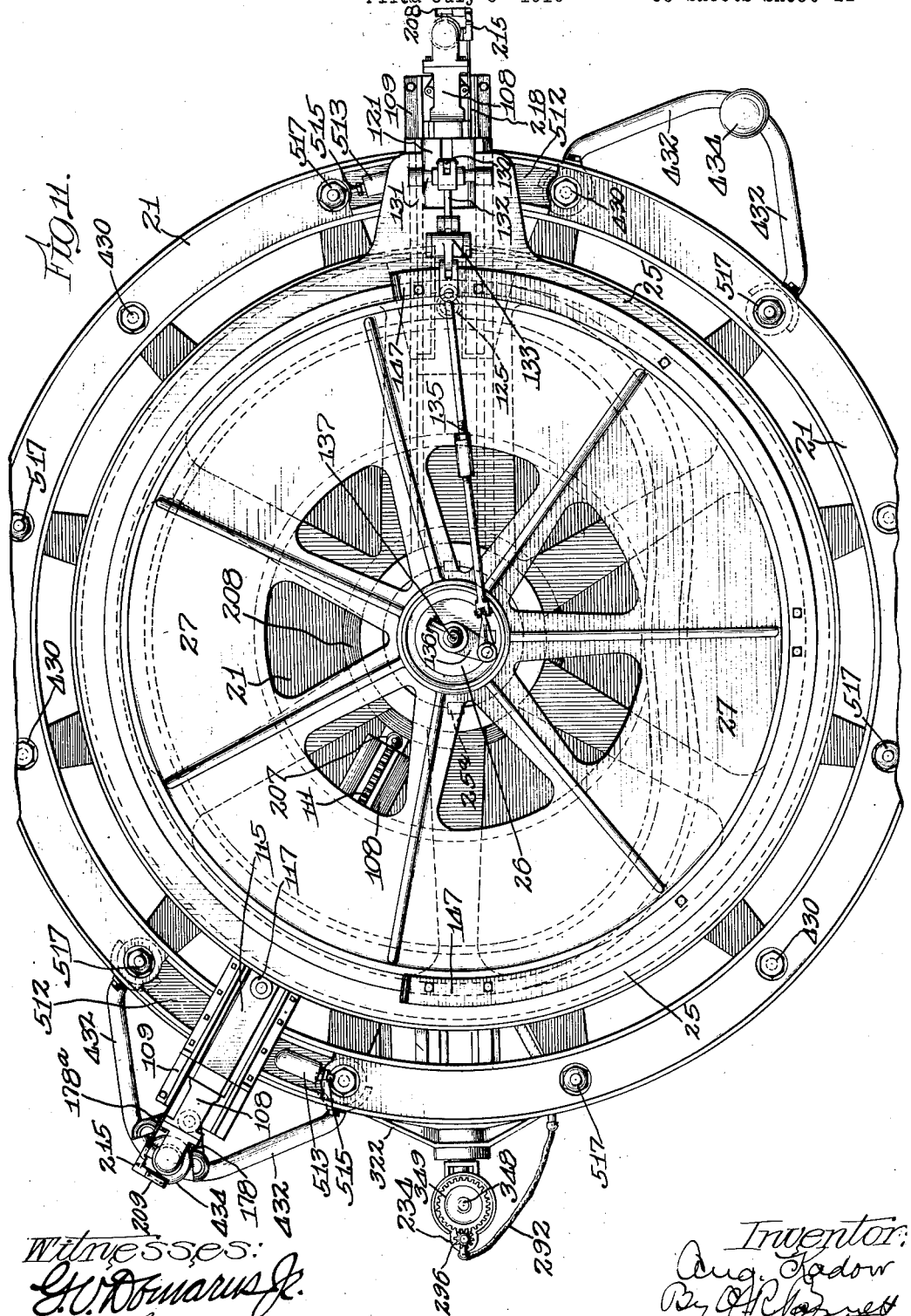

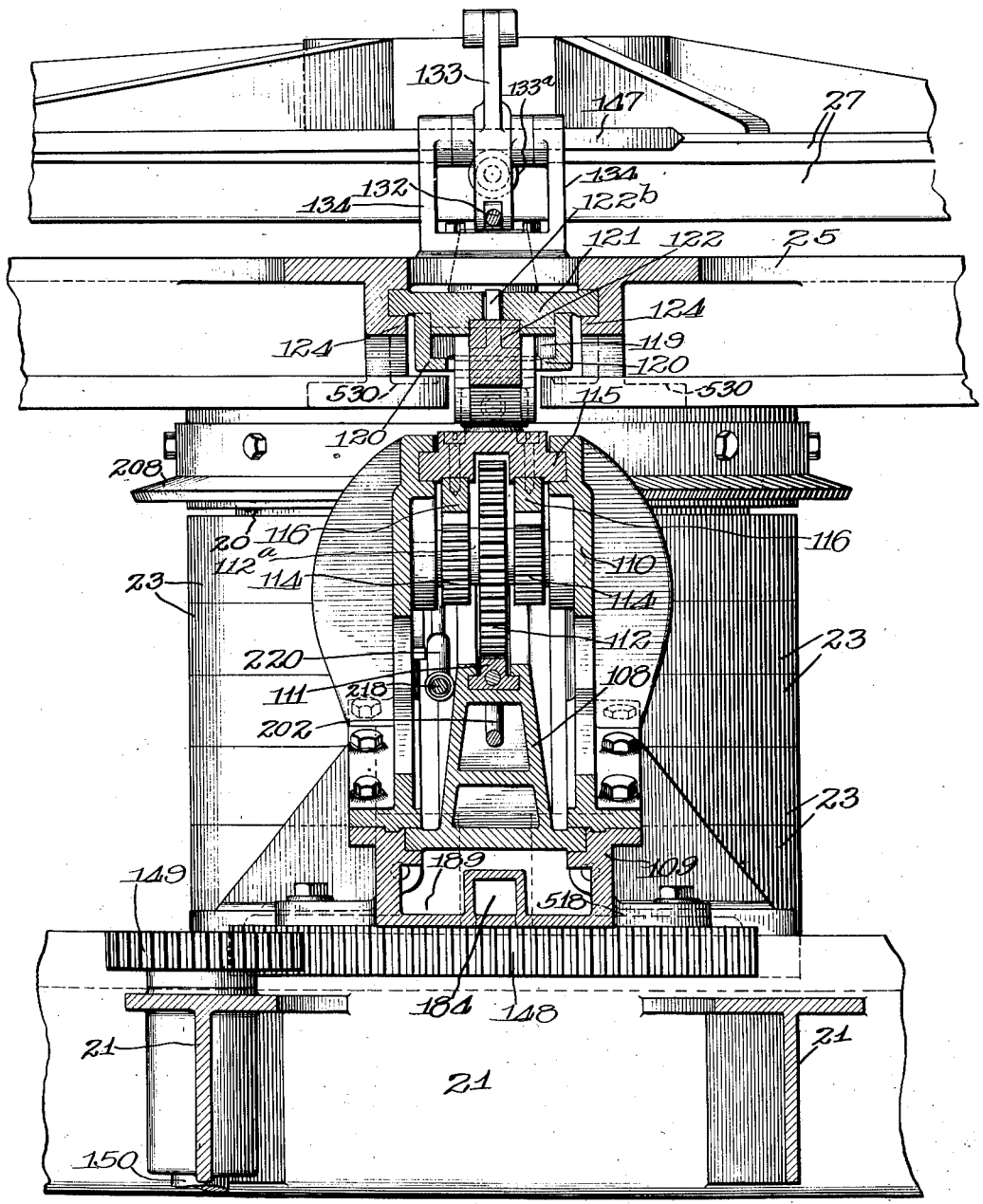

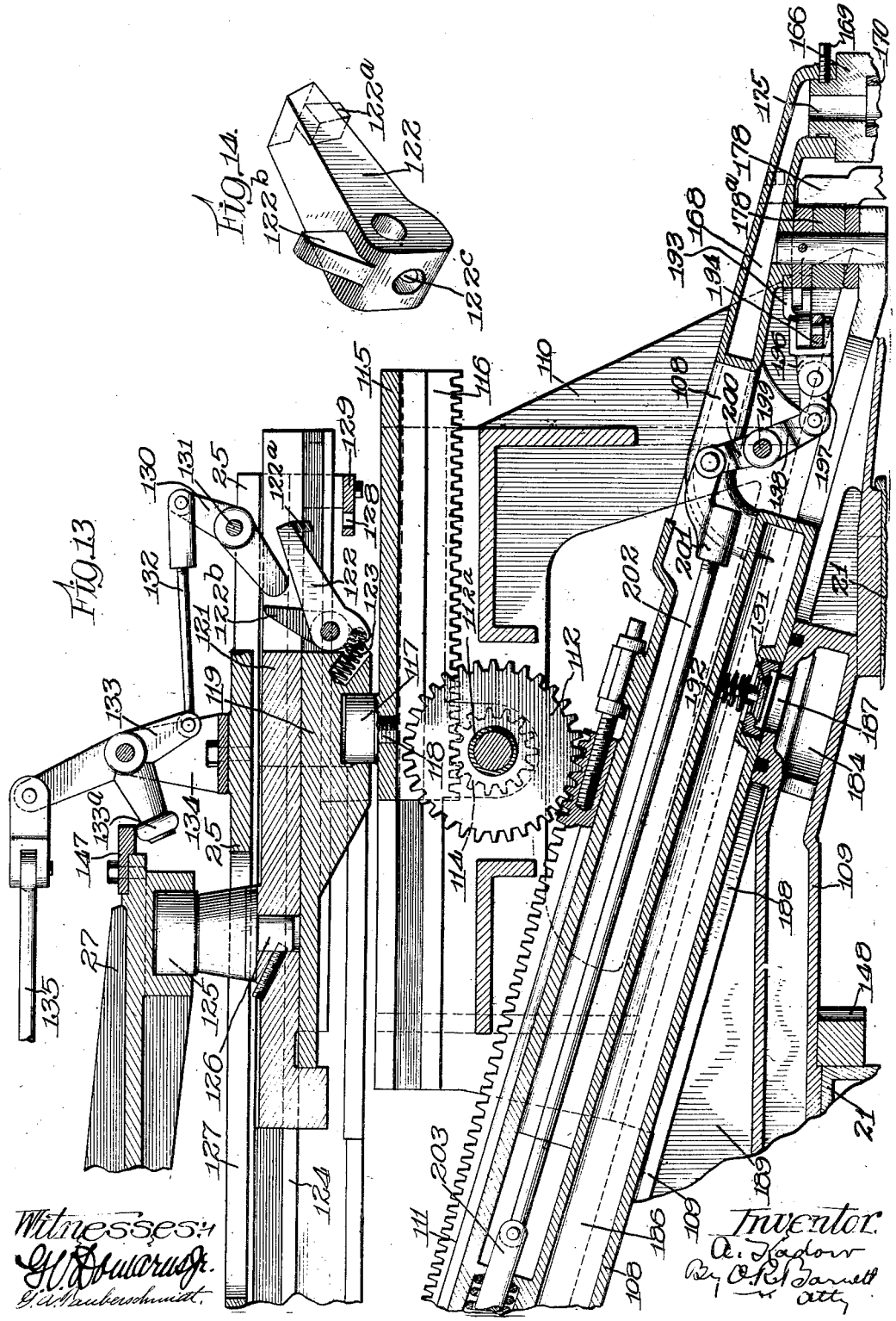

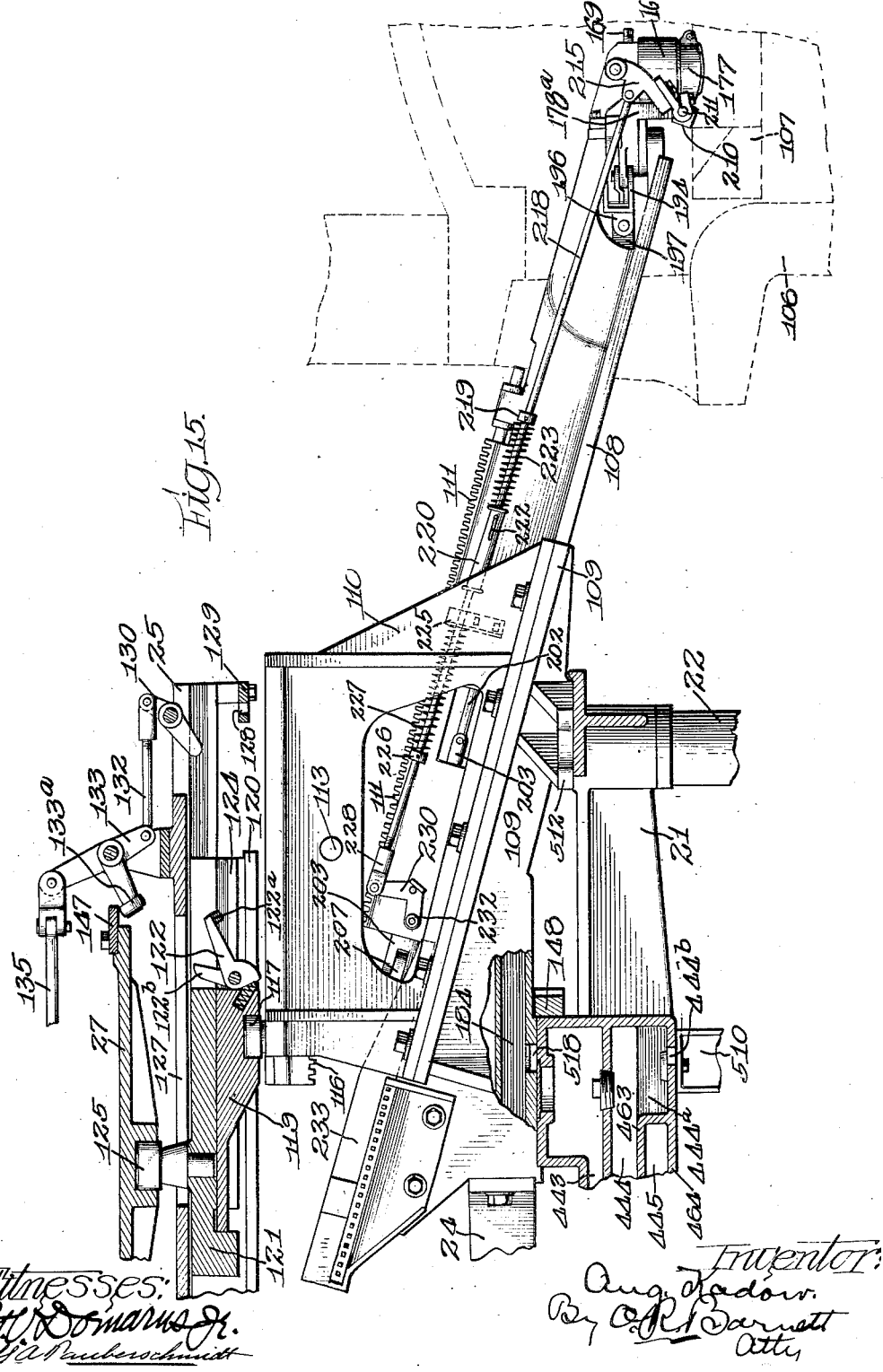

Feb. 24, 1925.
A. KADOW
1,527,556
GLASS WORKING MACHINE
Filed July 6 1910
66 Sheets-Sheet 15
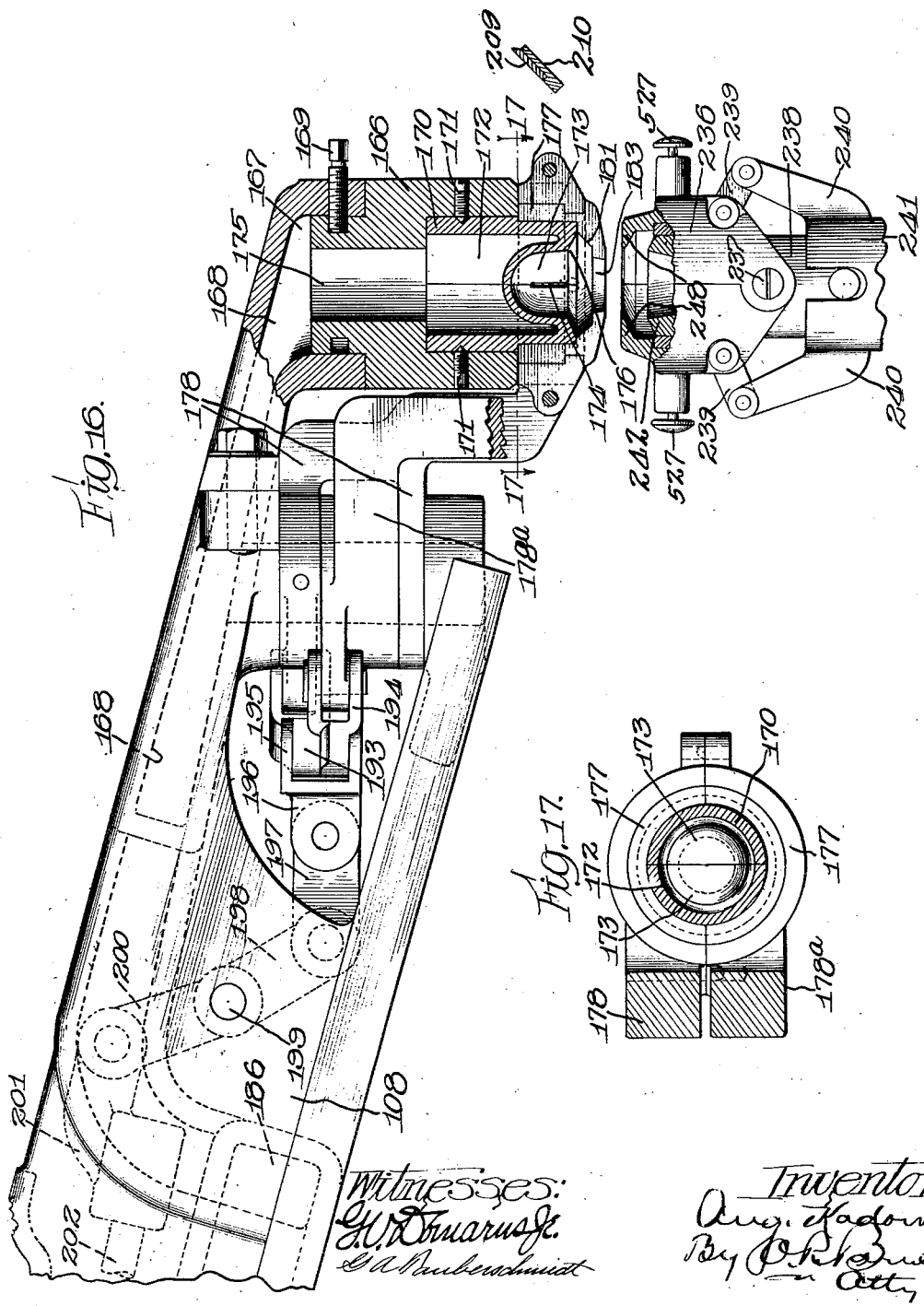

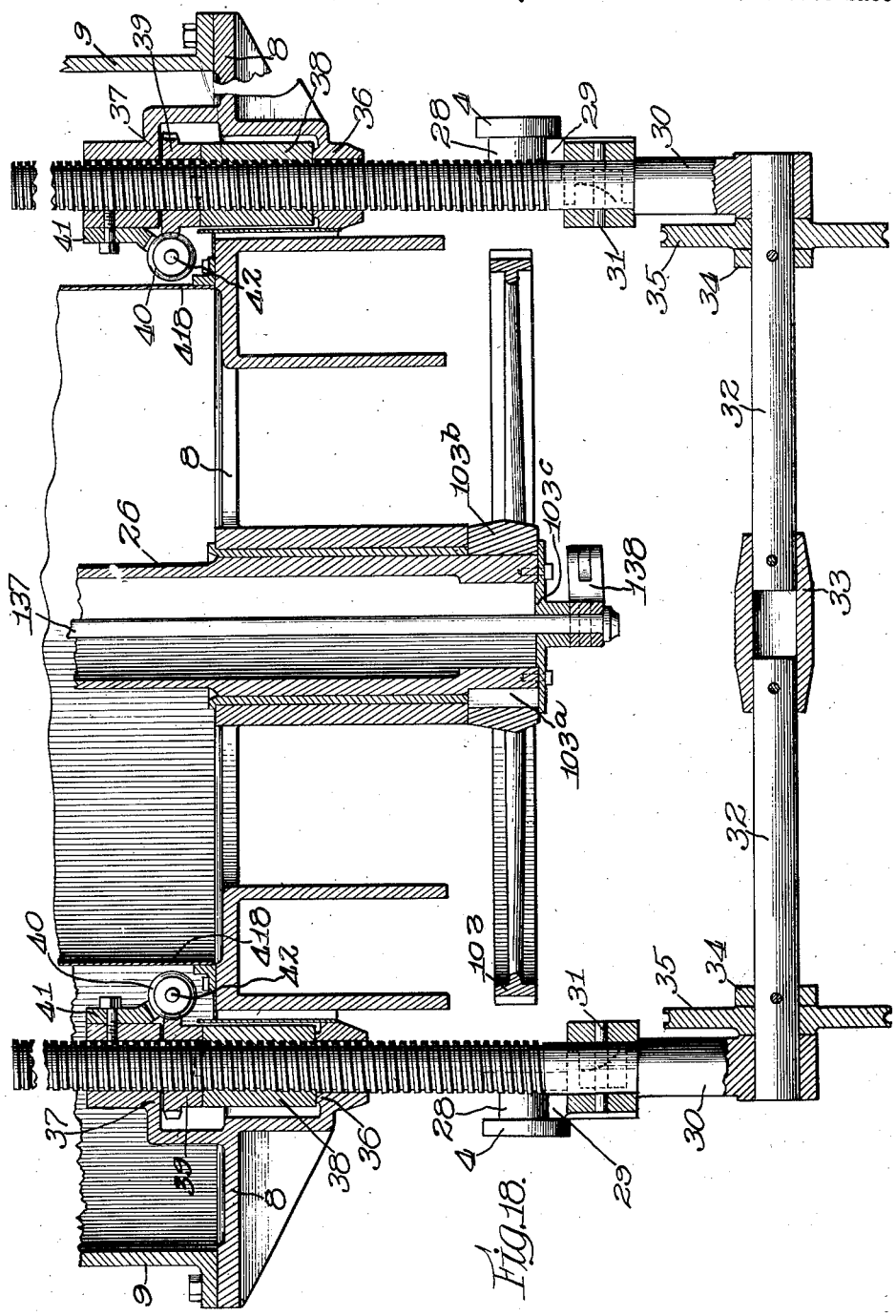

Feb. 24, 1925.
A. KADOW
1,527,556
GLASS WORKING MACHINE
Filed July 6 1910    66 Sheets-Sheet 17
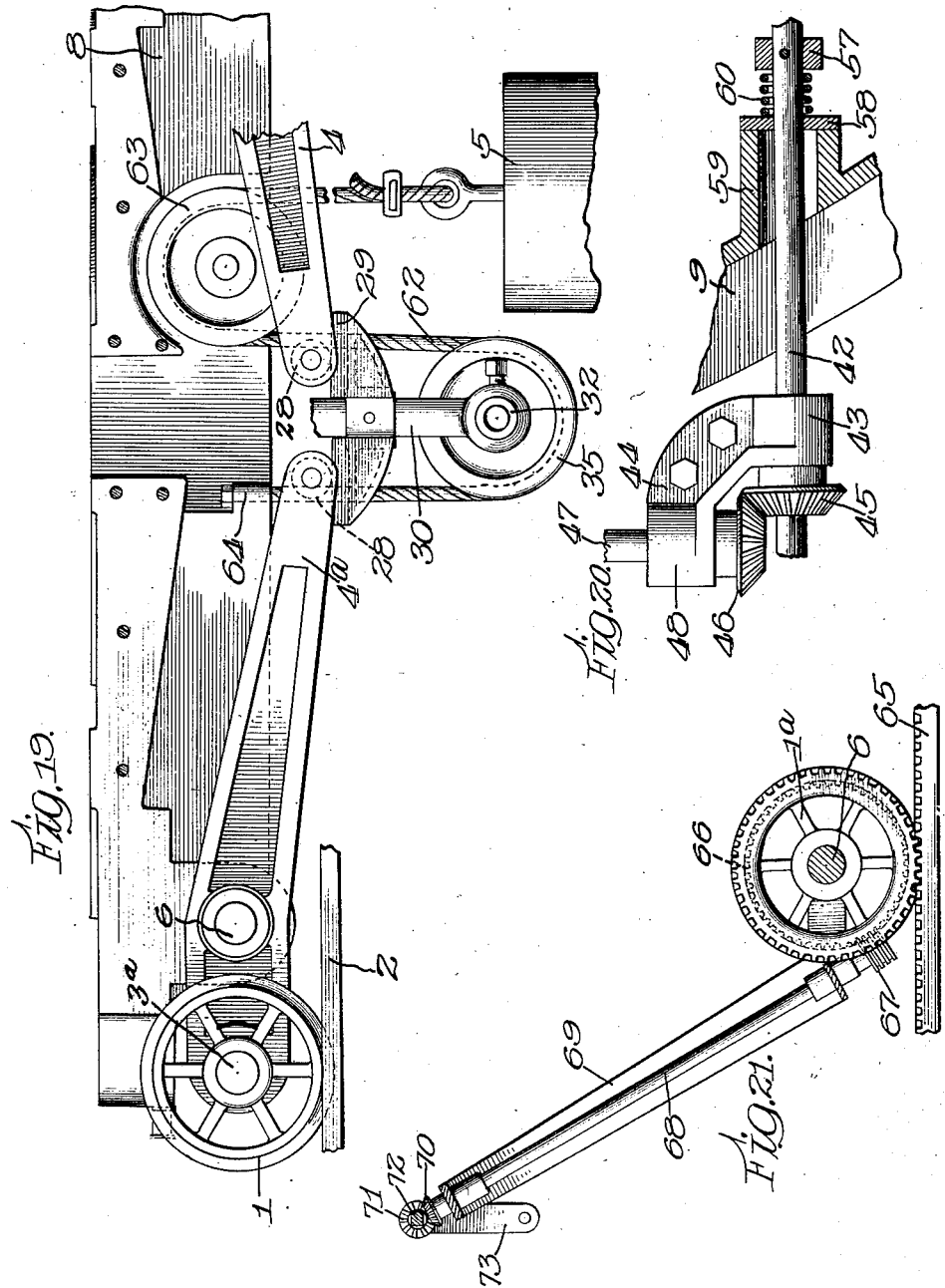

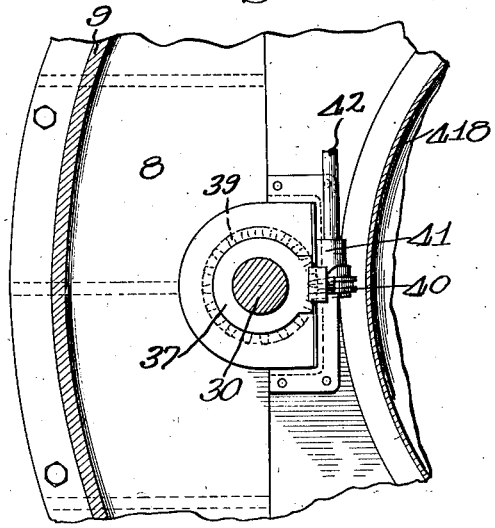
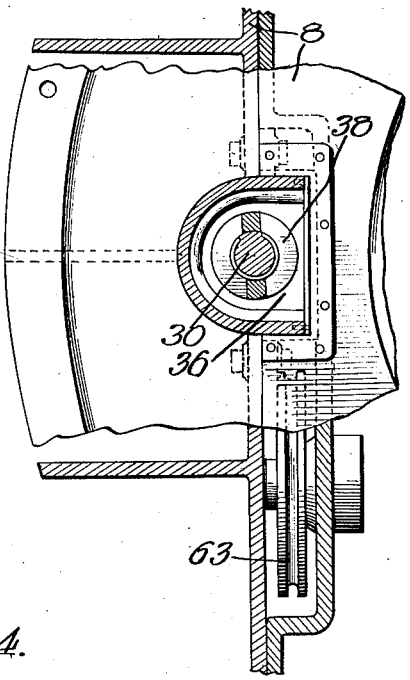
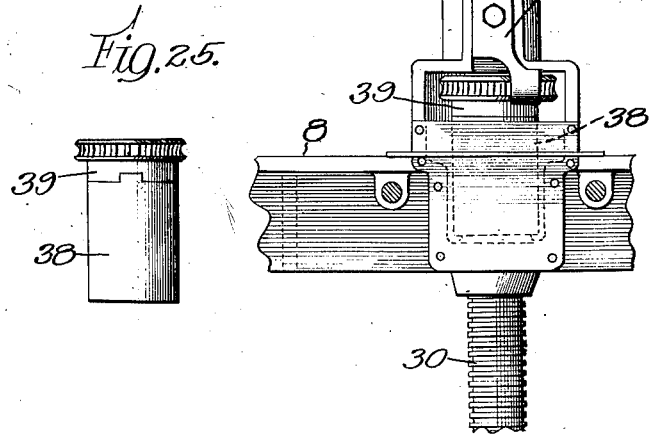
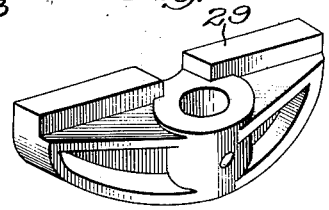

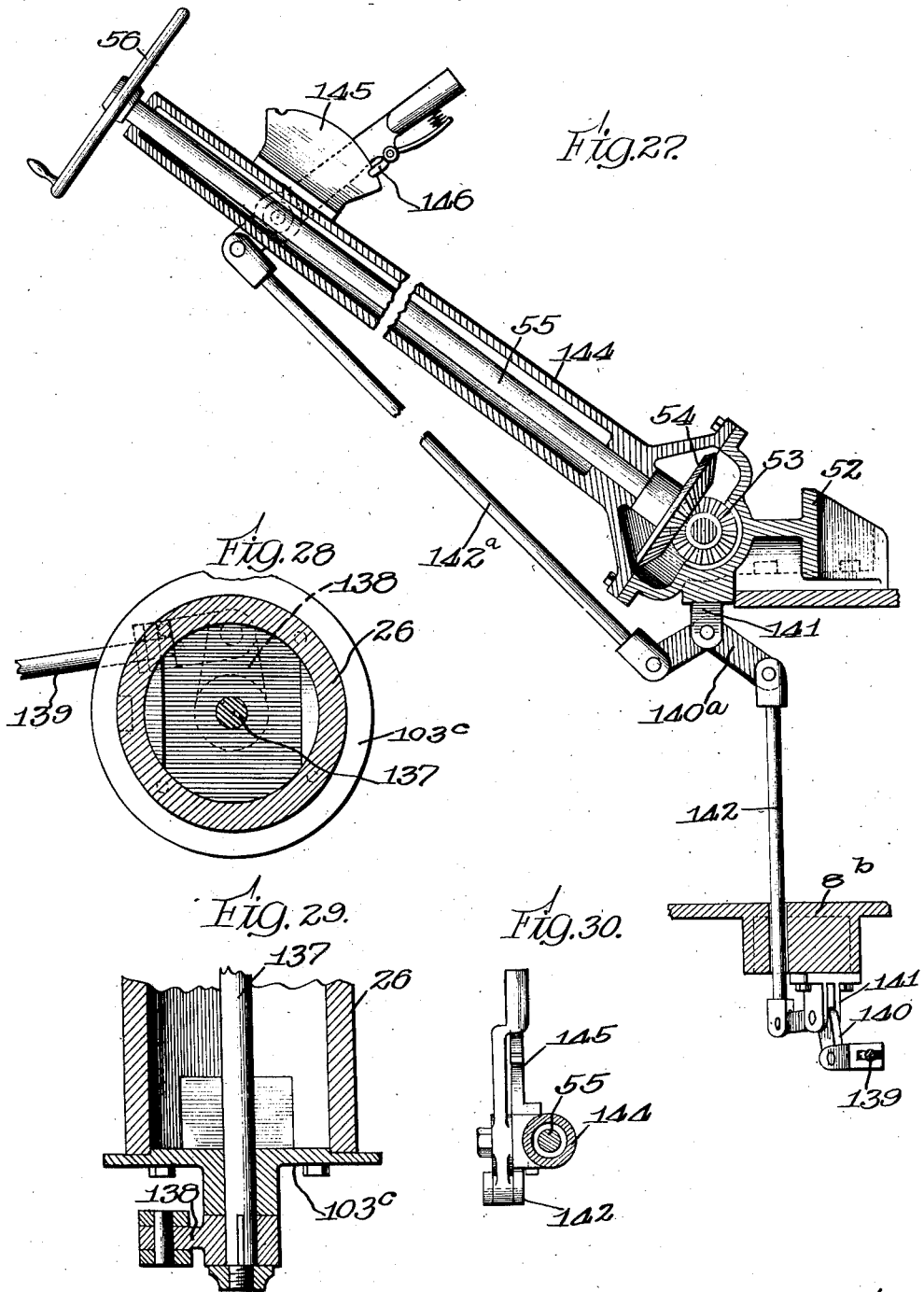

Feb. 24, 1925. 1,527,556
A. KADOW
GLASS WORKING MACHINE
Filed July 6 1910 66 Sheets-Sheet 20
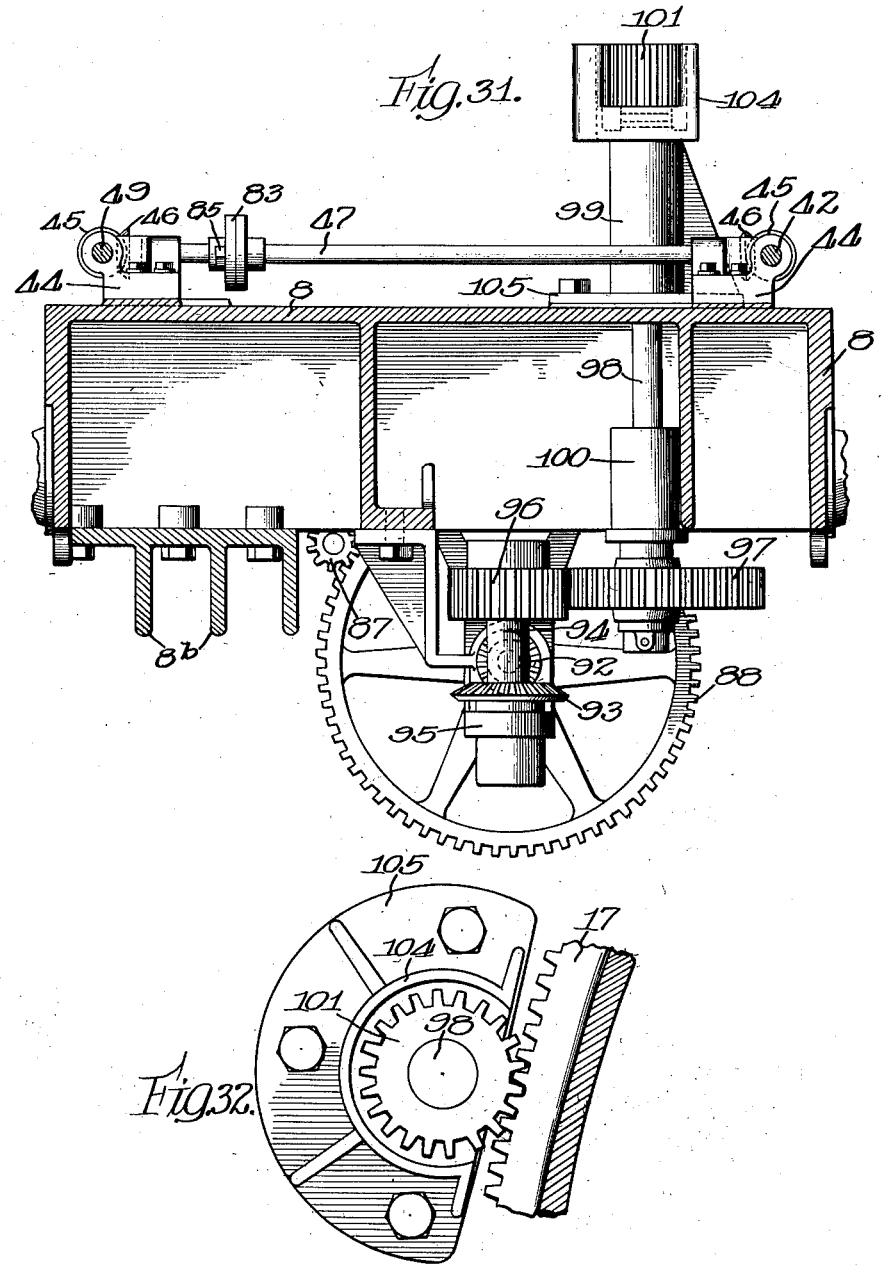

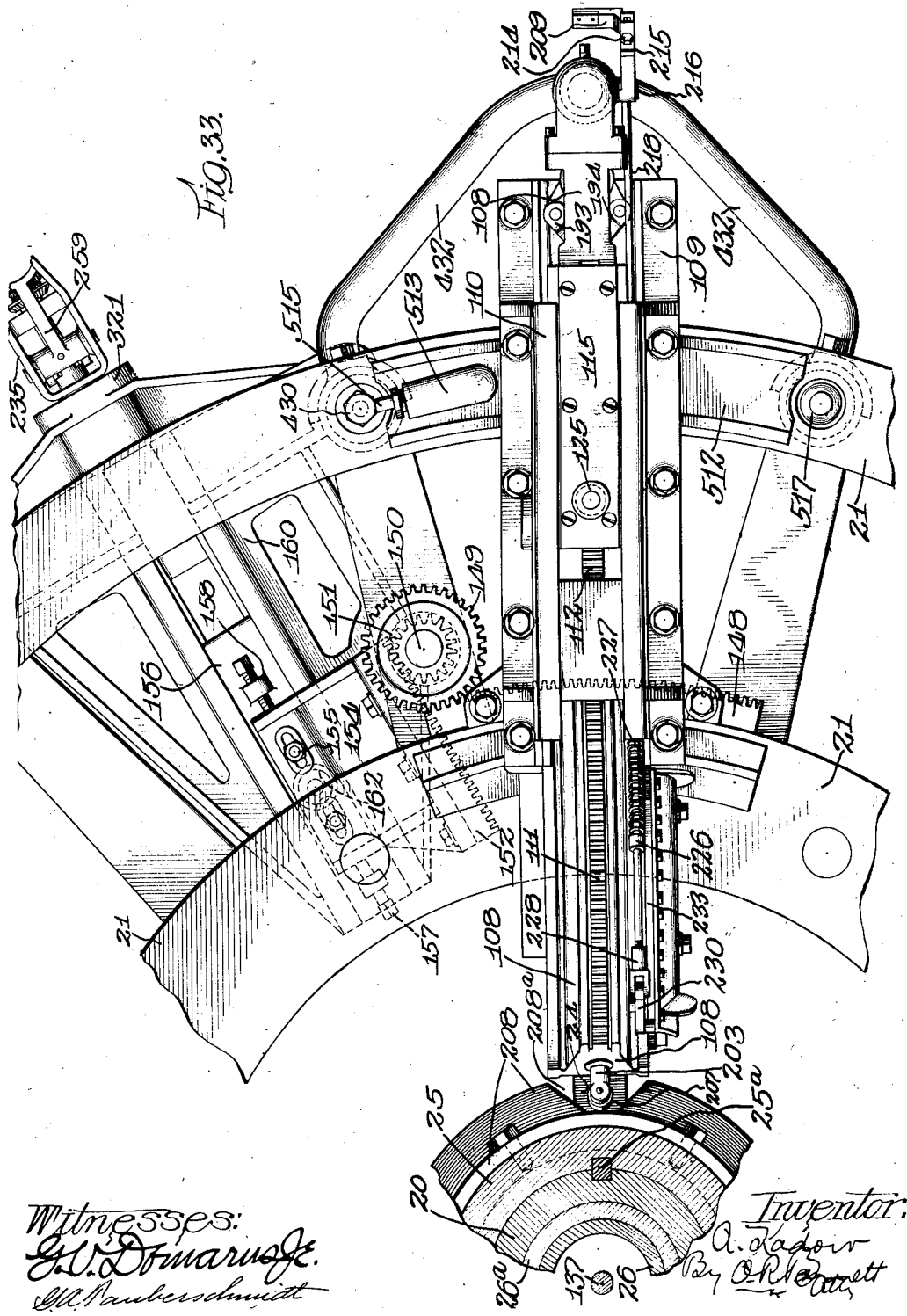

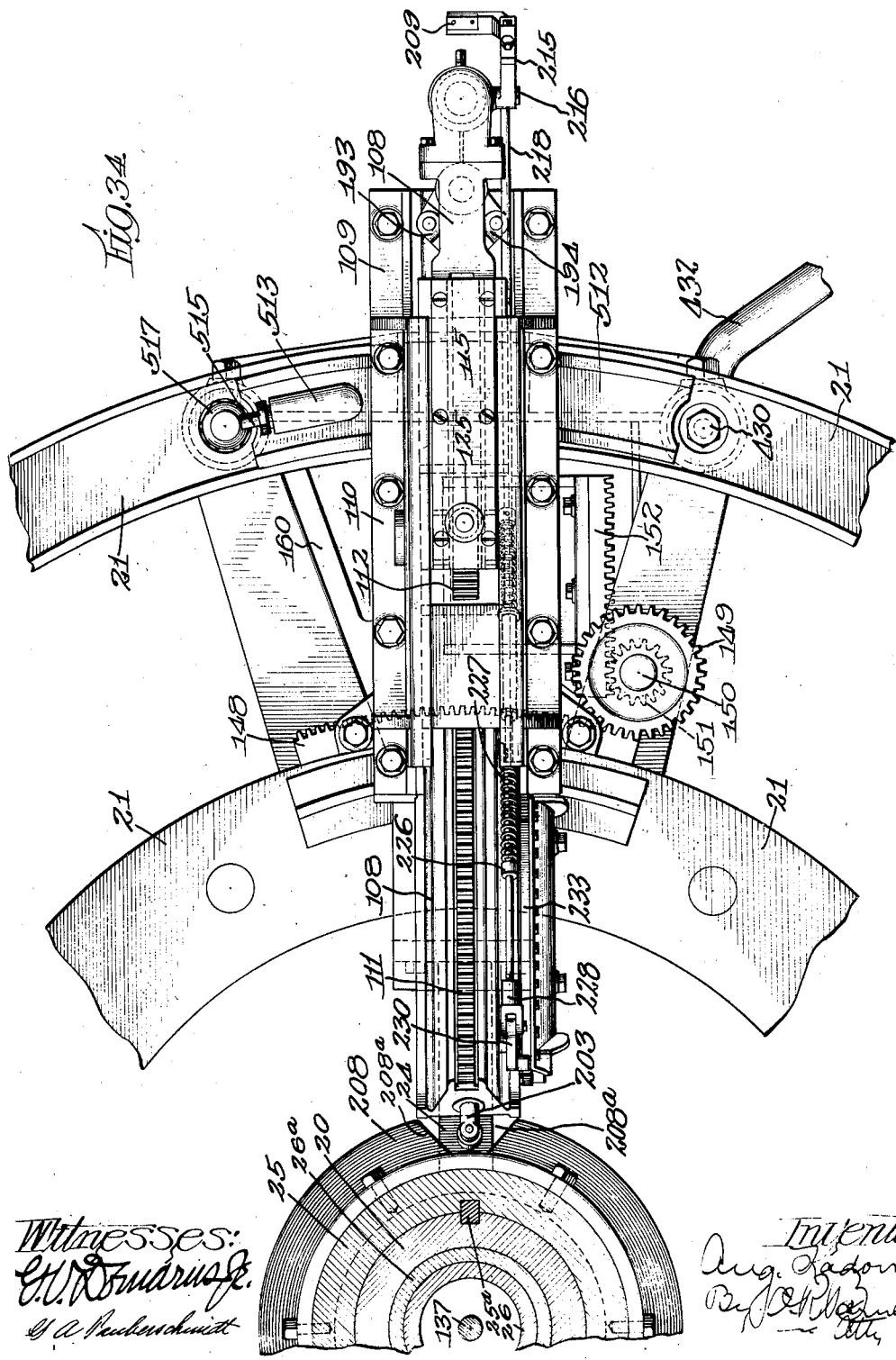

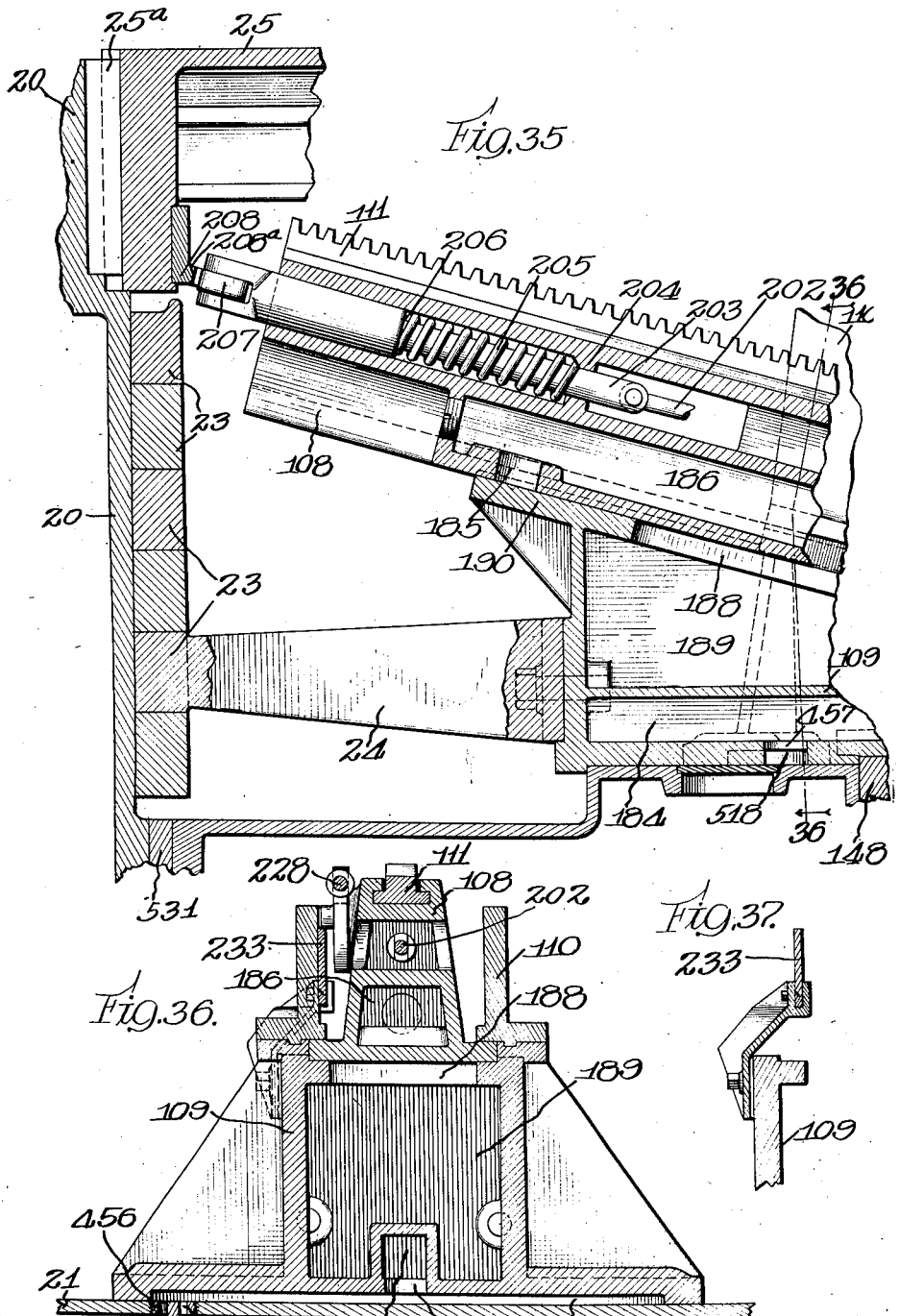

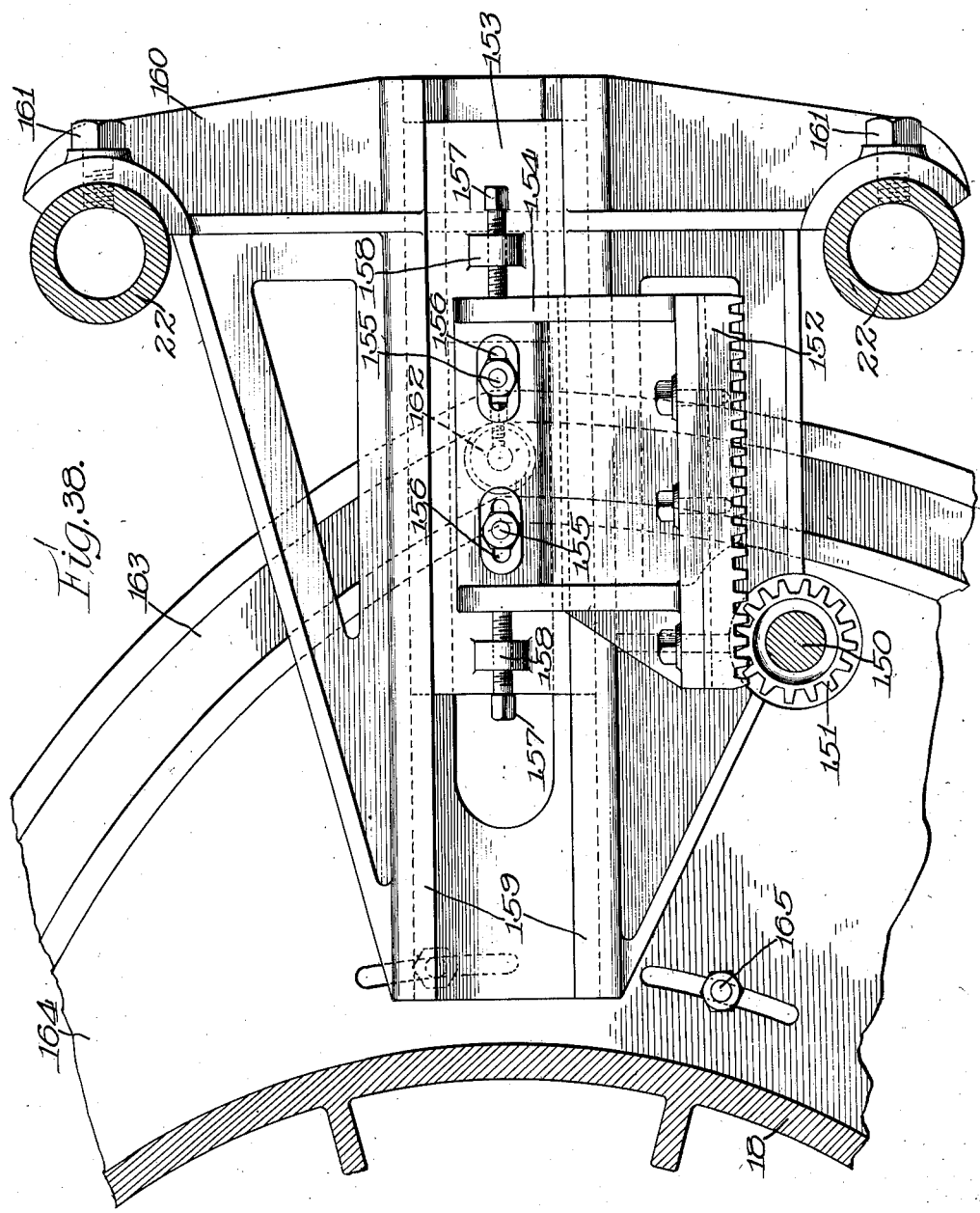

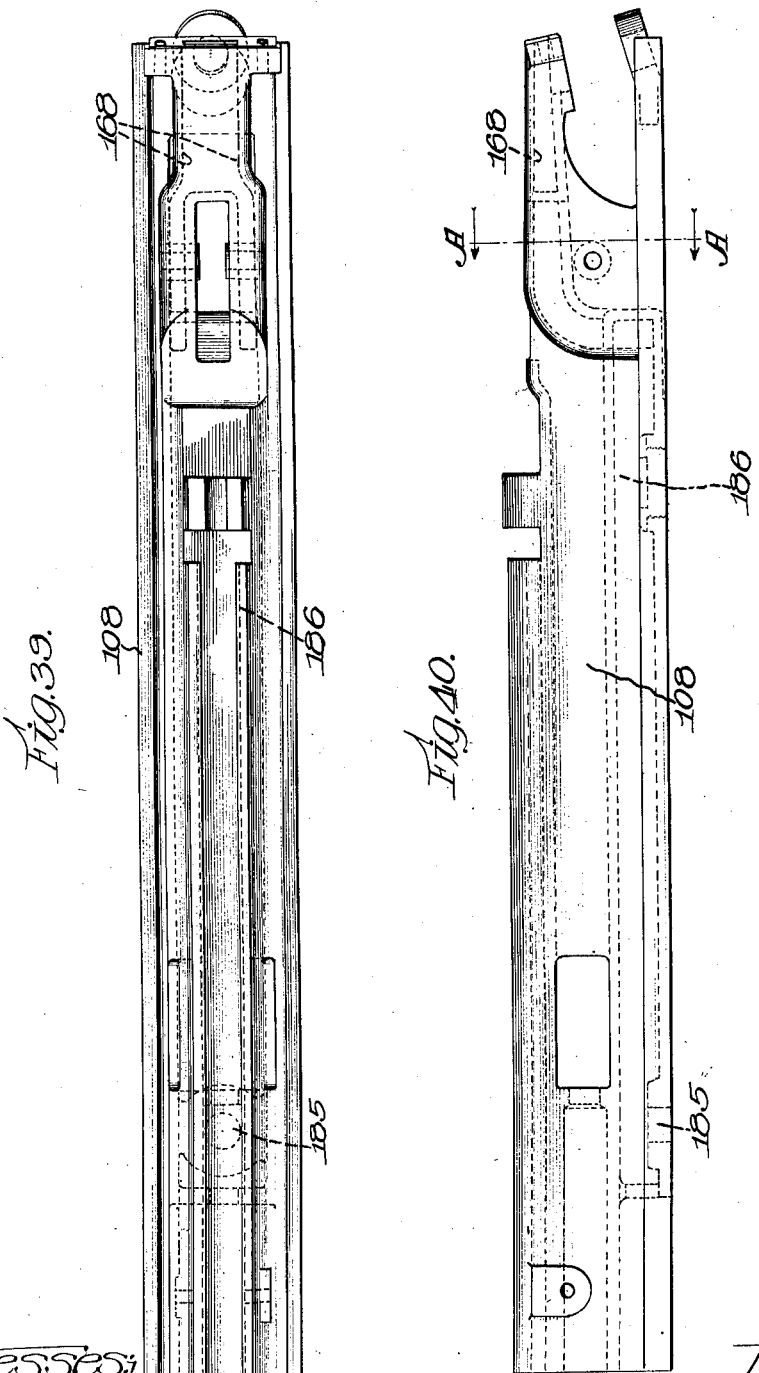

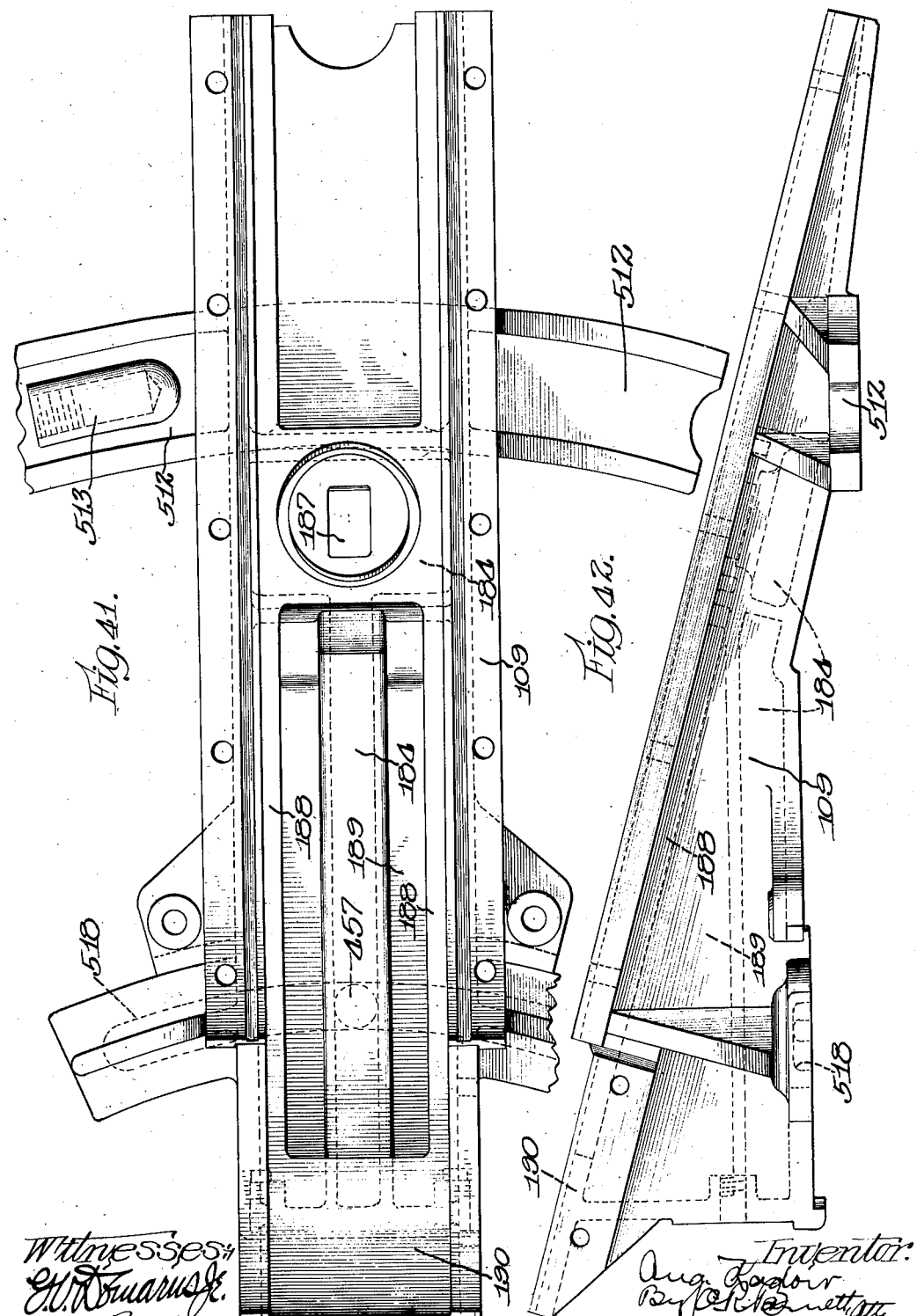

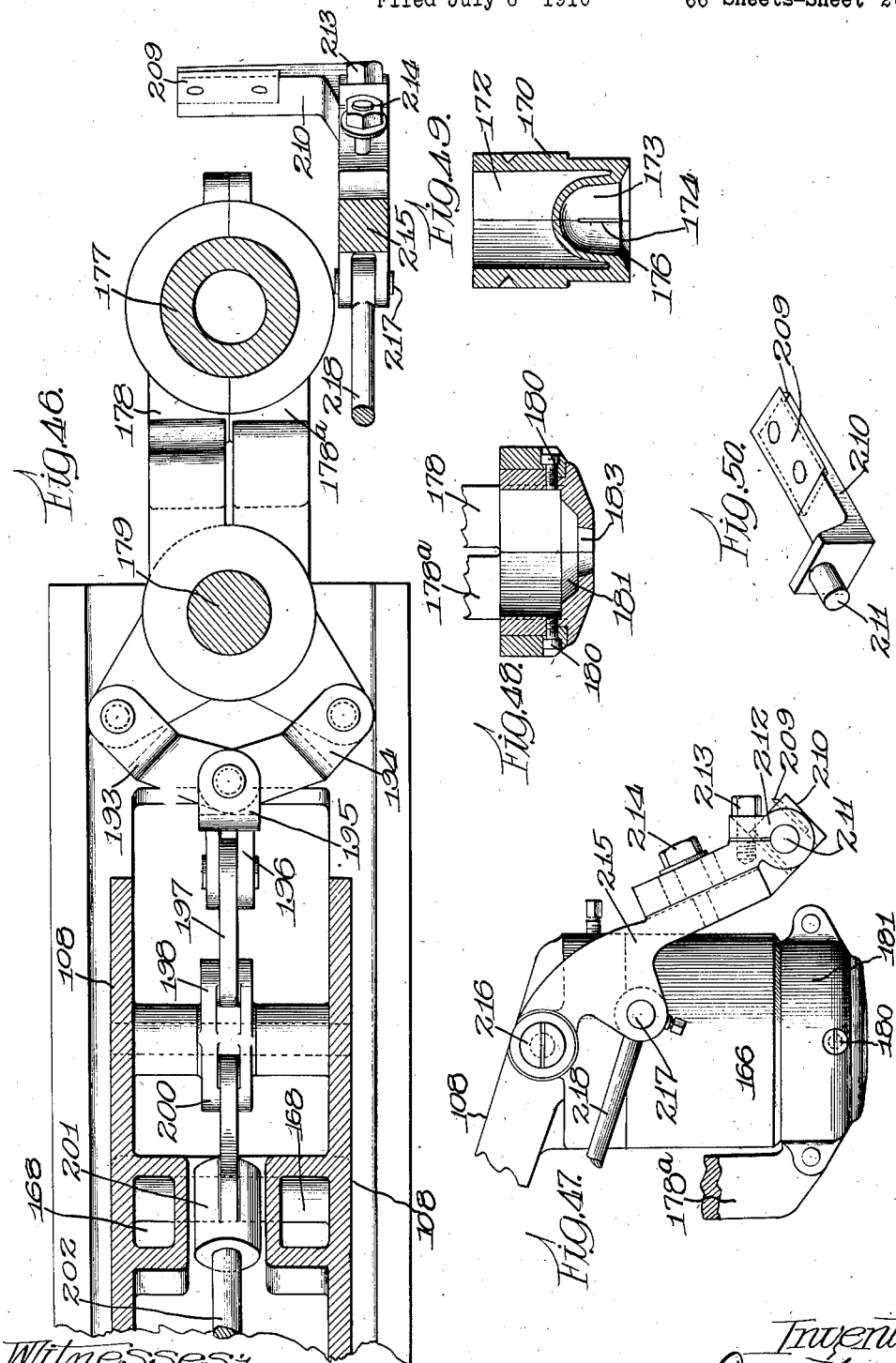

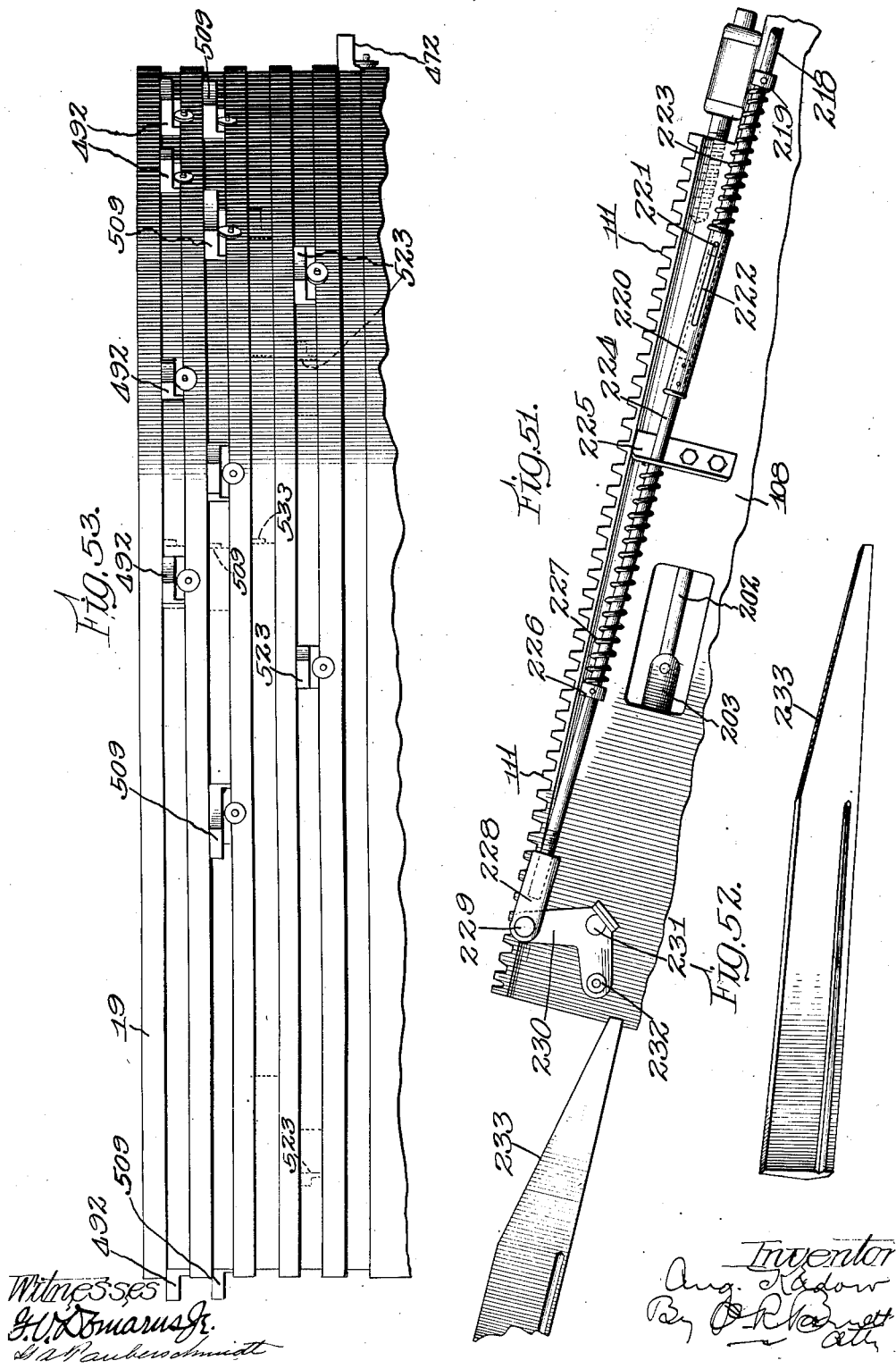

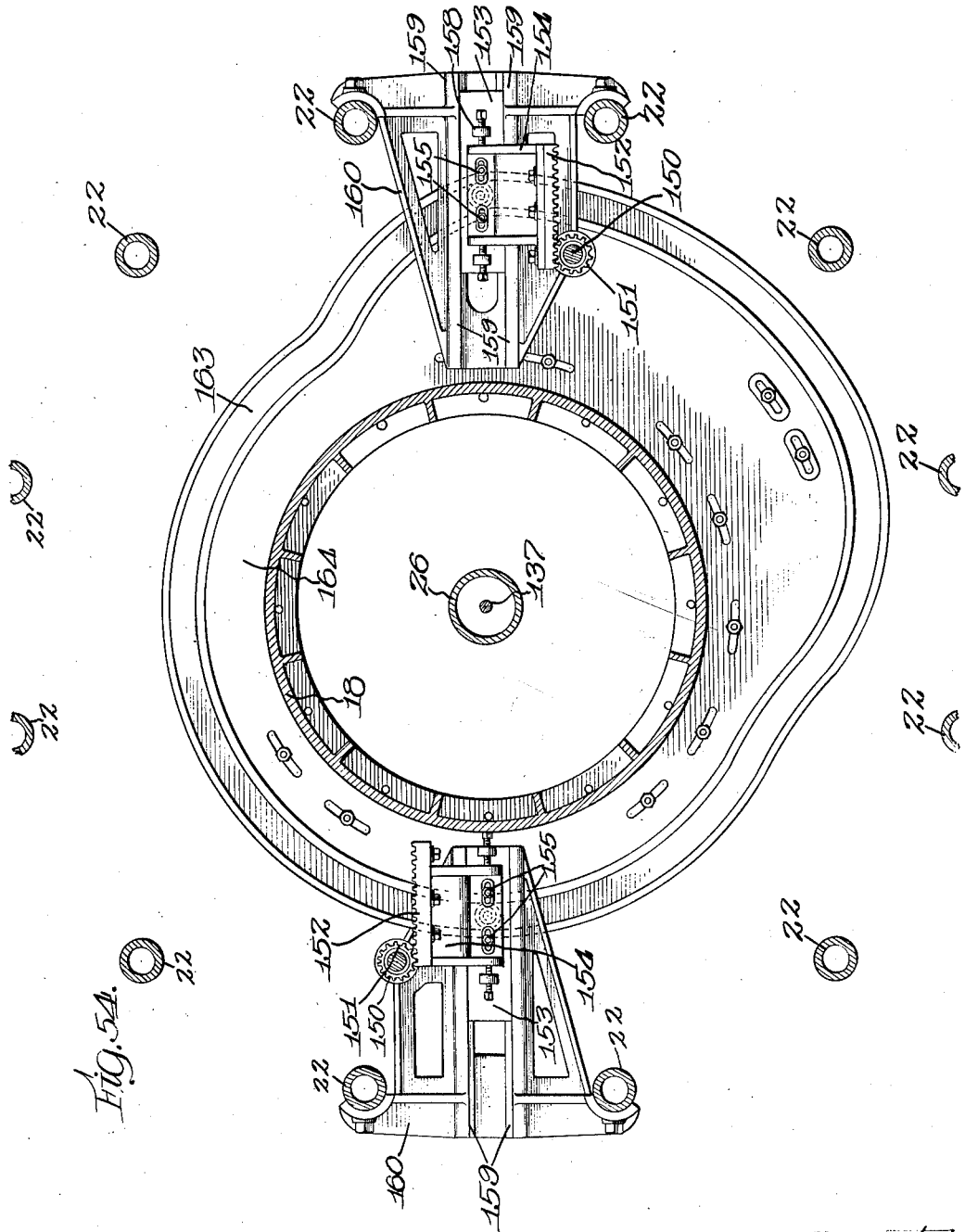

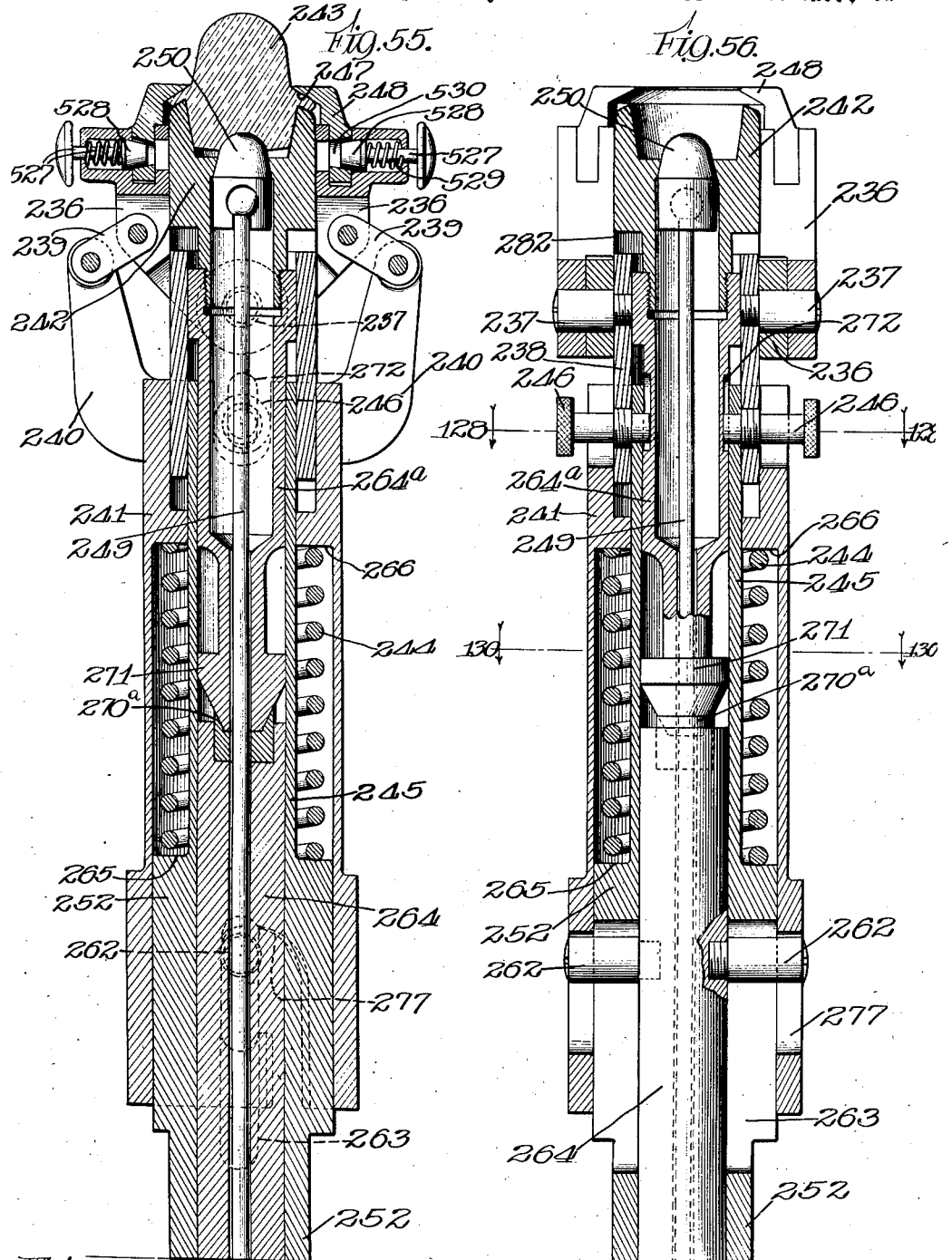

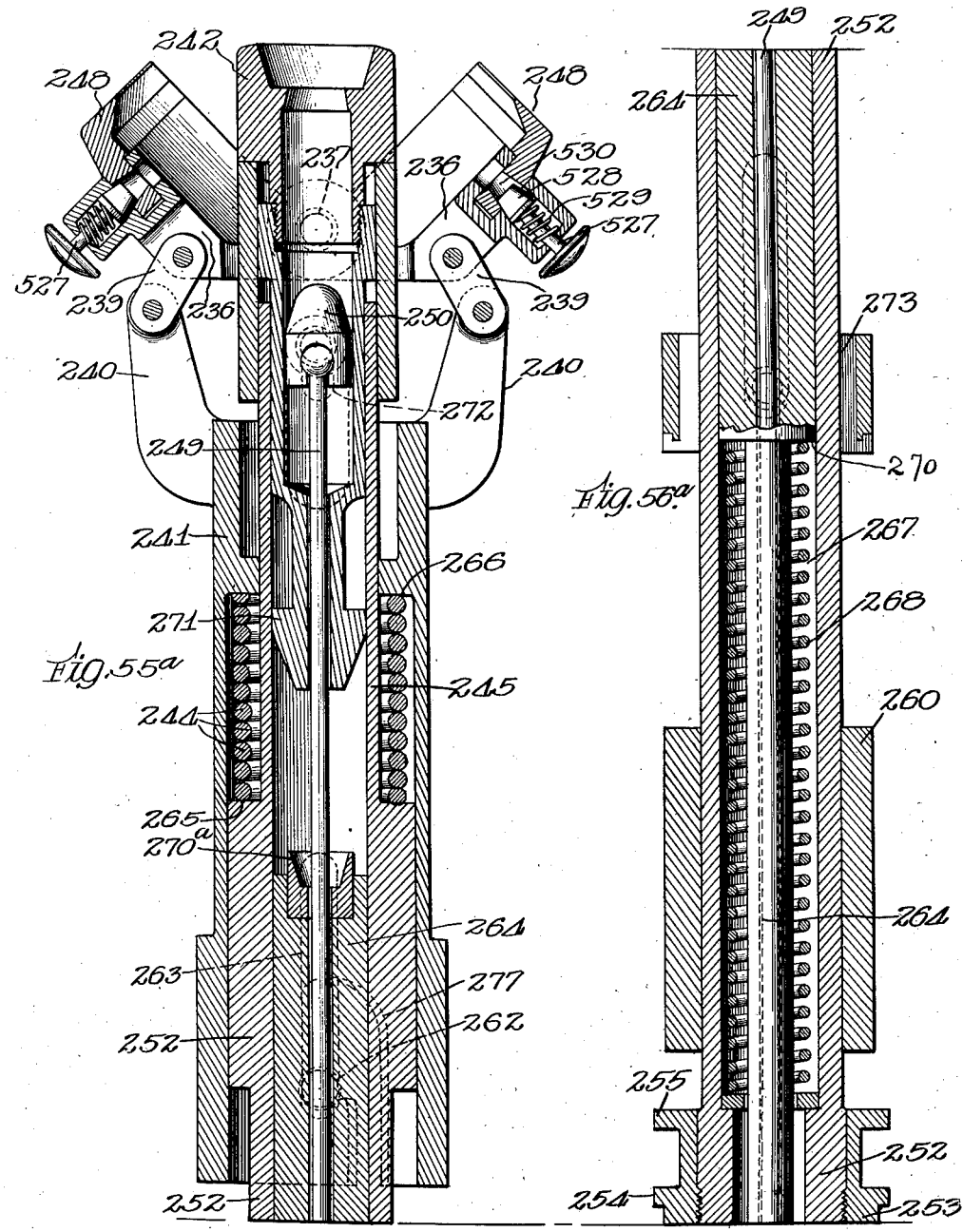

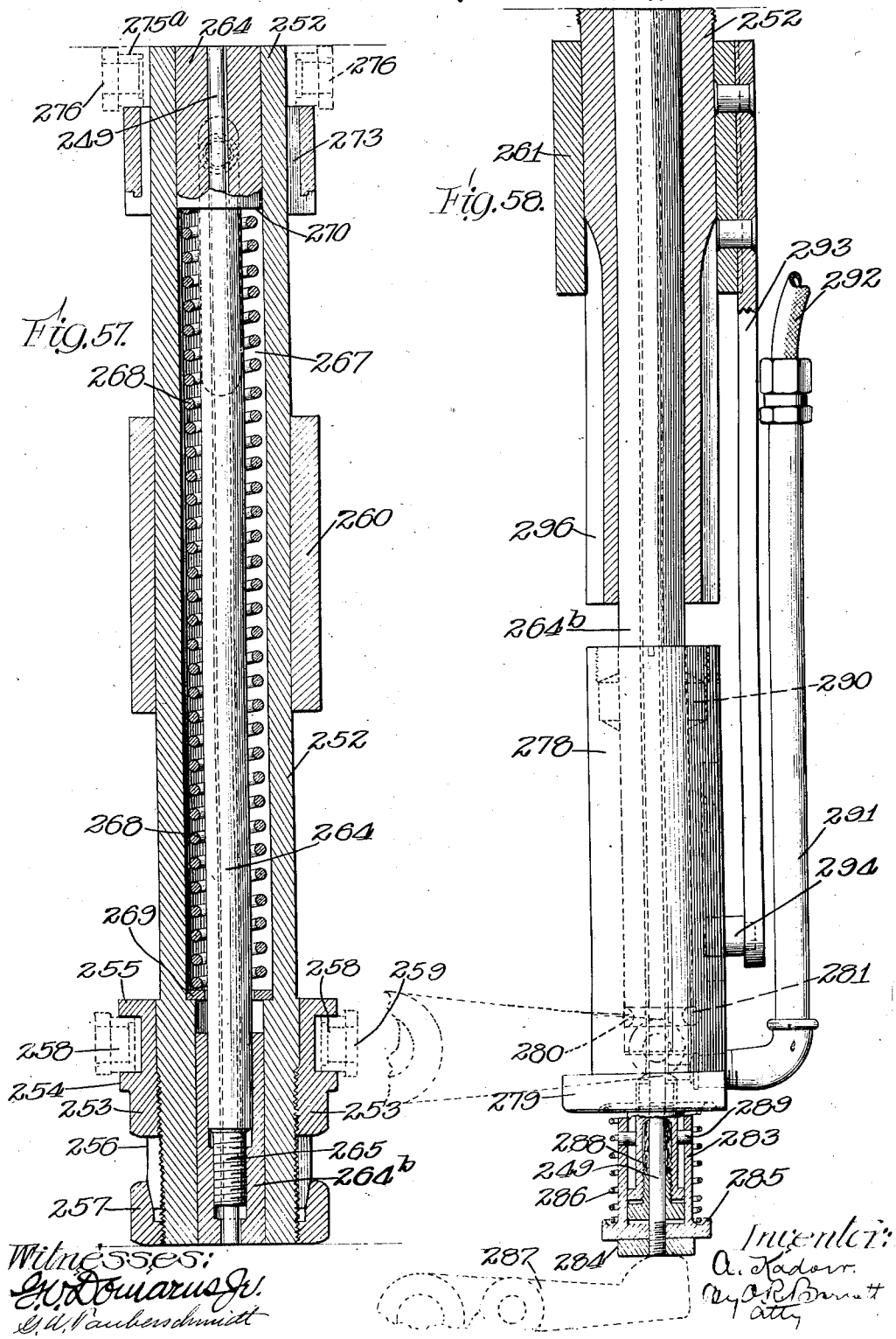

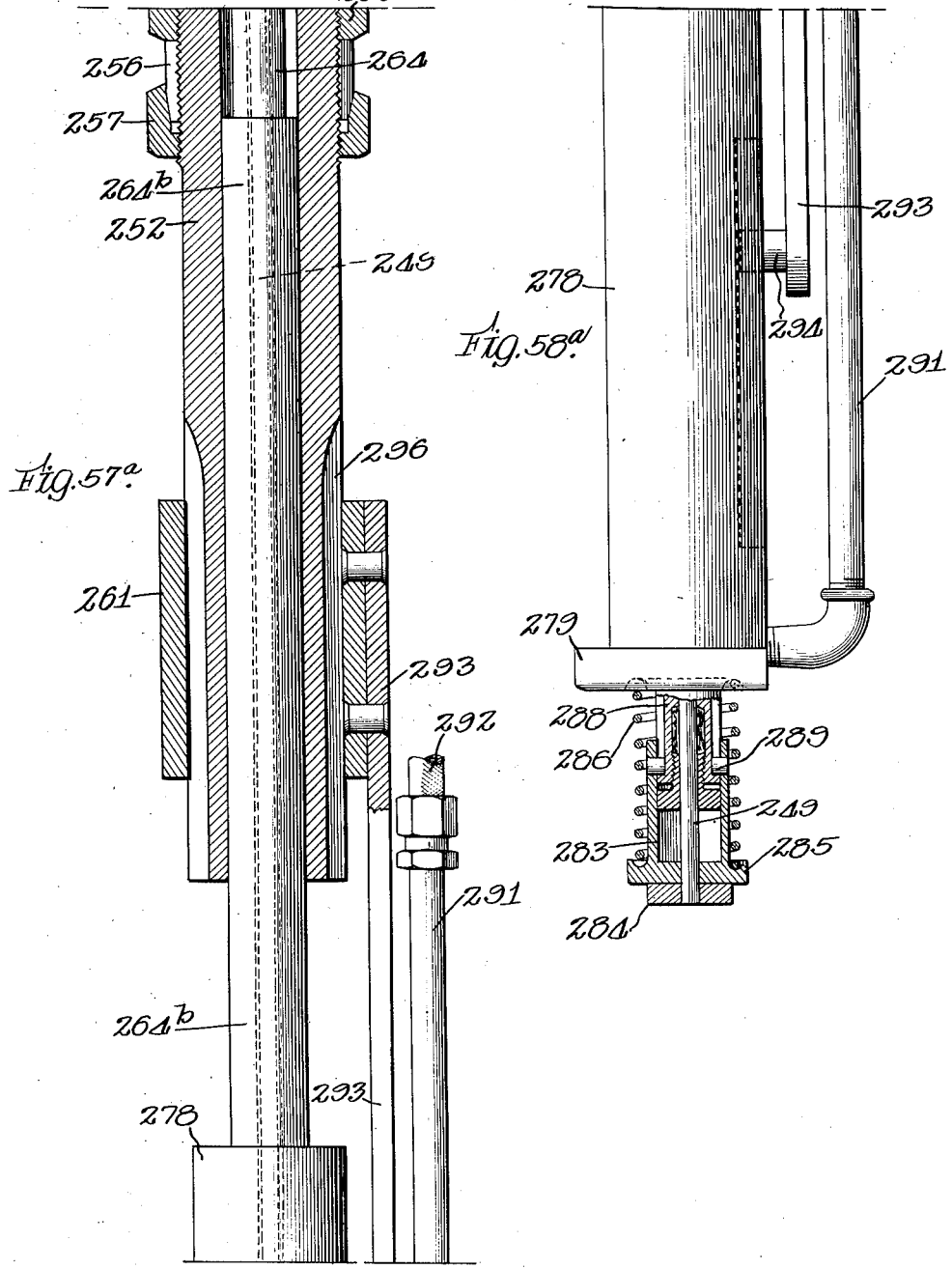

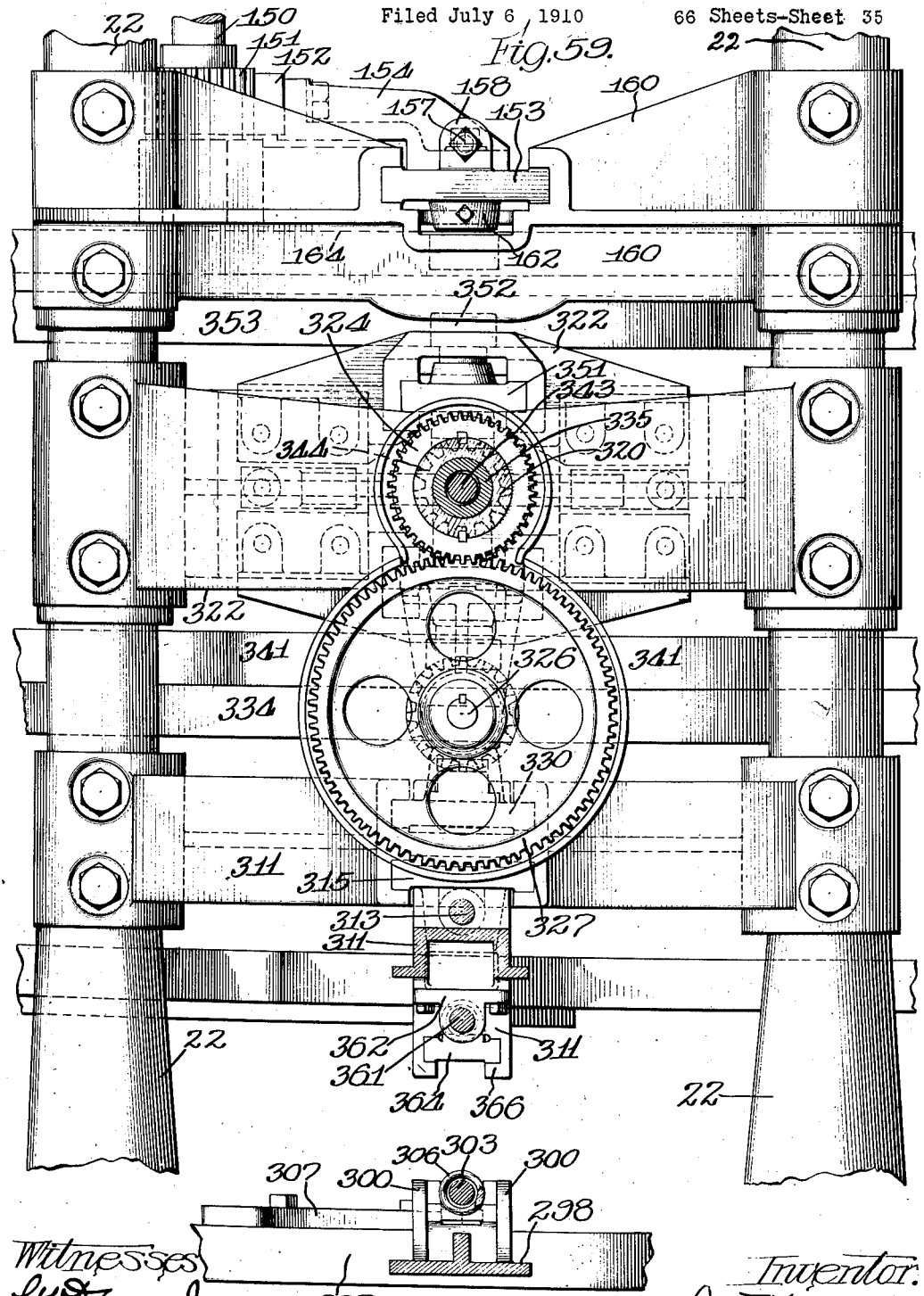

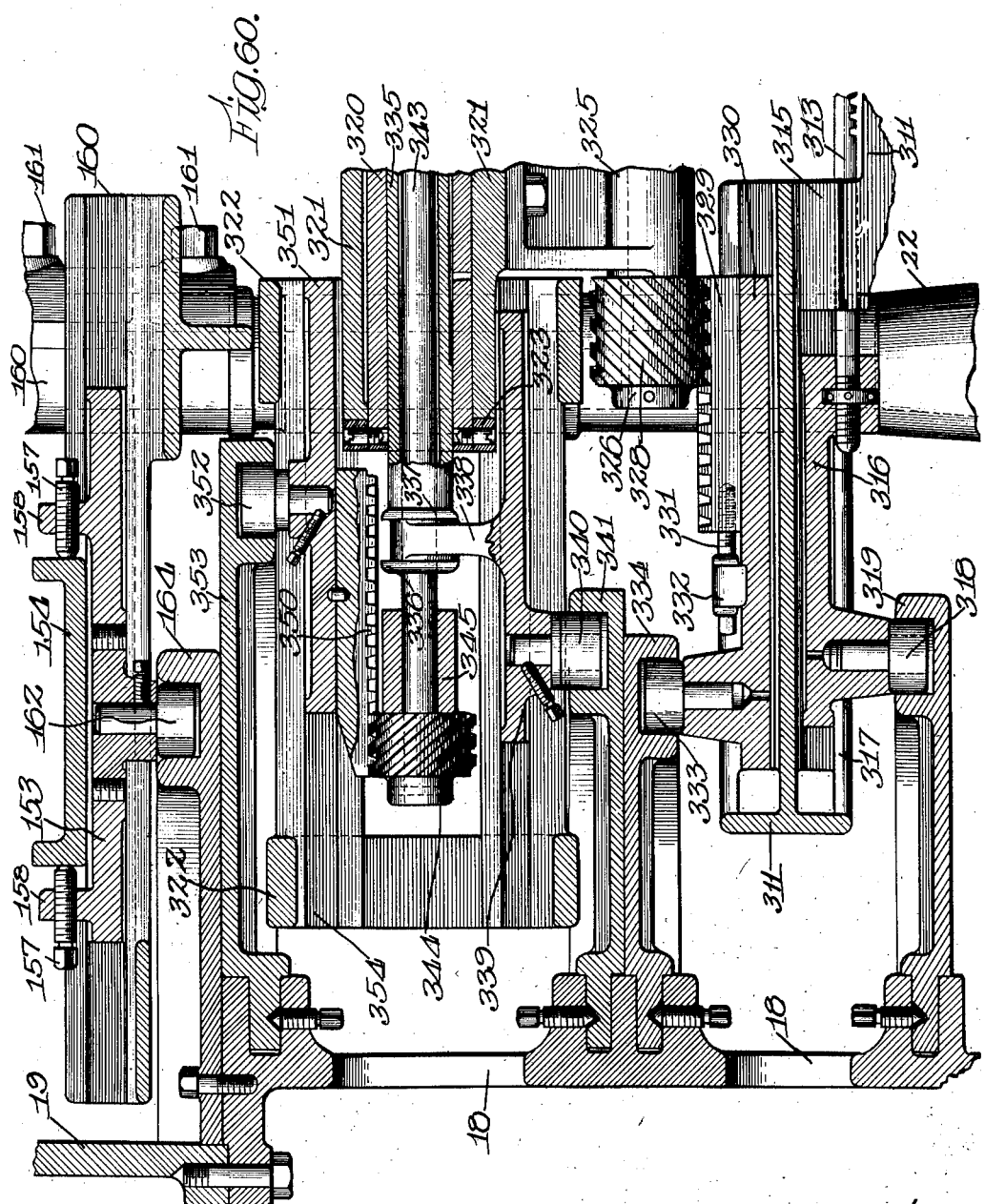

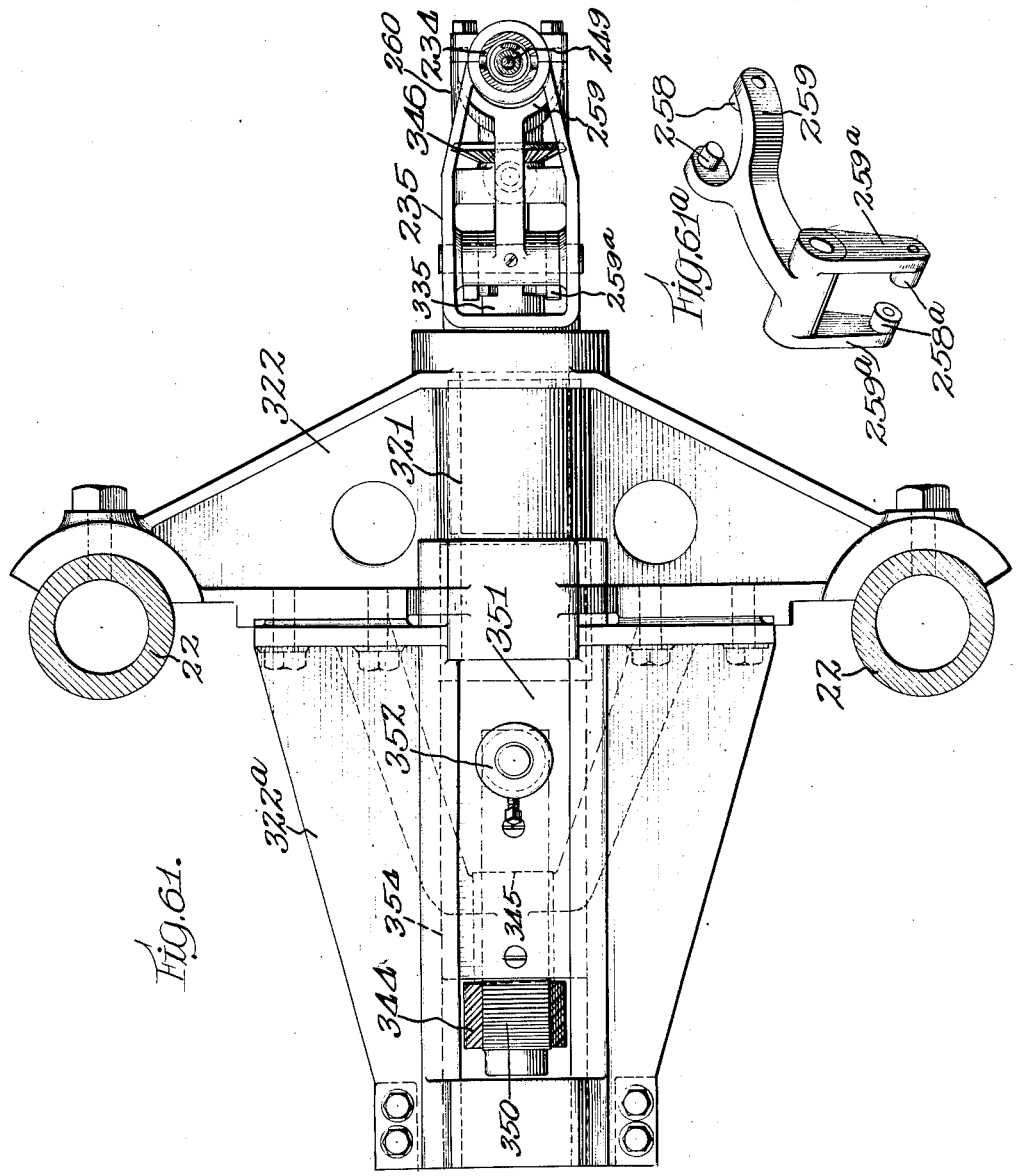

Feb. 24, 1925.

A. KADOW

GLASS WORKING MACHINE

Filed July 6, 1910

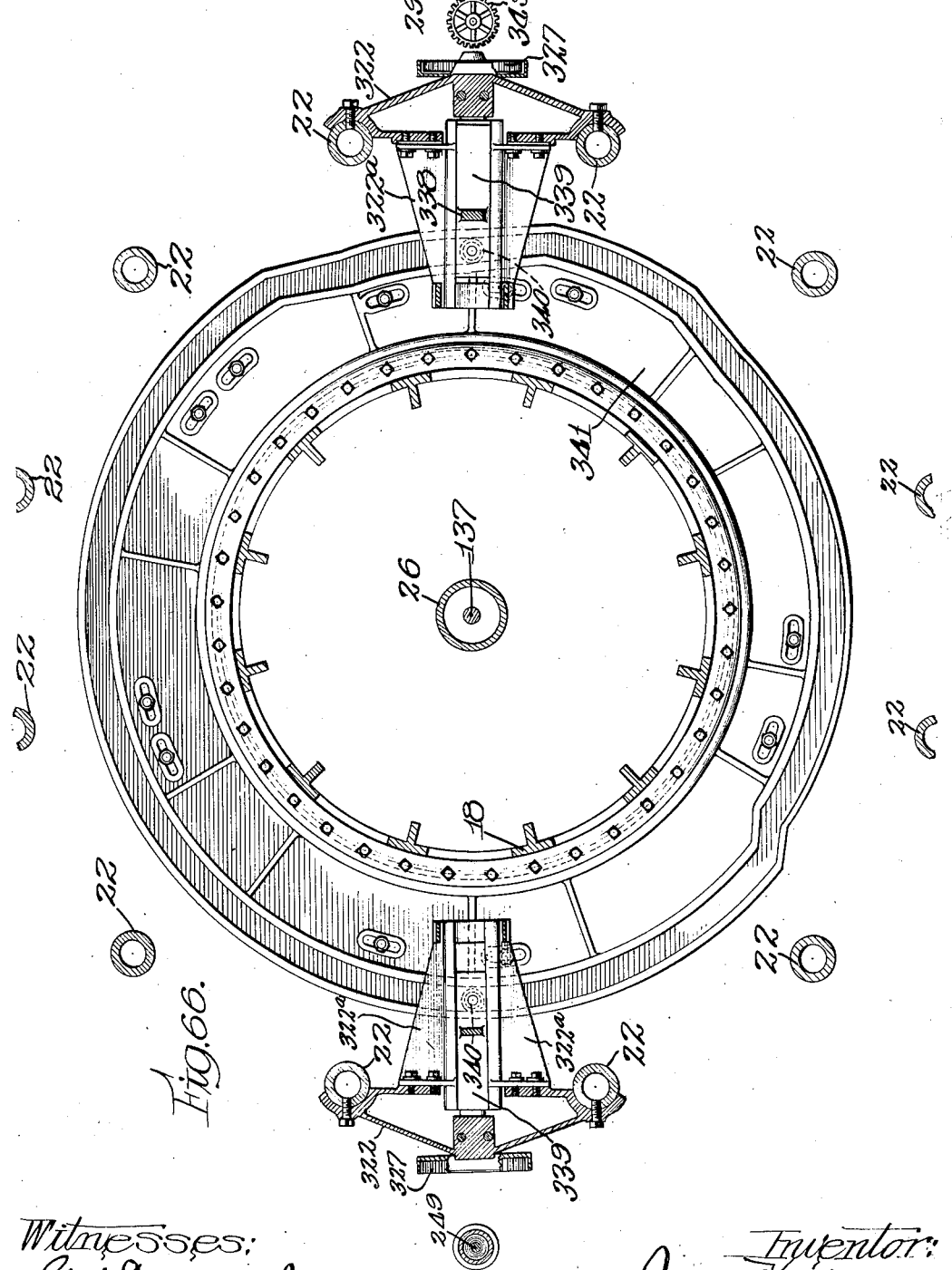

Feb. 24, 1925.
A. KADOW
GLASS WORKING MACHINE
Filed July 6 1910
1,527,556
66 Sheets-Sheet 40
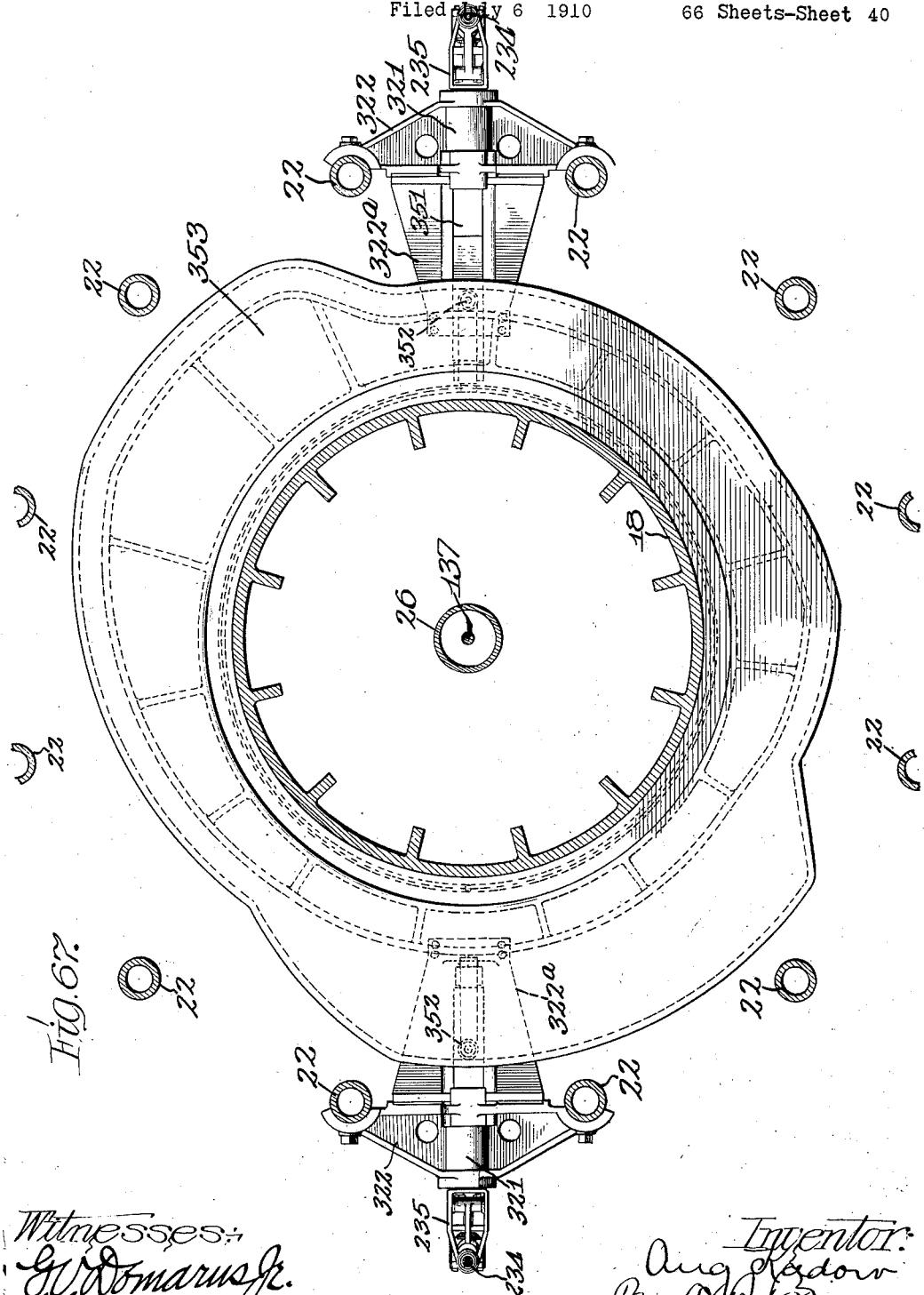

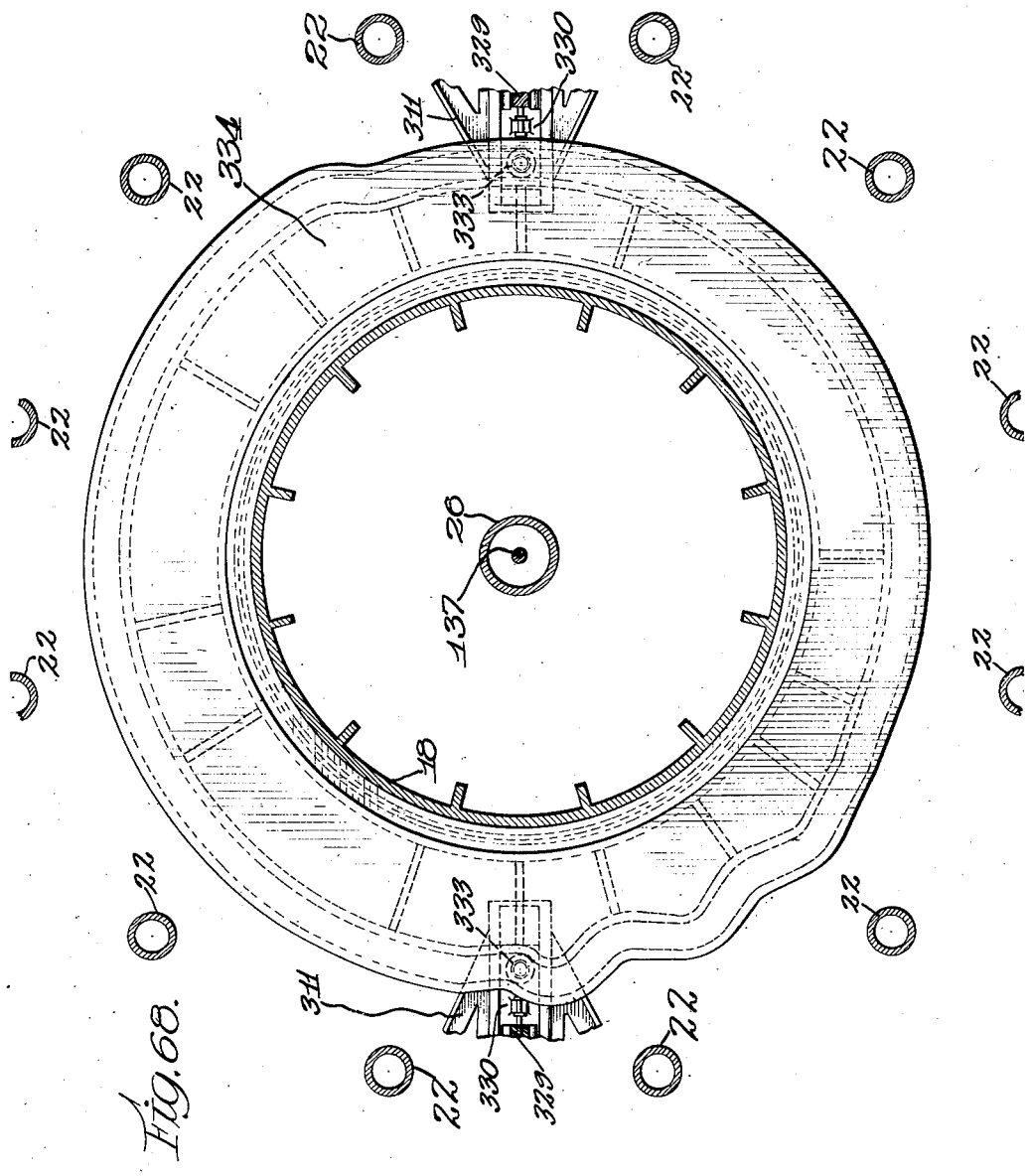

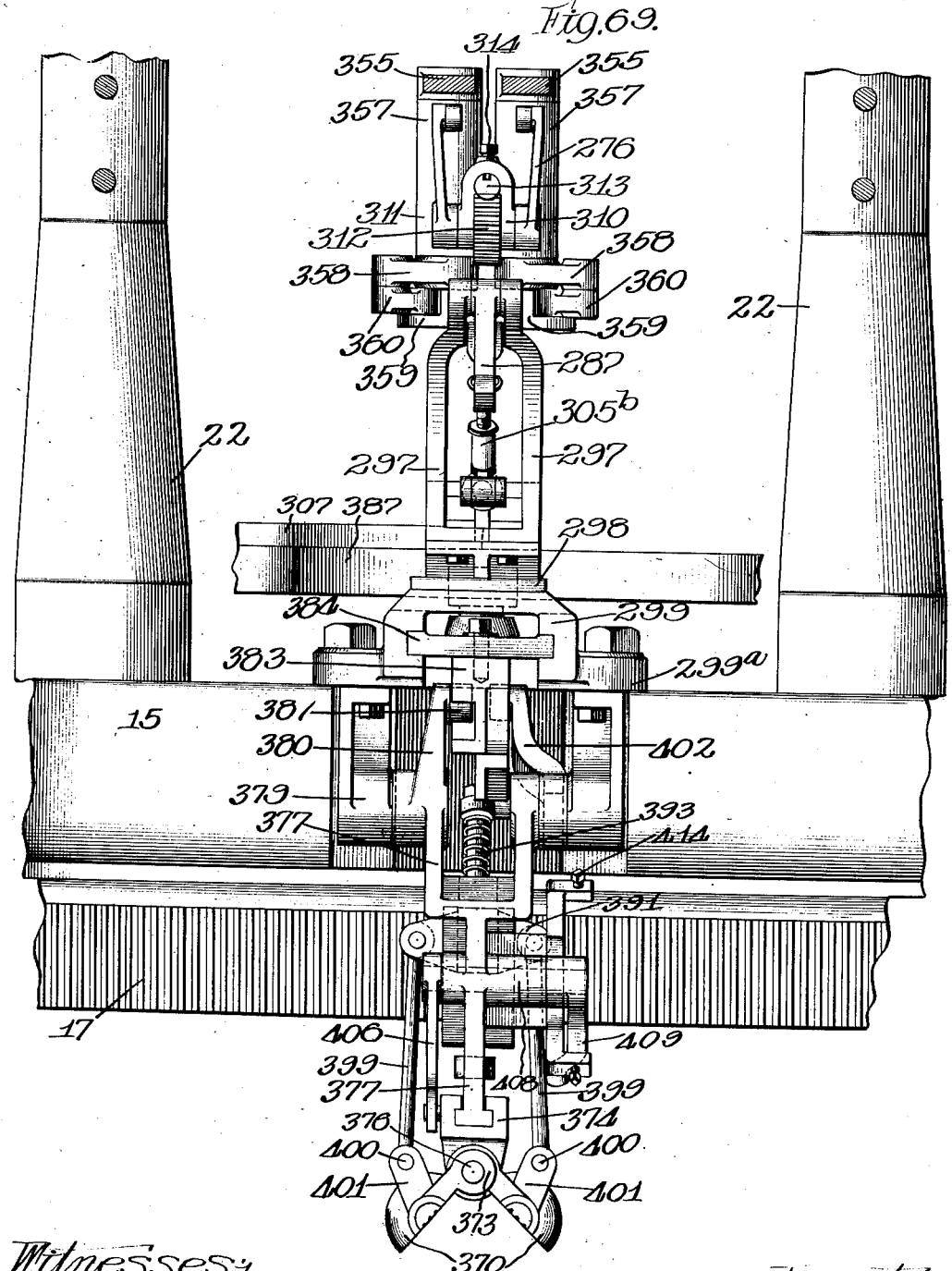

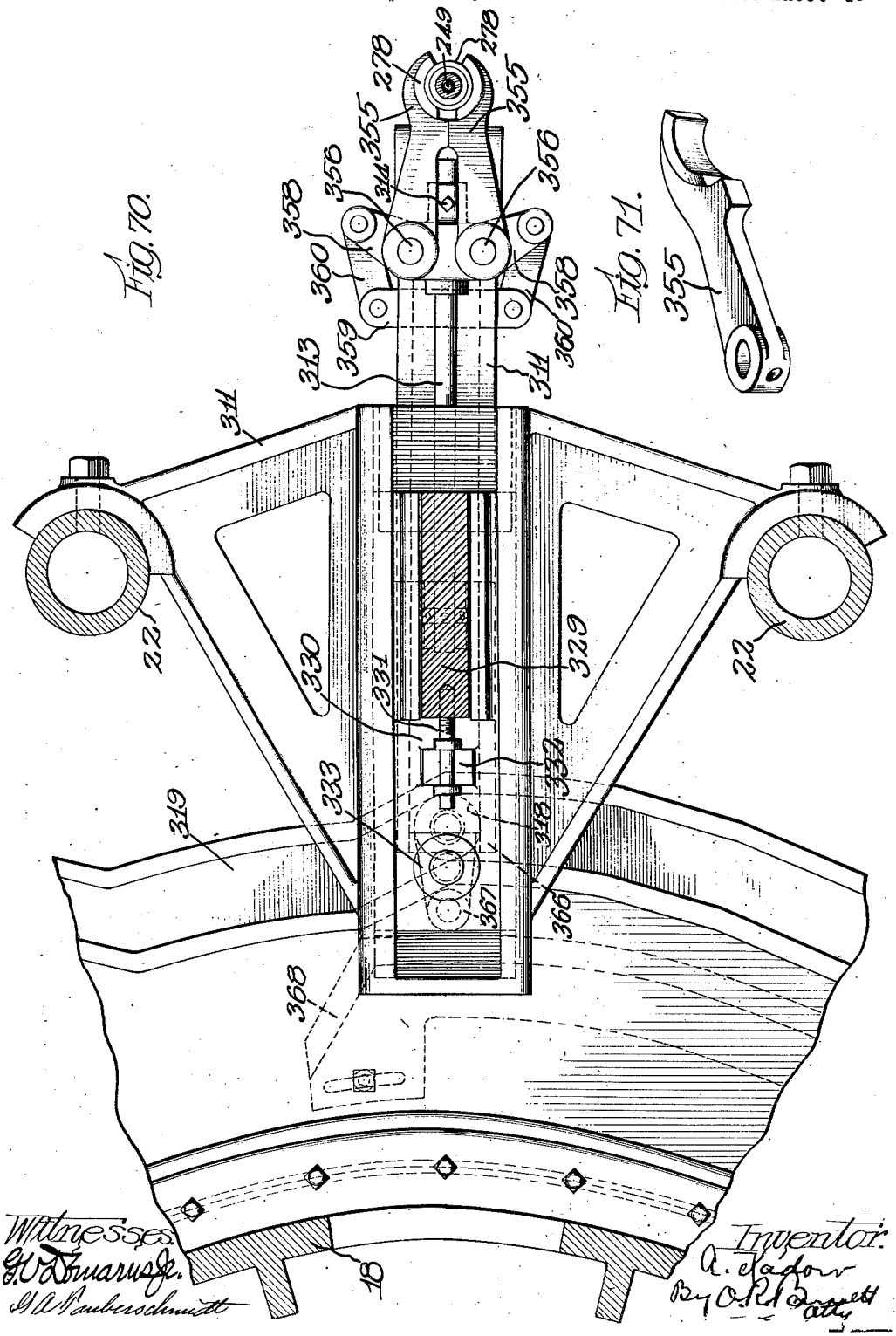

Feb. 24, 1925.
A. KADOW
1,527,556
GLASS WORKING MACHINE
Filed July 6 1910
66 Sheets-Sheet 45
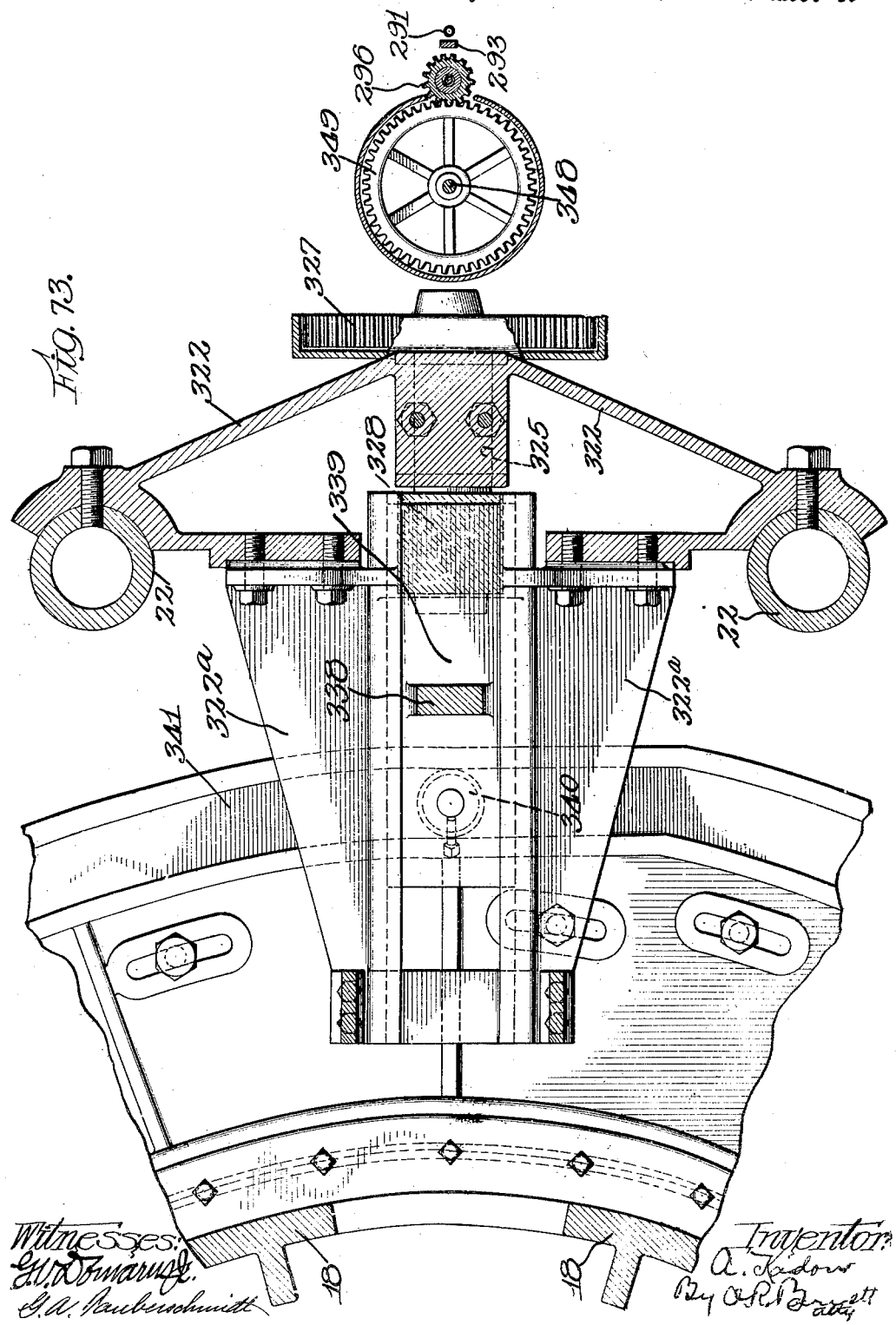

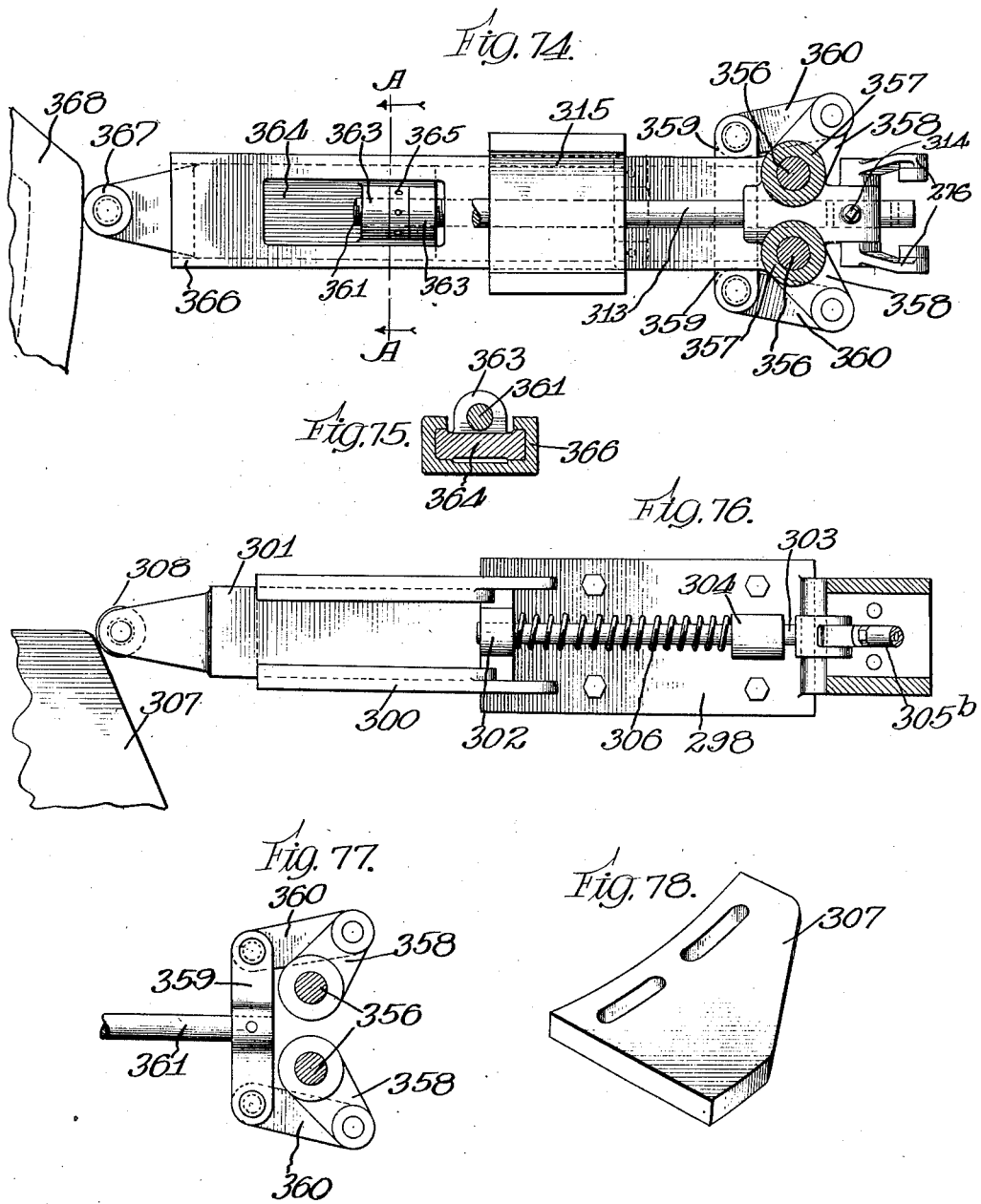

Feb. 24, 1925.

A. KADOW

GLASS WORKING MACHINE

Filed July 6 1910    66 Sheets-Sheet 47

1,527,556

Witnesses:

Inventor:

Feb. 24, 1925.
A. KADOW
1,527,556
GLASS WORKING MACHINE
Filed July 6 1910
66 Sheets-Sheet 48
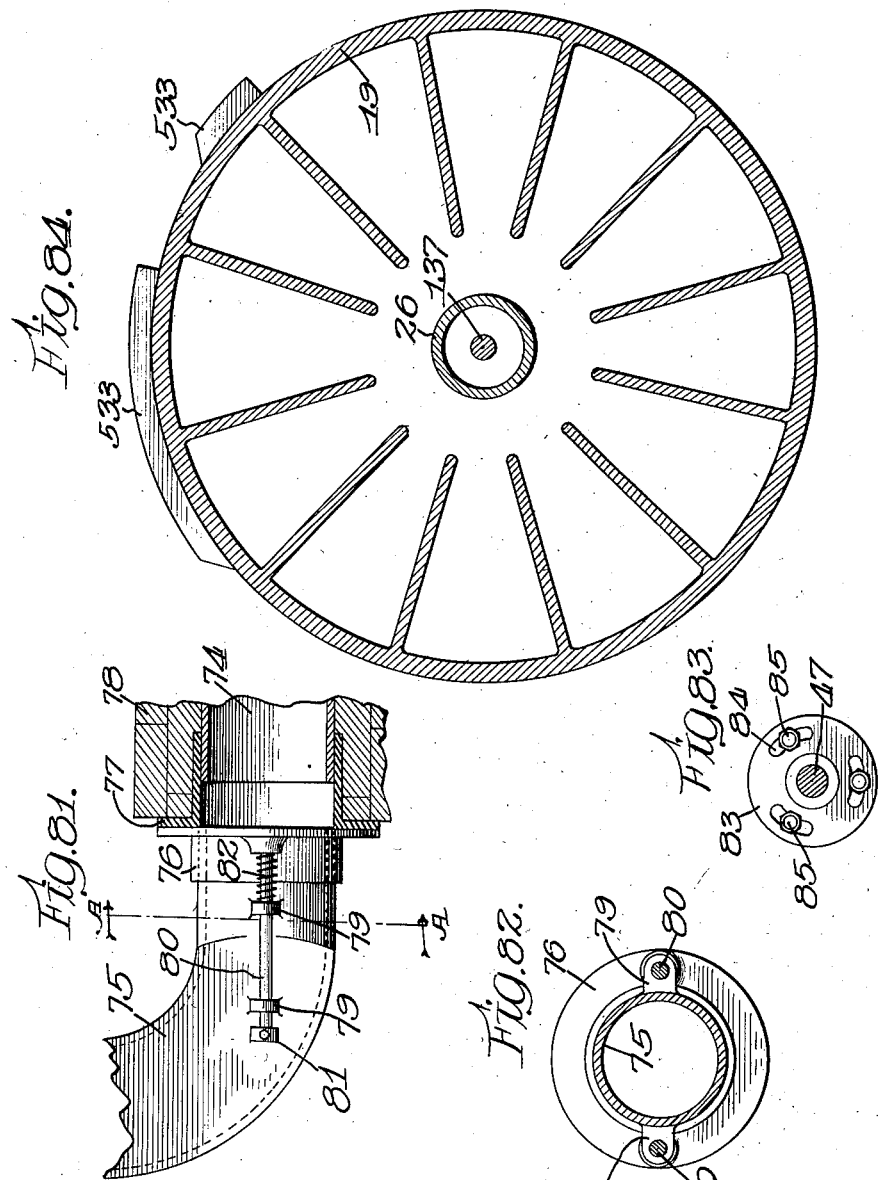

Feb. 24, 1925. 1,527,556
A. KADOW
GLASS WORKING MACHINE
Filed July 6, 1910 66 Sheets-Sheet 49
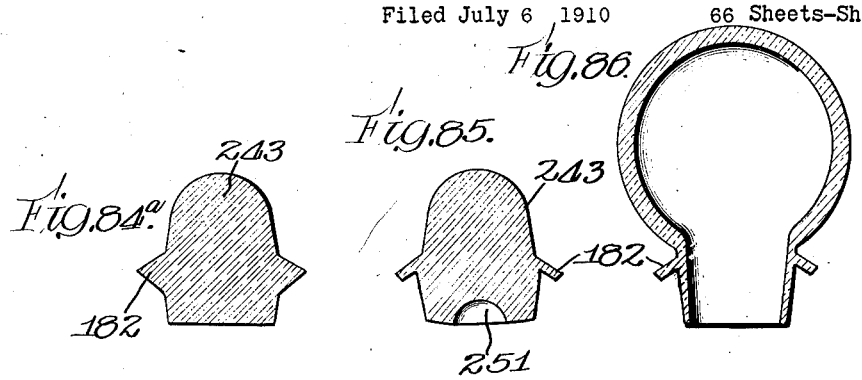
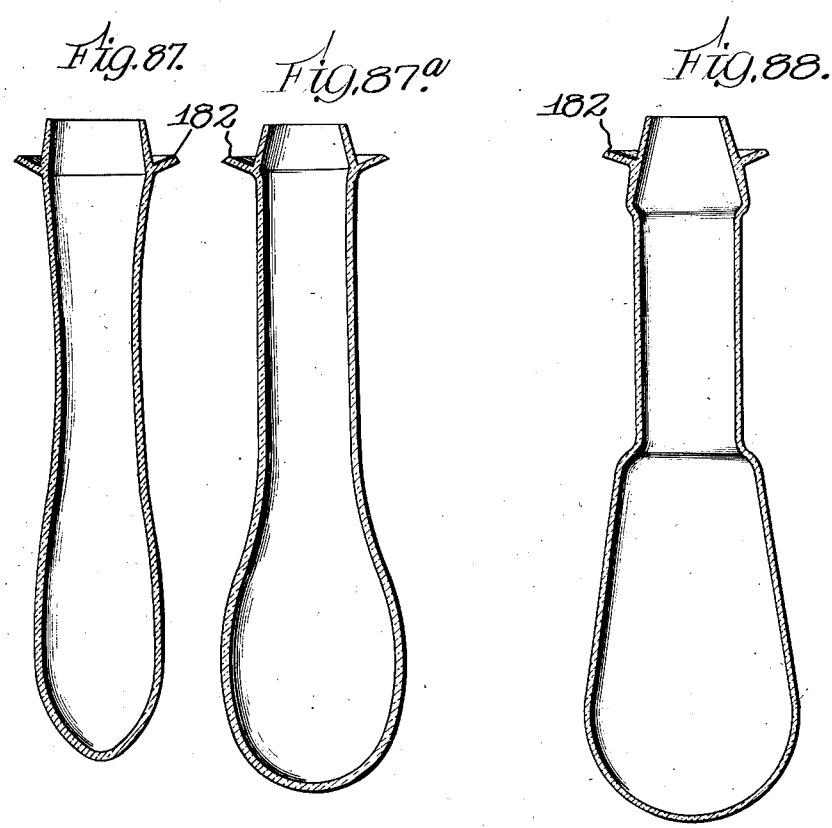

Feb. 24, 1925.
A. KADOW
1,527,556
GLASS WORKING MACHINE
Filed July 6 1910
66 Sheets-Sheet 50
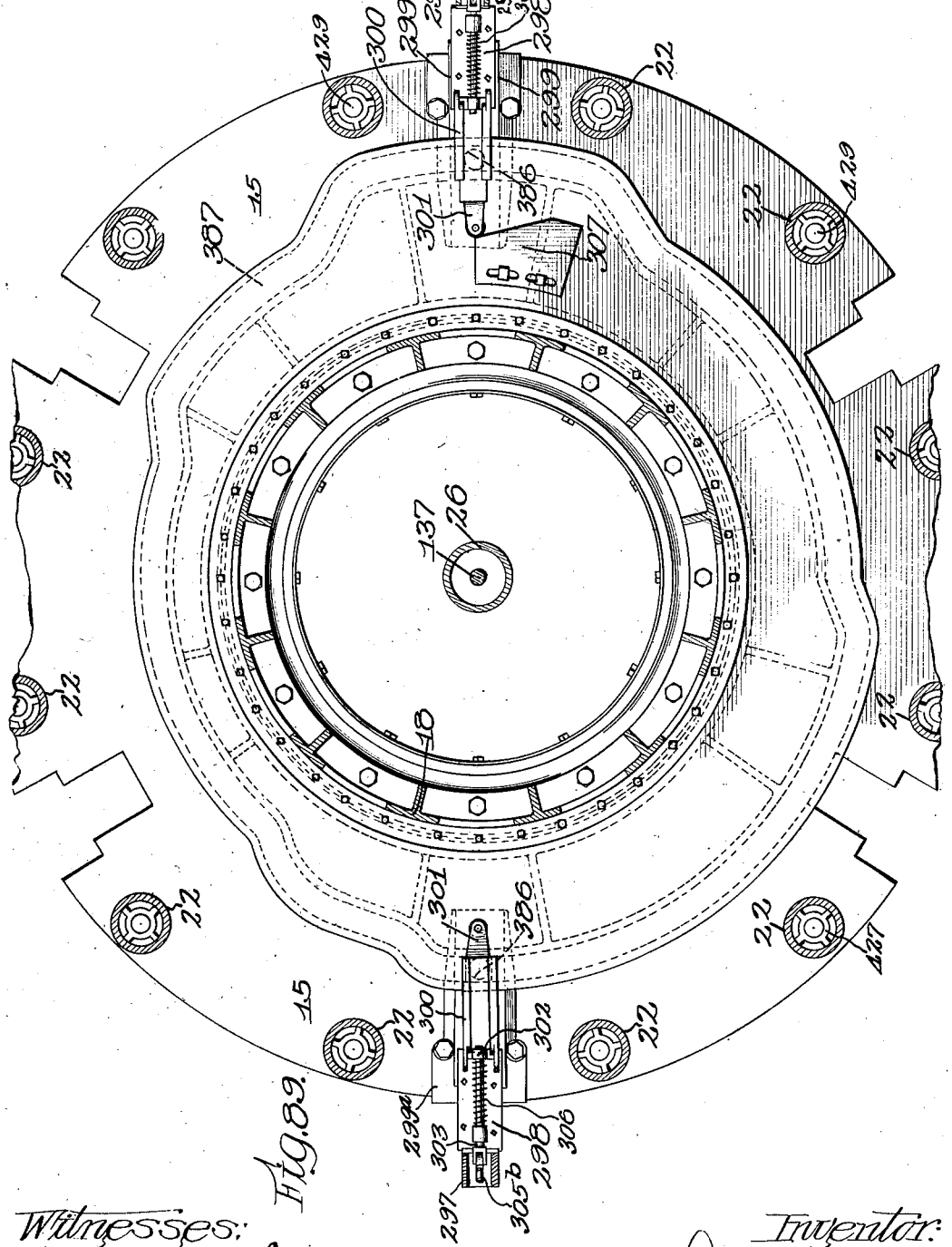

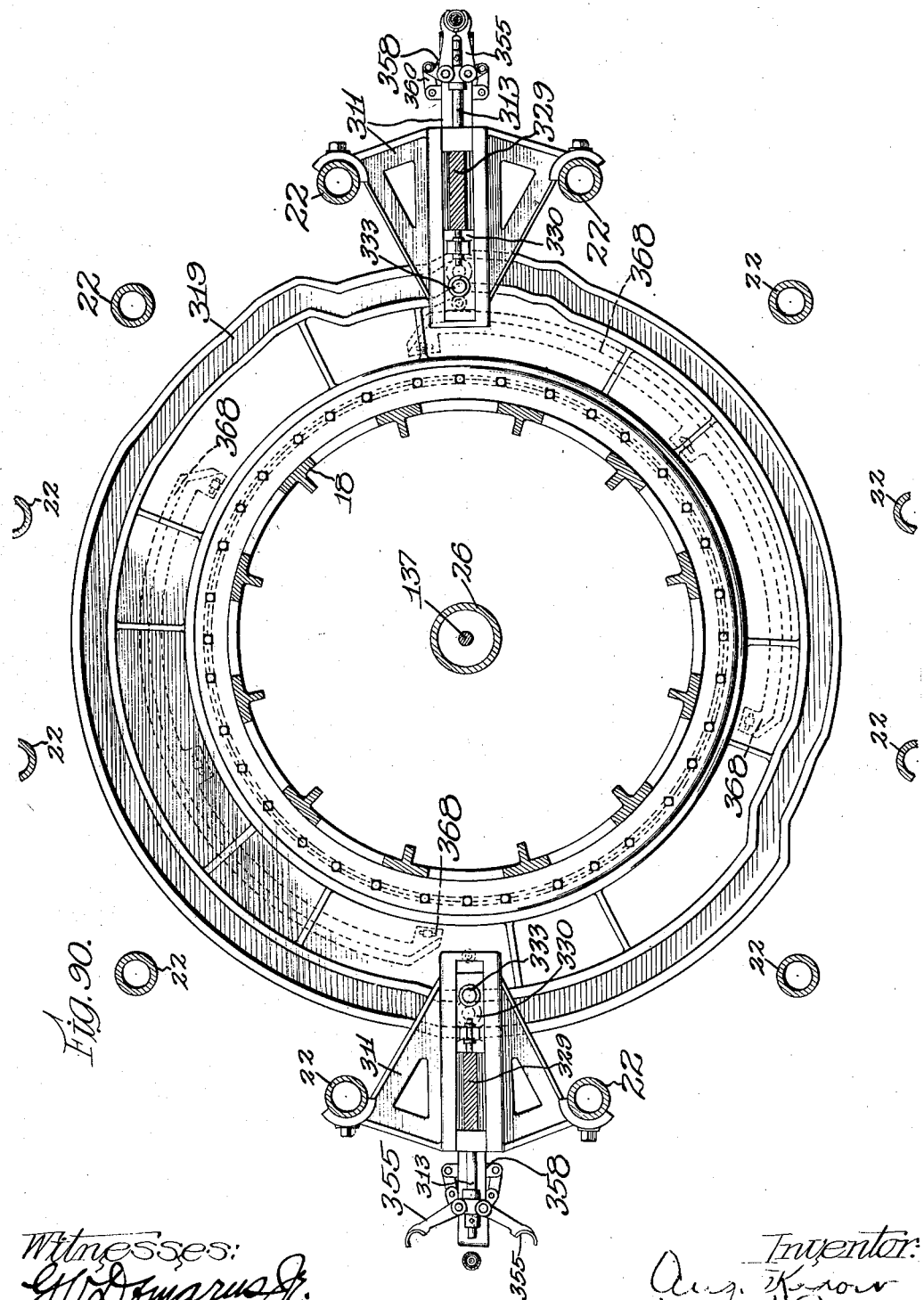

Feb. 24, 1925. 1,527,556
A. KADOW
GLASS WORKING MACHINE
Filed July 6 1910 66 Sheets-Sheet 52
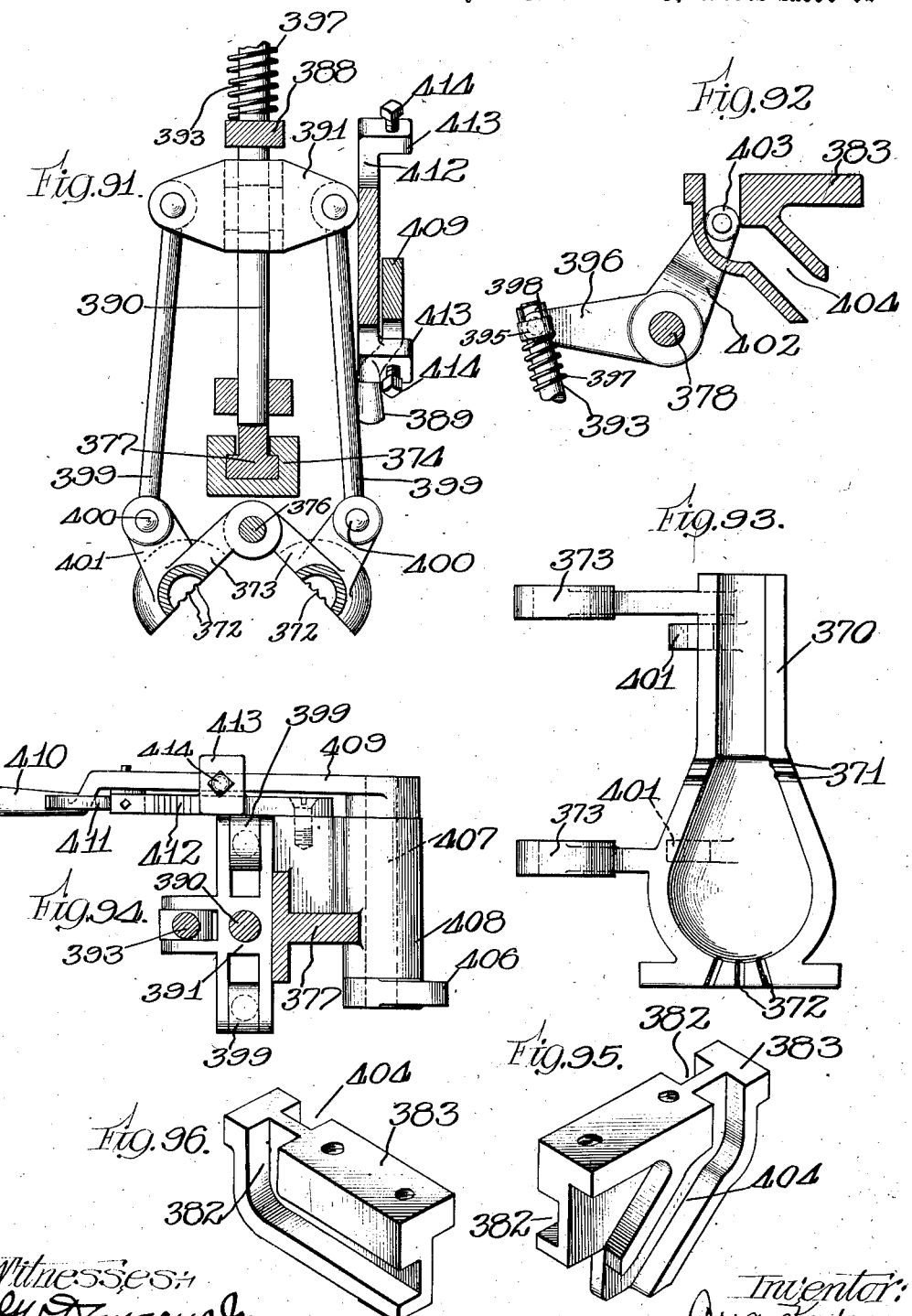

Feb. 24, 1925.
A. KADOW
GLASS WORKING MACHINE
Filed July 6 1910
1,527,556
66 Sheets-Sheet 53
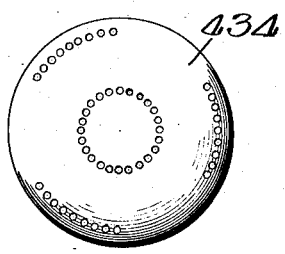
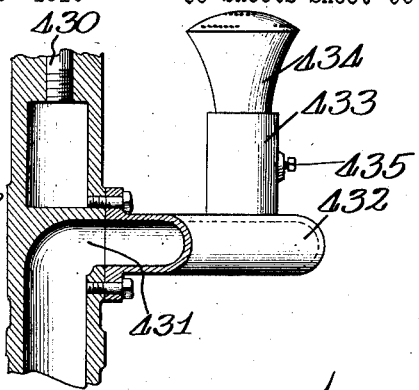
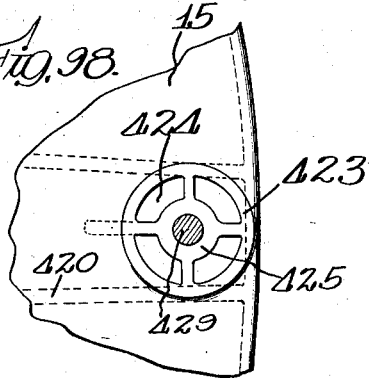
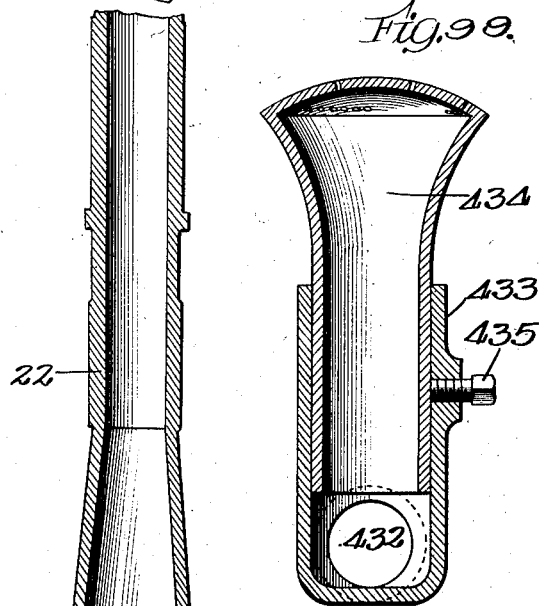
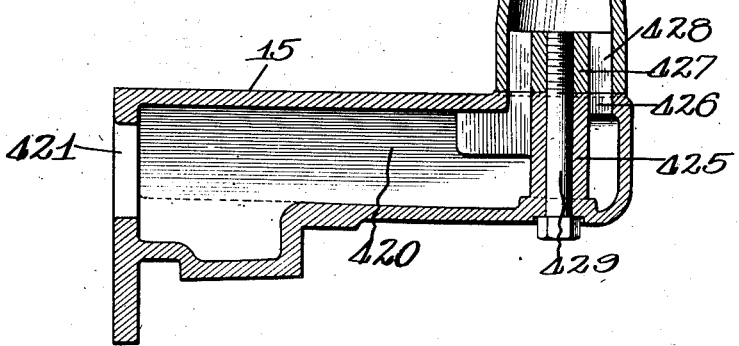

Feb. 24, 1925. 1,527,556
A. KADOW
GLASS WORKING MACHINE
Filed July 6 1910 66 Sheets-Sheet 54
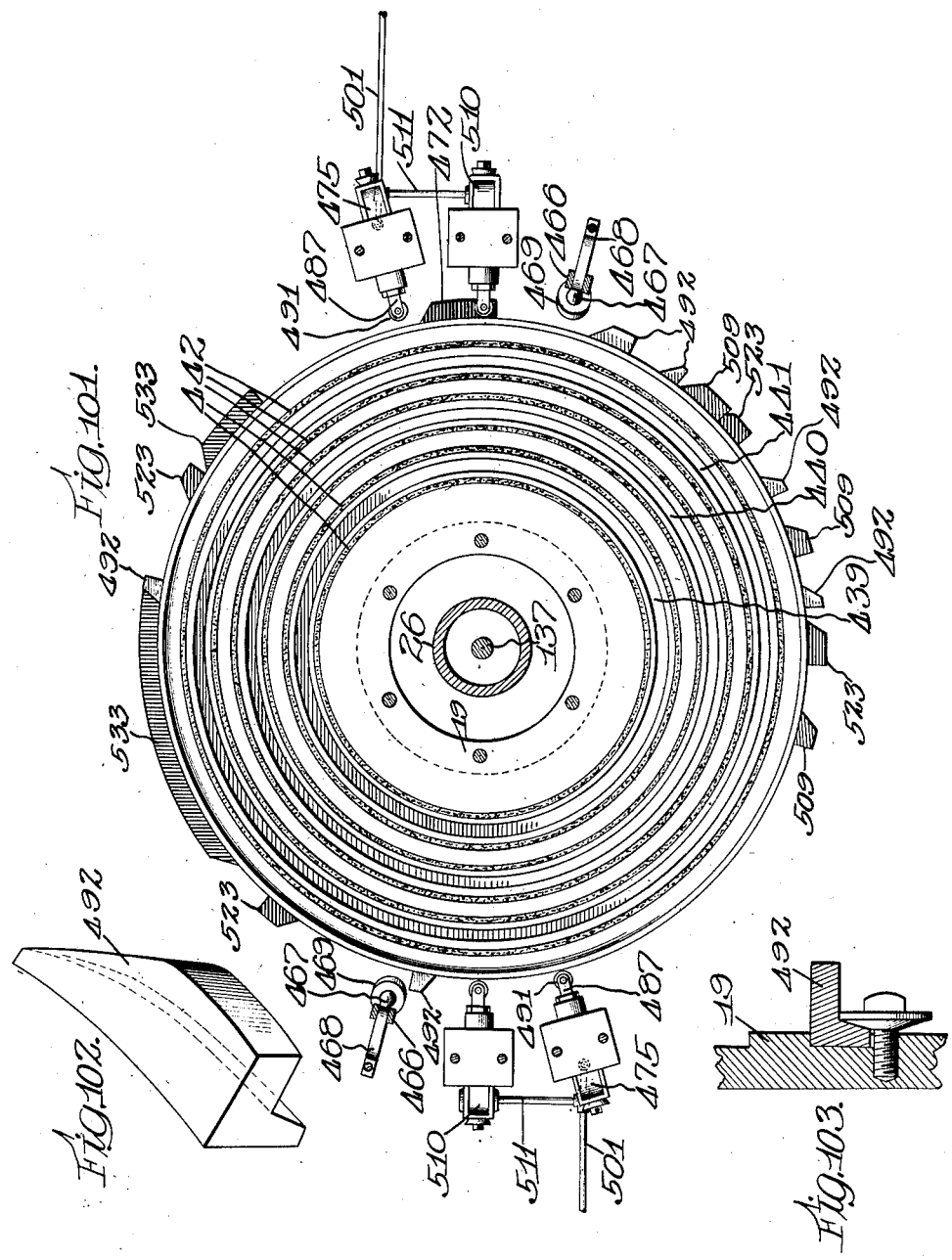

Feb. 24, 1925.
A. KADOW
1,527,556
GLASS WORKING MACHINE
Filed July 6 1910
66 Sheets-Sheet 55
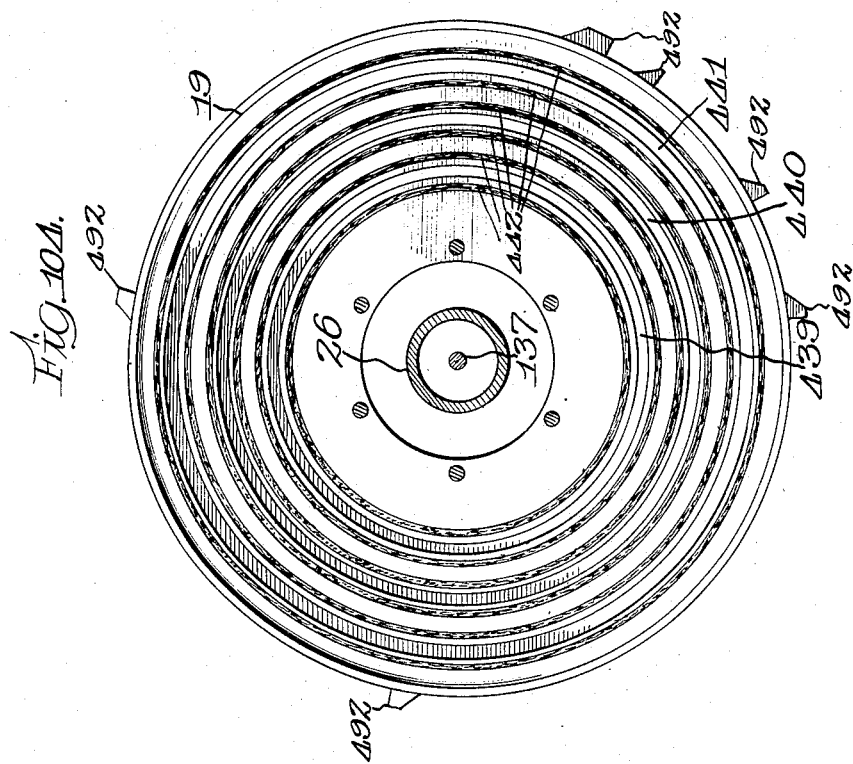
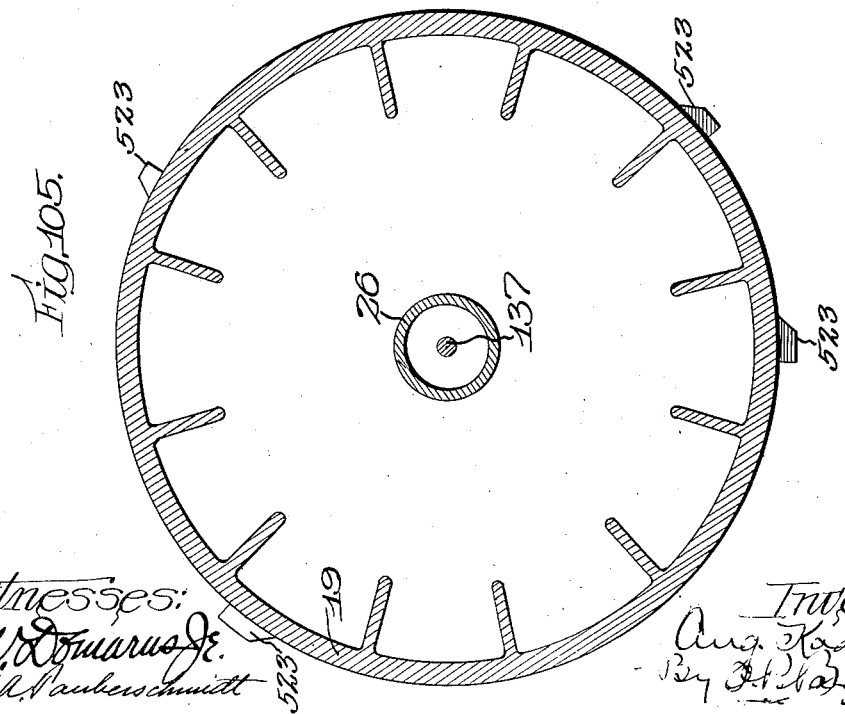

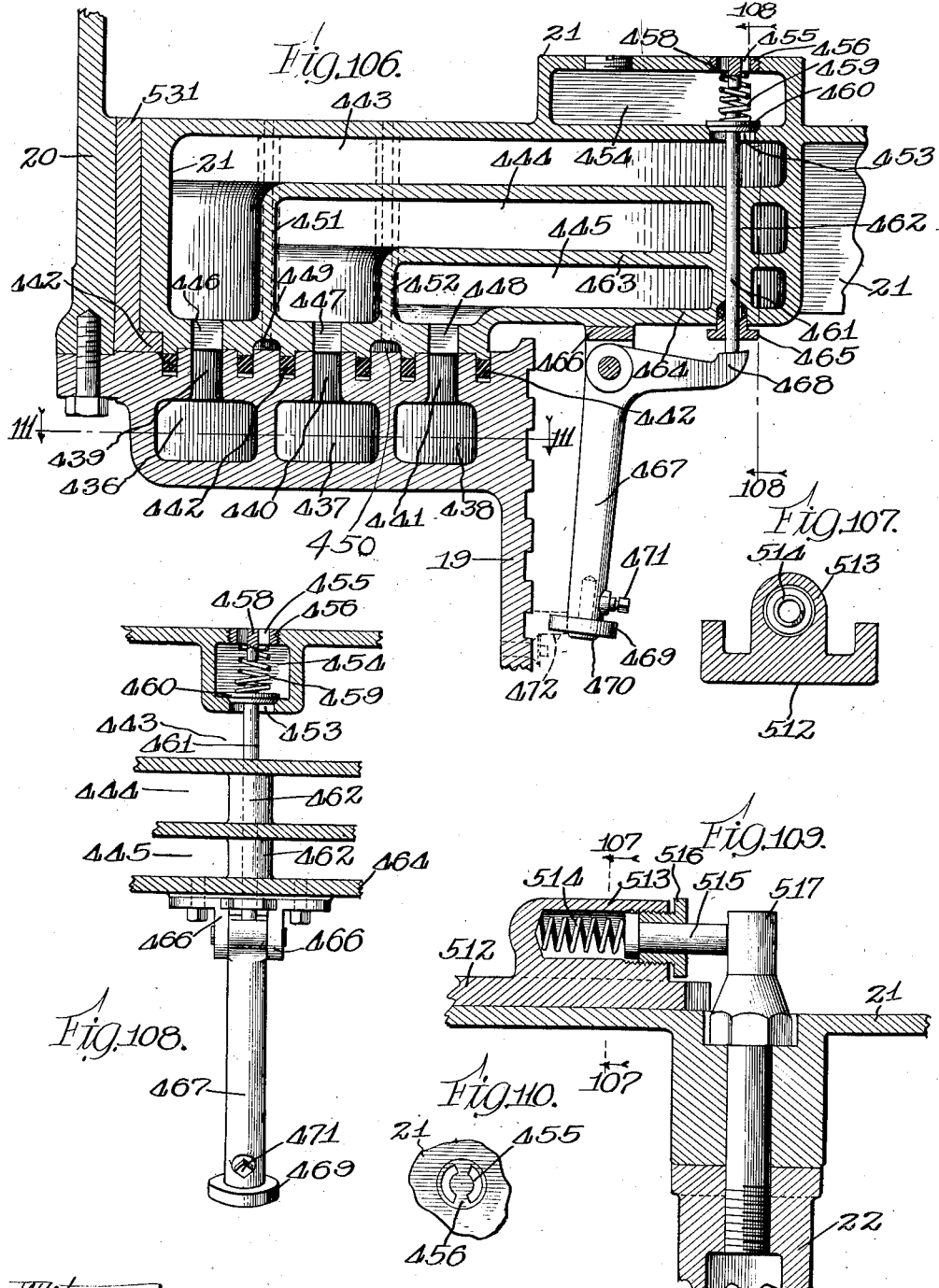

Feb. 24, 1925.
A. KADOW
1,527,556
GLASS WORKING MACHINE
Filed July 6 1910
66 Sheets-Sheet 57
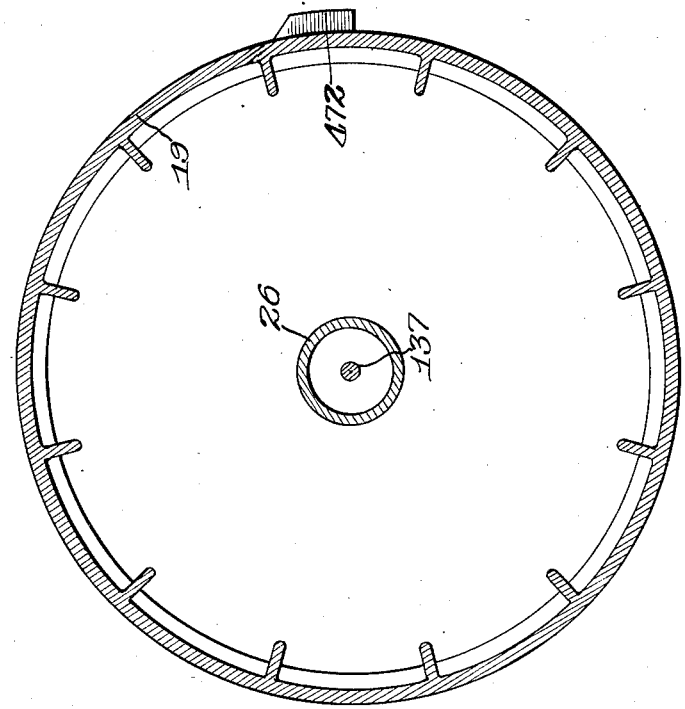
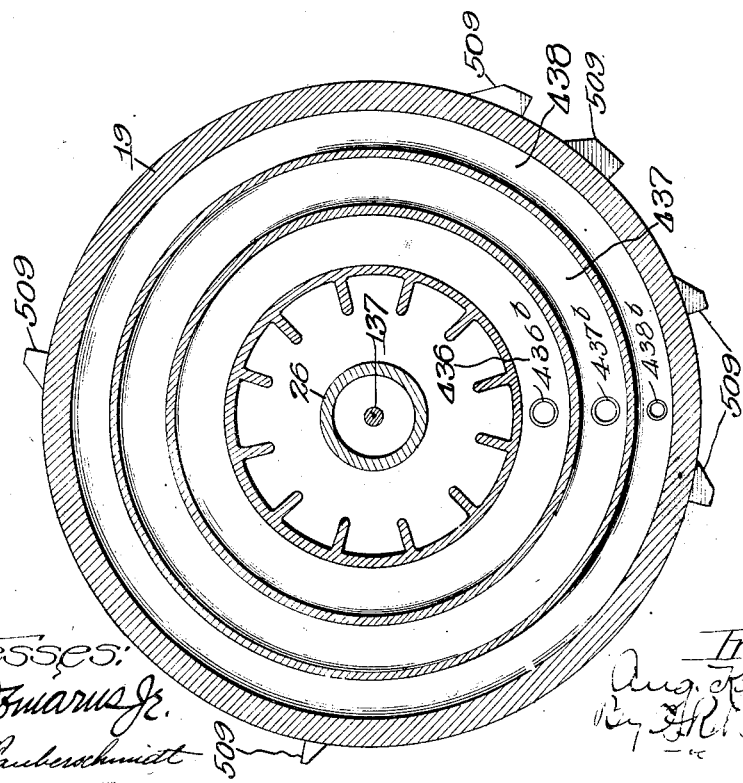

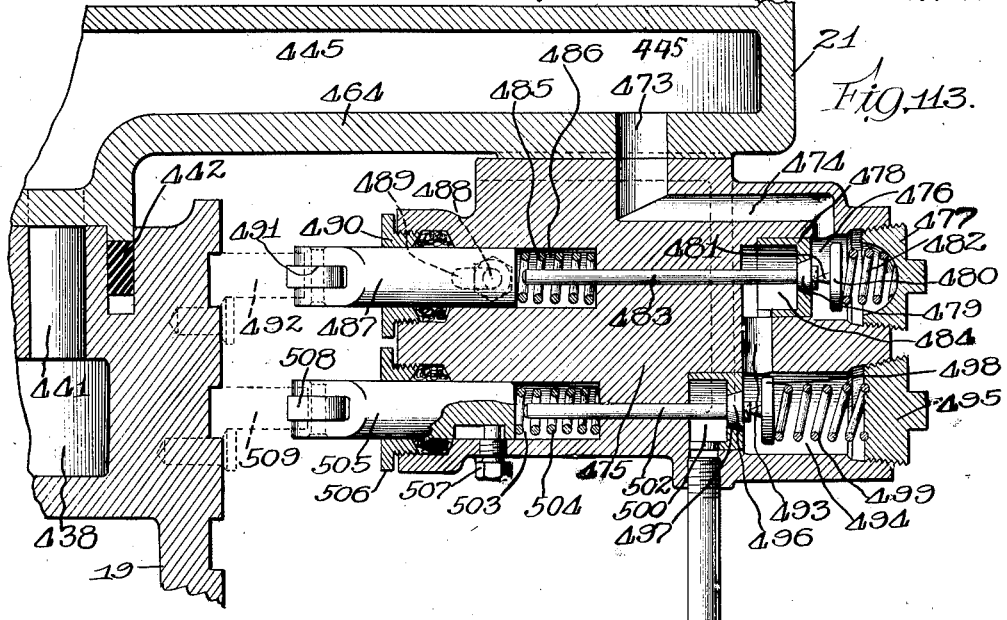
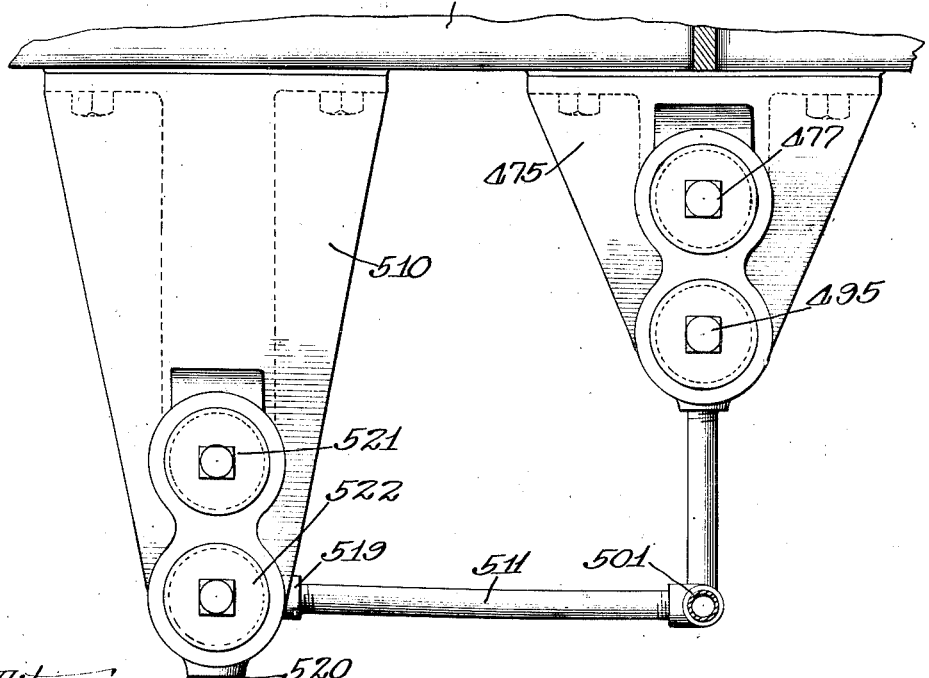

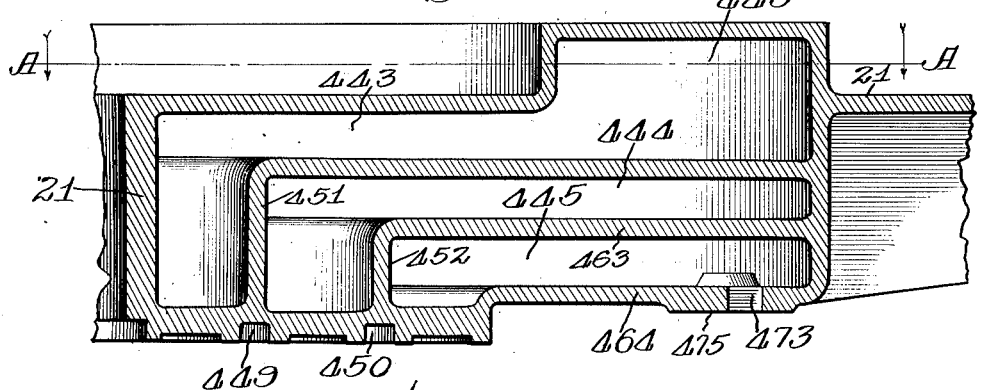
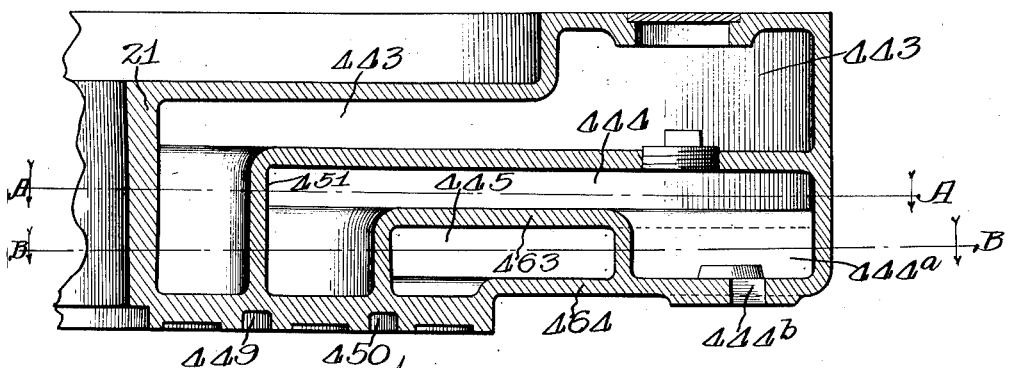
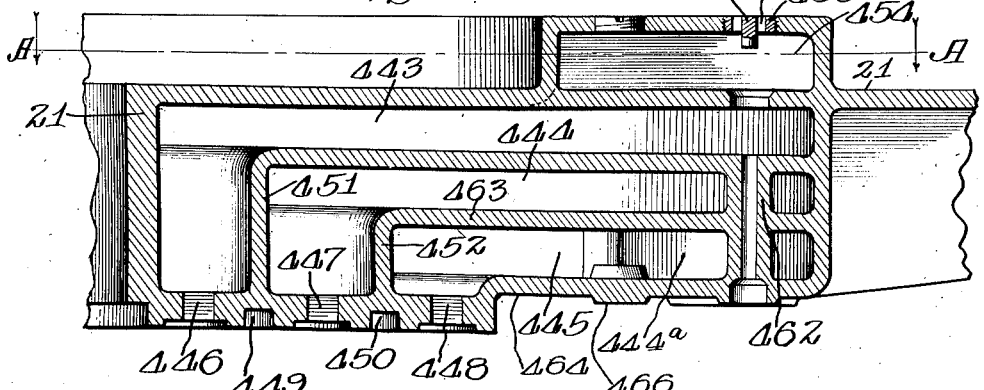

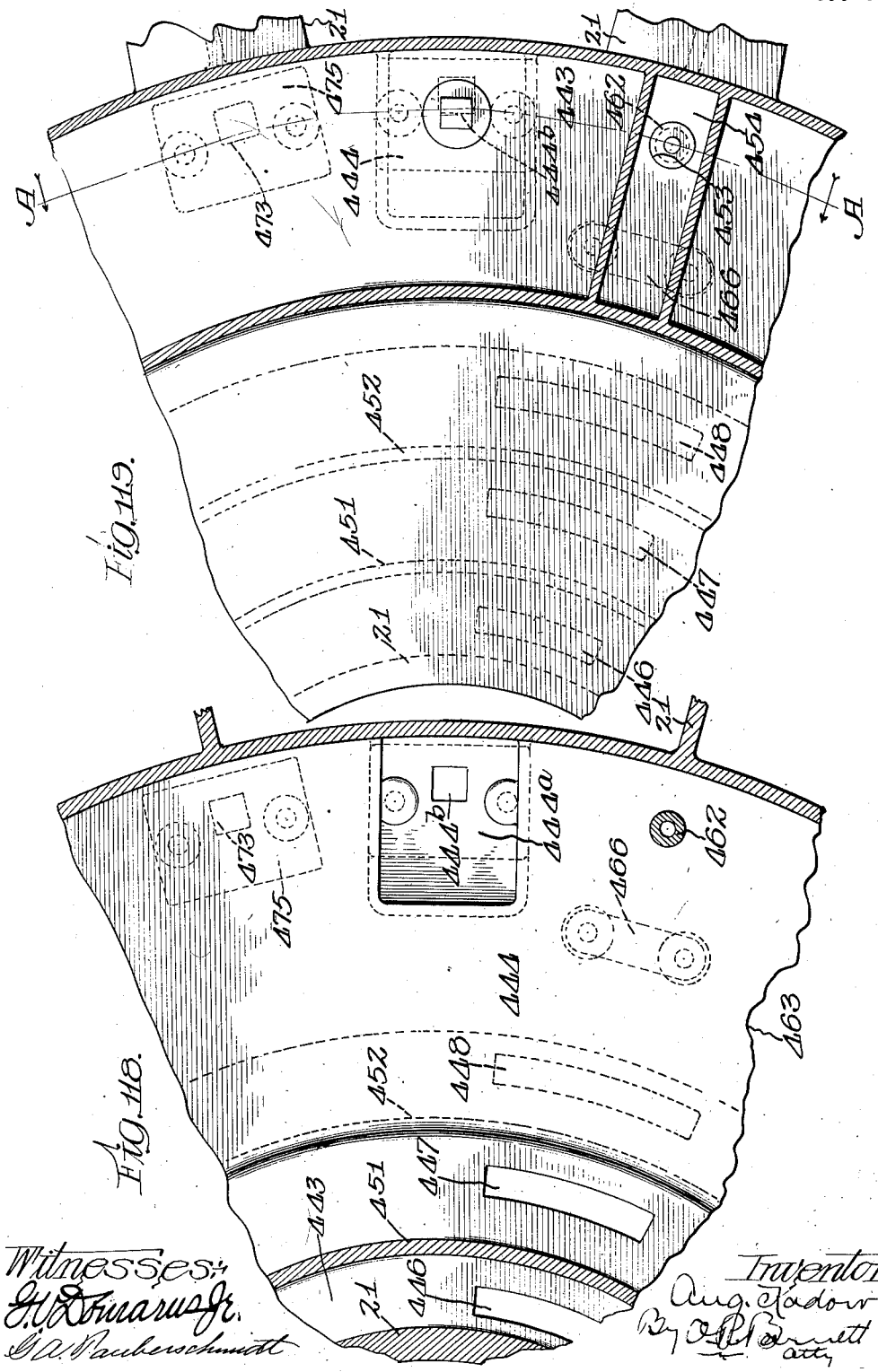

Feb. 24, 1925.
A. KADOW
1,527,556
GLASS WORKING MACHINE
Filed July 6 1910
66 Sheets-Sheet 61
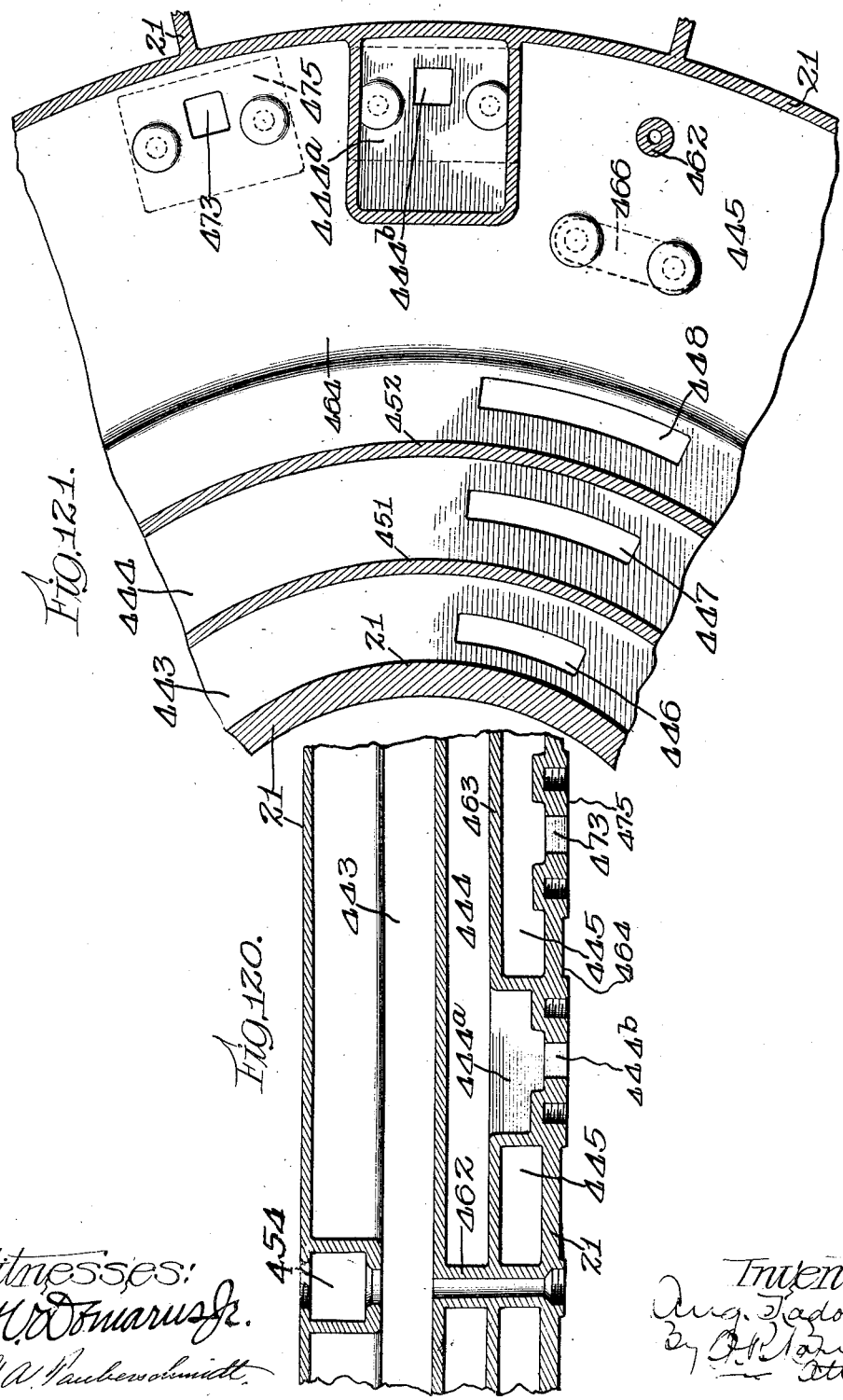

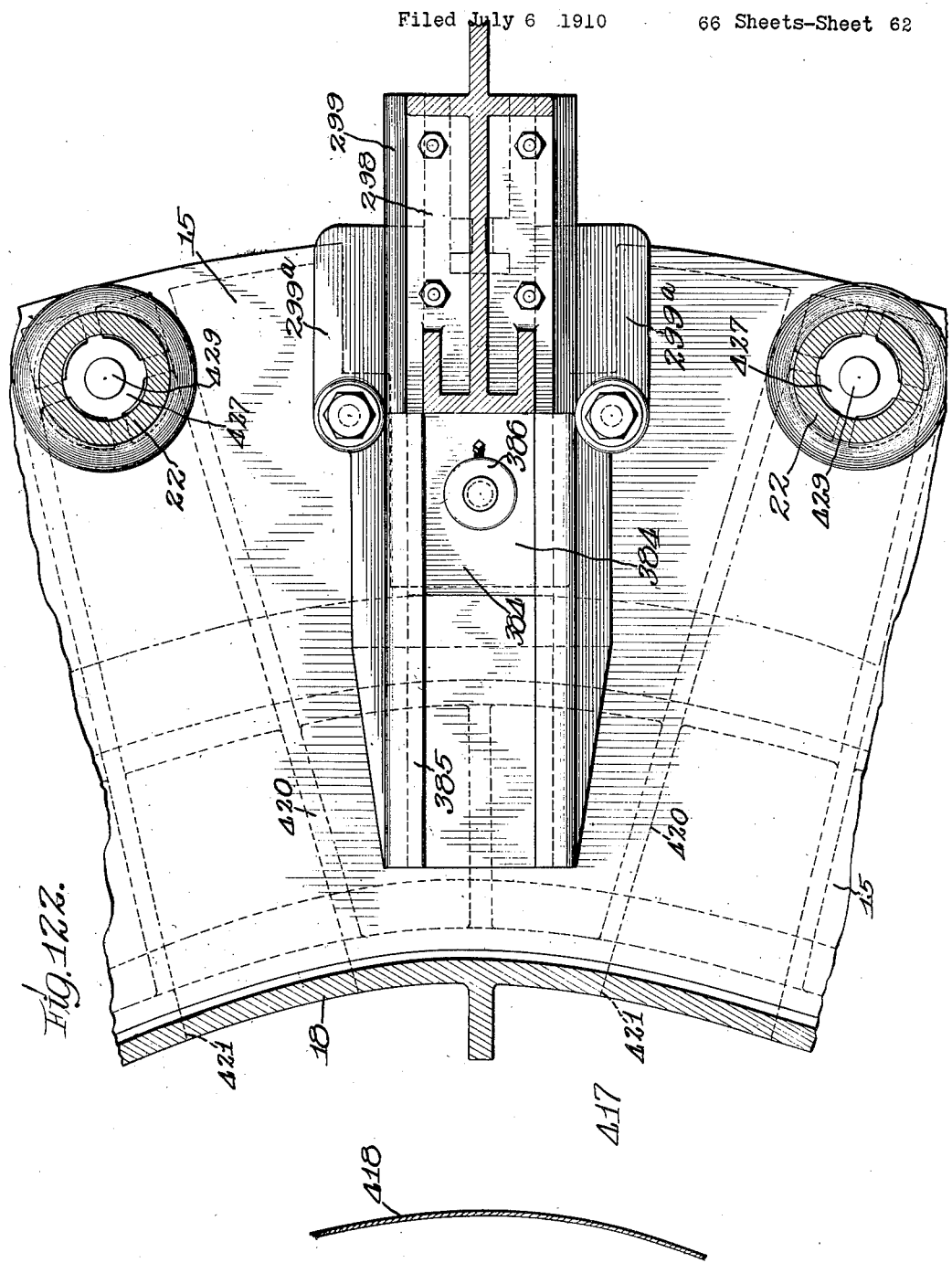

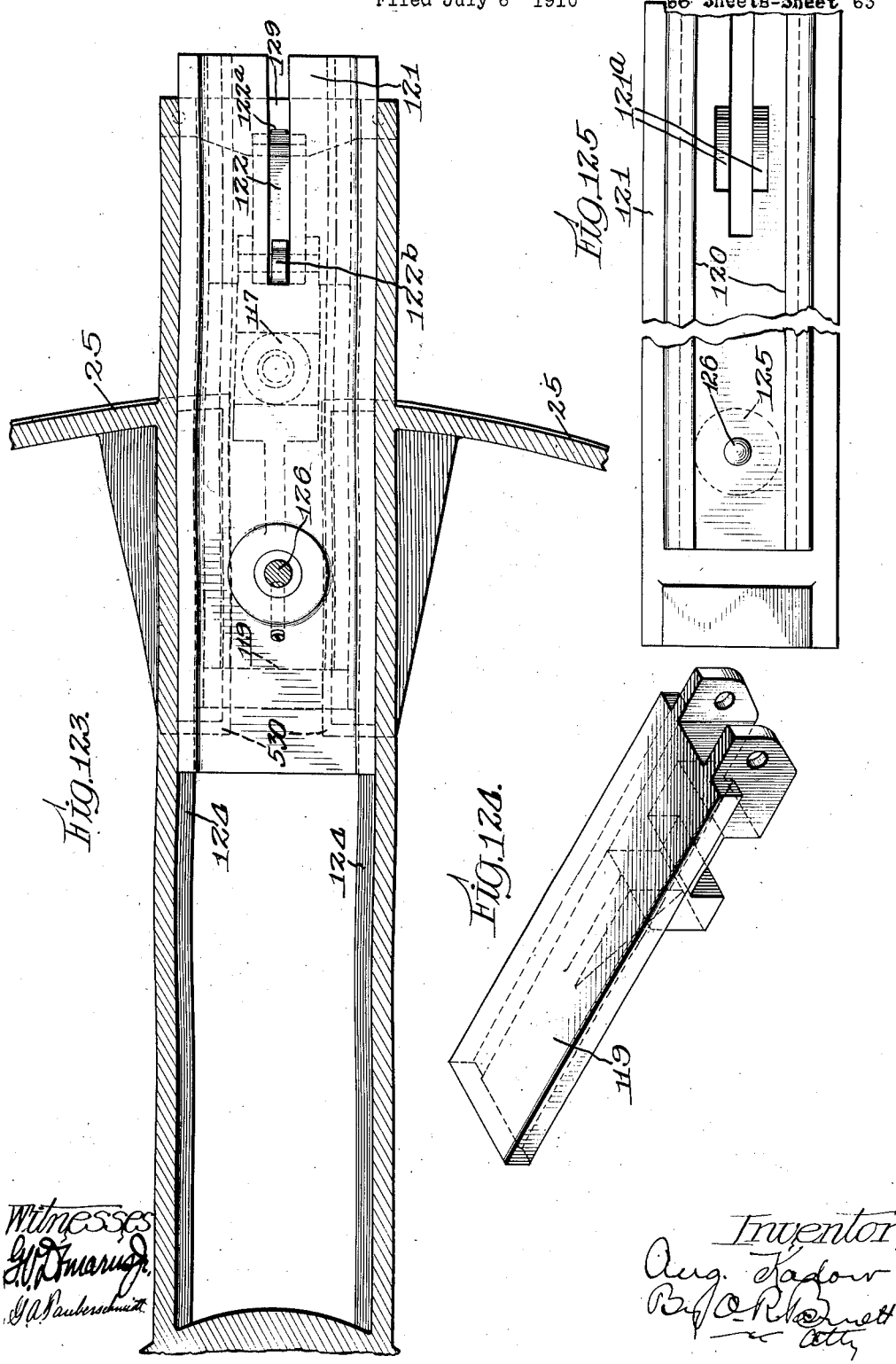

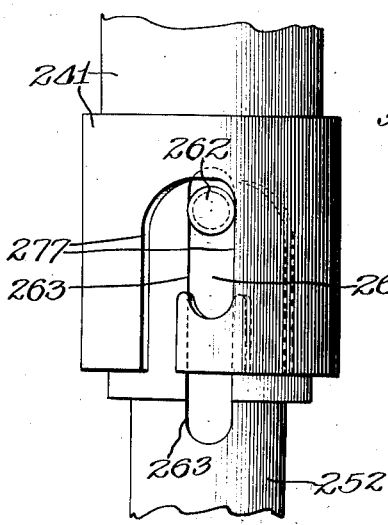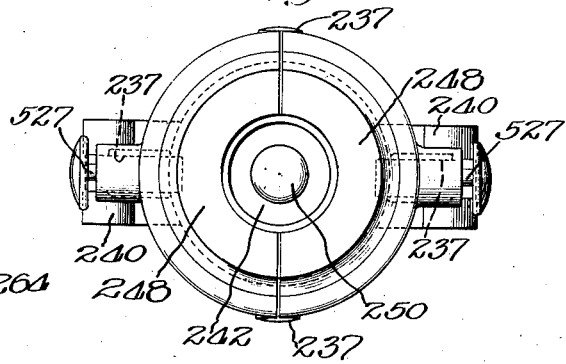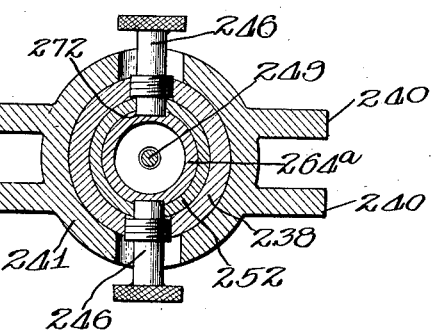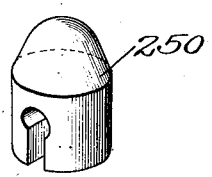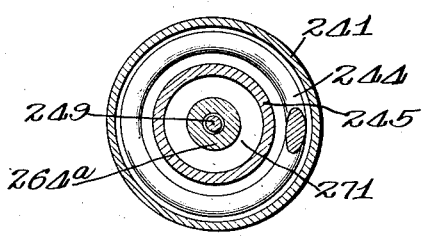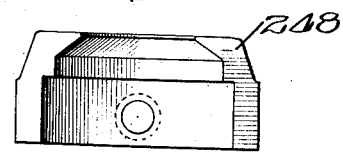

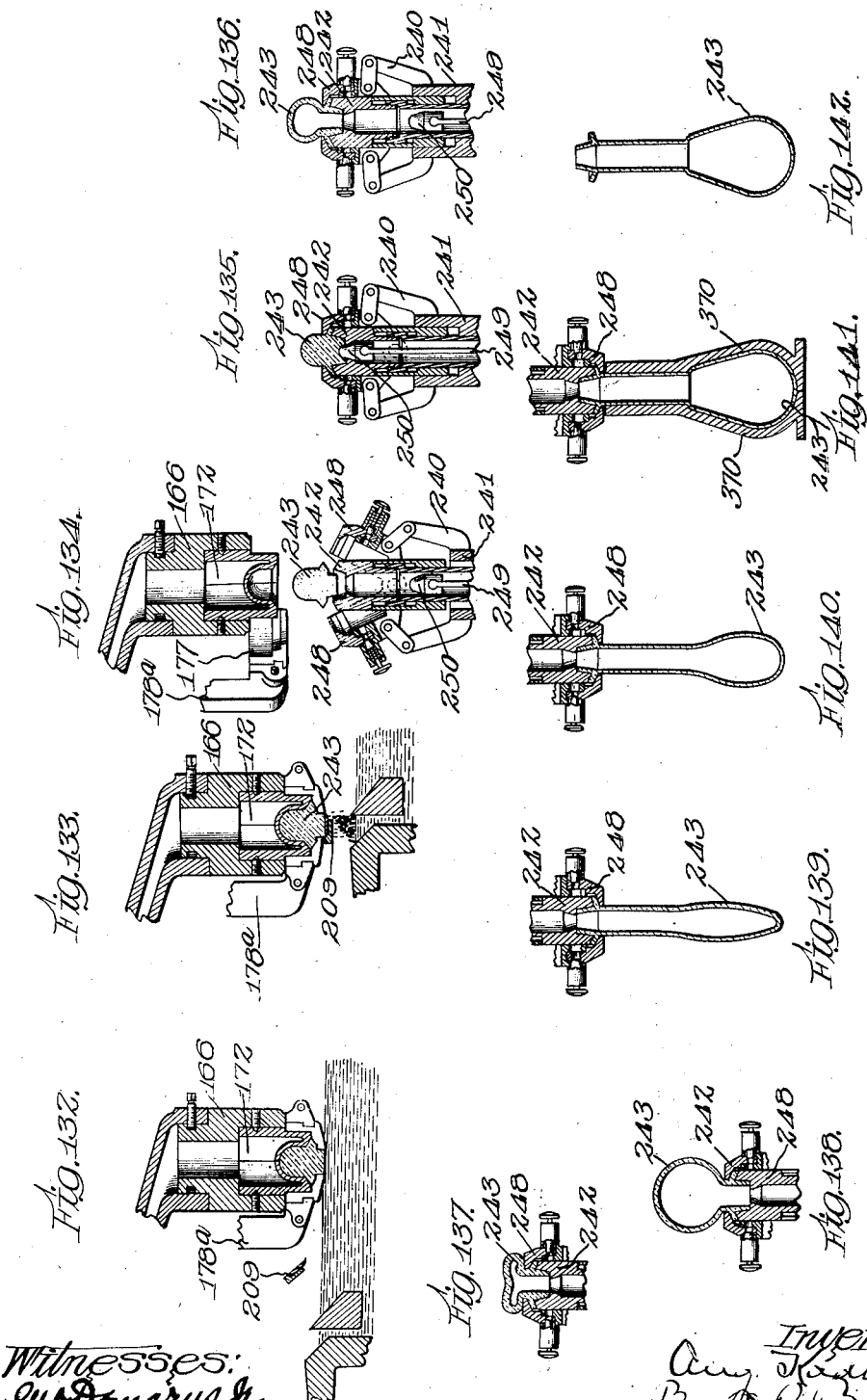

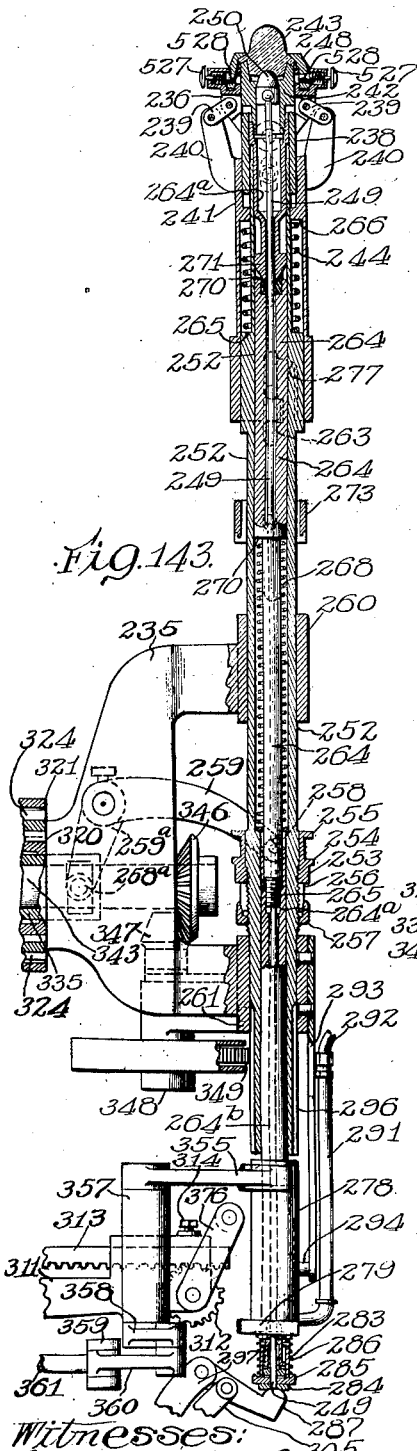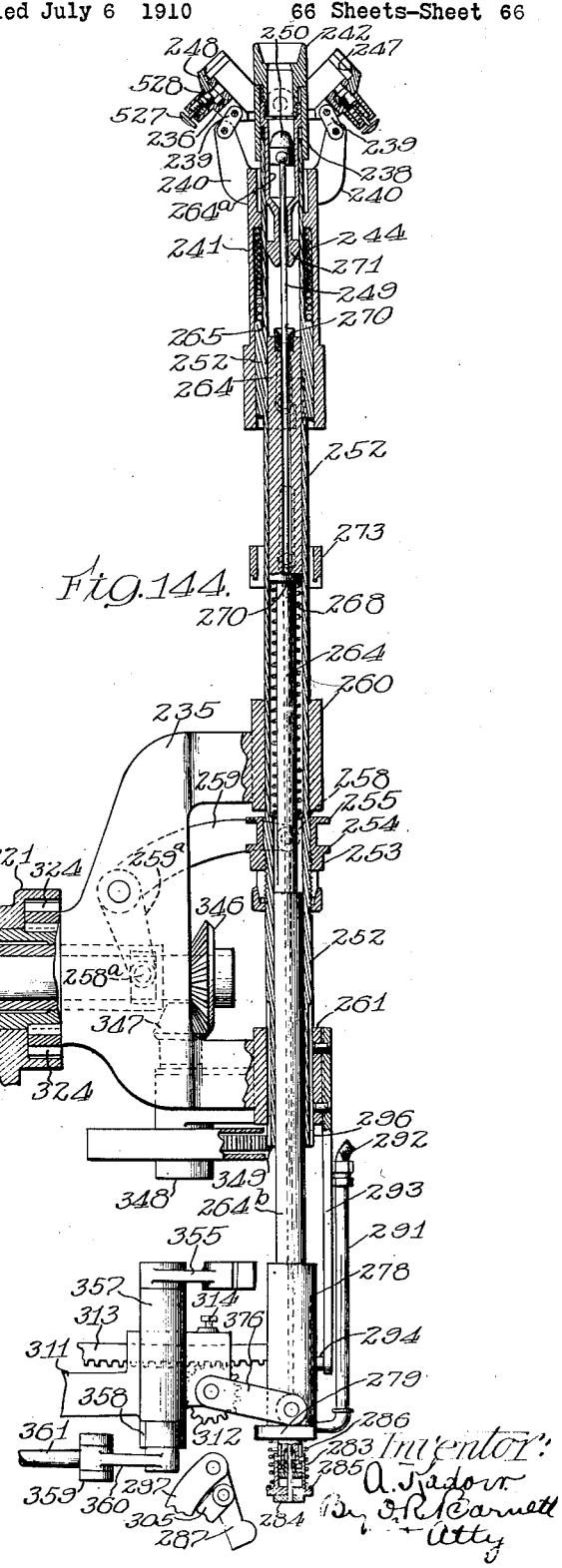

Patented Feb. 24, 1925.

1,527,556

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-WORKING MACHINE.

Application filed July 6, 1910. Serial No. 570,621.

*To all whom it may concern:*

Be it known that I, AUGUST KADOW, a citizen of the United States, residing at Toledo, in the county of Lucas and State of Ohio, have invented certain new and useful Improvements in Glass-Working Machines, of which the following is a specification.

My invention relates especially to improvements in machines for gathering and working glass, and relates particularly to that type of machine which operates continuously to gather the metal from a furnace or pot and to automatically blow the glass into desired forms in molds.

My invention is peculiarly useful in that type of machine which rotates continuously on a vertical axis and carries one or more units which successively dip into the vessel containing the metal, especially if such vessel be a glass pot, automatically gather the metal, and deliver it to mechanism which swings out the resulting blank and then brings it to the desired form in a paste mold in a manner heretofore accomplished only by hand.

While my invention is particularly valuable along the lines above indicated, it is by no means limited either to the type of machine which rotates continuously, or to that type of machine which gathers its metal from a glass pot, or to that type of machine in which the blank is swung out and then finished in a paste mold, for in many respects my invention is adapted to mechanically gather the metal from any form of glass pot or furnace and to form the metal so gathered into desired shape, either with or without swinging out the blank and rotating it in a paste mold.

The object of my invention is to provide a relatively simple, rapid, reliable and efficient machine for mechanically producing a wide range of blown glassware, either as finished articles or as blanks for further working, as the case may be.

Among the more specific features and objects of my invention, I note:

An improved method of manipulating the glass gathered by the machine so that the "shear" resulting from cutting off surplus metal will not show on the article when it leaves the machine.

An improved method of mechanically manipulating and blowing the plastic blank so as to obtain a proper distribution of glass in the finished article.

Improved mechanism for readily raising and lowering the machine especially to adapt it to work from varying levers of the metal in the furnace, whereby a single attendant can readily adjust the height of a machine weighing many tons.

Improvements in the gathering mechanism, whereby (1) the gathering mechanism will automatically move into the glass pot or furnace to gather the metal and will move back out of the furnace when the proper quantity of metal has been gathered, and (2) while gathering the metal, will remain stationary in its lateral relation with the working opening of the furnace, while the main machine continuously travels and (3) will automatically be returned to its original position on the main machine so as to make up the distance lost while its travel with the machine is arrested while gathering metal from the pot or furnace.

Improvements in the cut-off mechanism, whereby the surplus metal gathered by the machine is cut off and dropped wherever desired so as not to chill the metal at the working point in the pot or furnace.

Improvements in the method by which the metal is gathered and is released from the gathering mechanism so as to avoid distortion of the blank and improper distribution of metal in the blank.

Improvements in the mechanism whereby the blank is transferred from the gathering mechanism to the blowing mechanism.

Improvements in the blowing mechanism and method especially with reference to the control of the compressed air supplied thereto so as to secure a proper distribution of glass in the blank.

Improvements in the mechanism whereby the spindle swings out the blank in forming such articles as electric light bulbs, in a manner analogous to that in which a blank is swung out when being blown by hand.

Improvements in mechanism whereby the blank at the proper moment is inserted in a paste mold and automatically rotated and blown in the closed mold, in a manner analogous to hand work.

Improvements in the mold operating mechanism, whereby the paste mold, if such be used, automatically receives the blank and releases the blank at the right moments, and is dipped into water at proper intervals.

Many of these features are separately useful and usable apart from the mechanism with which I have associated them in what I consider to be a preferred form of machine as an entirety, but, aside from these features considered by themselves, a prime object of my invention is to associate some or all of these features with each other, so correlated and timed as to produce a mechanism which, for example, in the making of electric light bulbs, will operate continuously around a vertical axis carrying one or more units, each of which units comprises co-operating mechanisms whereby the molten metal will be gathered from a pot or working tank, the surplus metal cut off so as to leave no trace of the "shear" on the finished article, the gathered metal delivered to the spindle without objectionable distortion or objectionably unequal distribution of the metal, will be automatically swung and blown to the proper shape for insertion in a paste mold, will be automatically received by the paste mold and rotated and blown to final form in the paste mold with the metal properly distributed in the article so formed, and the article thus formed will be automatically delivered, and the mold automatically dipped in water and prepared to receive the next blank, which operation, from the gathering of the blank to the delivery of the blown and sufficiently cooled article from the mold, shall be continuous and which series of operations shall be automatically continued by each unit as long as the machine continues in operation.

Another object of my invention is to provide means whereby the gathering mechanism may be put out of operation without stopping the operation of the machine as an entirety, and in such manner that the gathering mechanism can only be put into or out of operation at a certain time in each cycle of rotation of the machine.

These and such other objects as may hereafter appear are attained by my invention, a preferred embodiment of which, in a machine designed especially for the blowing of electric light bulbs, is shown in the accompanying drawings in which:

Fig. 1 is an elevation of a machine shown as provided with two gathering and glass forming units, although adapted to be supplied with six such units, but as the additional units would be mere duplications of those shown, they are, for purposes of clearer illustration omitted.

Figs. 2, 3, 4, 5, 6, and 7 together show, in enlarged detail, the same view which appears as an entirety in Fig. 1, but this enlarged detail shows a vertical sectional view of the machine shown in Fig. 1, Fig. 2 showing the upper left hand section, Fig. 3 the middle left hand section, Fig. 4, the lower left hand section, Fig. 5 the upper right hand section, Fig. 6 the middle right hand section, and Fig. 7 the lower right hand section.

Fig. 2ª is an enlarged detail of the bracket carrying the spindle.

Fig. 8 is a horizontal, sectional view on the line 8—8 of Figs. 1, 4 and 7, looking in the direction indicated by the arrows.

Fig. 9 is a horizontal, sectional view on the line 9—9 of Figs. 1, 4 and 7, looking in the direction indicated by the arrows.

Fig. 10 is a plan view of the top spider.

Fig. 11 is a plan view, looking down on the top of the machine as shown in Figs. 1, 2 and 5.

Fig. 12 is a view, partly in vertical section, on the line 12—12 of Figs. 1 and 5, looking in the direction indicated by the arrows.

Fig. 13 is an enlarged longitudinal, sectional detail of the gathering ram and its associated mechanisms.

Fig. 14 is a perspective view of the ram dog.

Fig. 15 is an enlarged detail, partly in section, of the ram and some of its associated mechanisms, showing the ram projected into the furnace in gathering position.

Fig. 16 is an enlarged detail, partly in section, of the gathering end of the ram and of the upper end of the blow-pipe in position where the gathering mechanism is about to deliver the blank to the spindle.

Fig. 17 is an enlarged detail on the line 17—17 of Fig. 16, looking in the direction indicated by the arrows.

Fig. 18 is an enlarged transverse sectional view of the raising and lowering mechanism, on the line 18—18 of Fig. 9 looking in the direction indicated by the arrows.

Fig. 19 is an enlarged detail, in elevation, of a part of the raising and lowering mechanism shown at the bottom of Fig. 1.

Fig. 20 is an enlarged detail of a part of the raising and lowering mechanism.

Fig. 21 is a detail of the gearing, whereby the machine is moved to and from the furnace.

Figs. 22 to 26, inclusive, show details of the raising and lowering mechanism.

Fig. 27 shows details of a part of the gearing for raising and lowering the machine, and also of the hand lever and a part of the connection whereby the dog controlling or safety device is operated.

Figs. 28 to 30 show enlarged minor details of the safety operating device.

Figs. 31 and 32 are details of the driving mechanism.

Fig. 33 is a plan view, showing in enlarged detail, the ram swinging mechanism and associated parts.

Fig. 34 is a plan view of the ram housing and ram and associated parts.

Fig. 35 is an enlarged detail of the inner end of the ram carriage and ram, illustrating the action of the cam controlling the opening of the neck molds.

Fig. 36 is a transverse sectional view on the line 36—36 of Fig. 35.

Fig. 37 is a detail of the bracket supporting the cam 233 for actuating the cut-off device.

Fig. 38 is a plan view of the ram swinging slide.

Fig. 39 is a plan view of the ram.

Fig. 40 is a side elevation of Fig. 39.

Fig. 41 is a plan view of the ram carriage.

Fig. 42 is a side elevation of Fig. 41.

Figure 4:
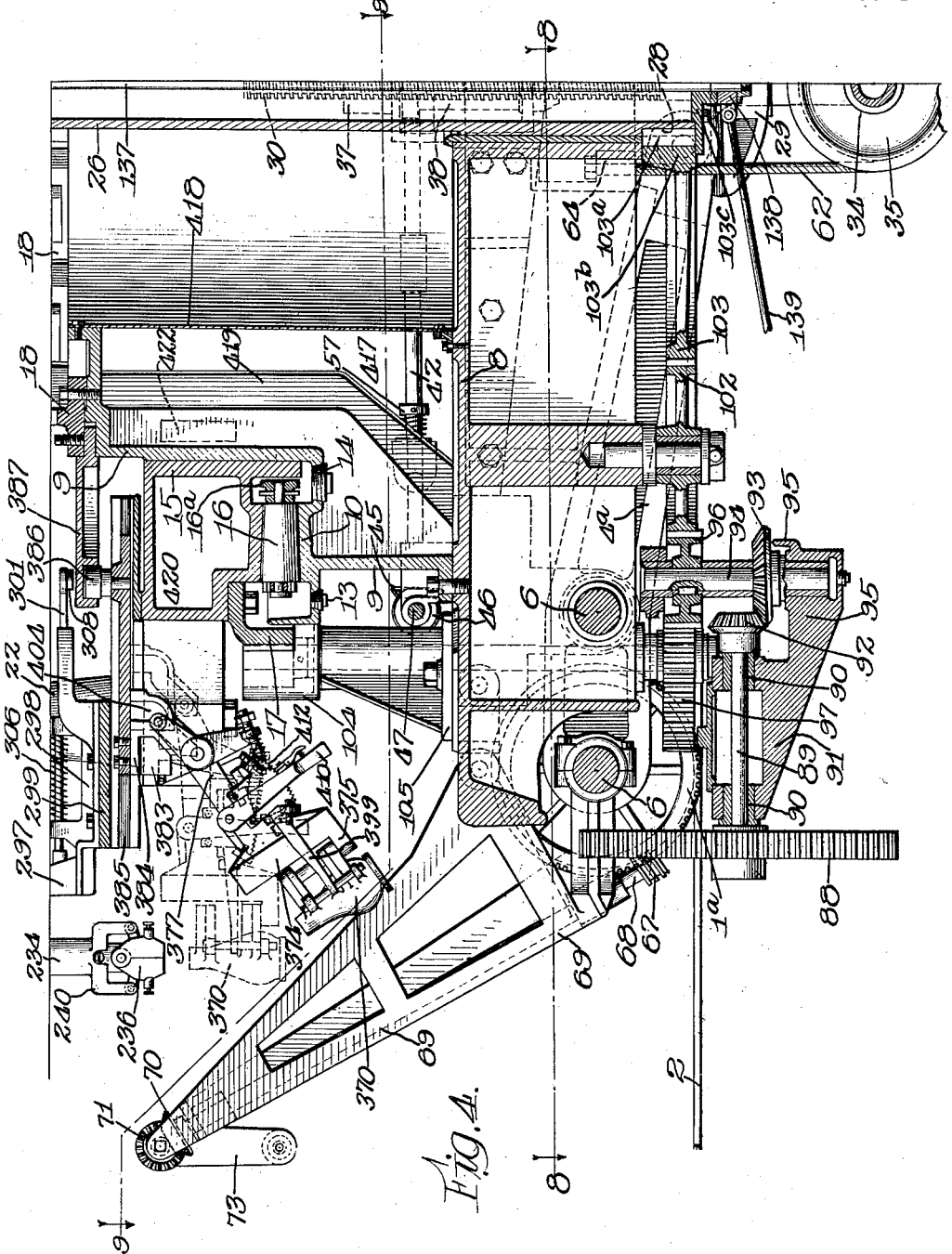
Figure 43:
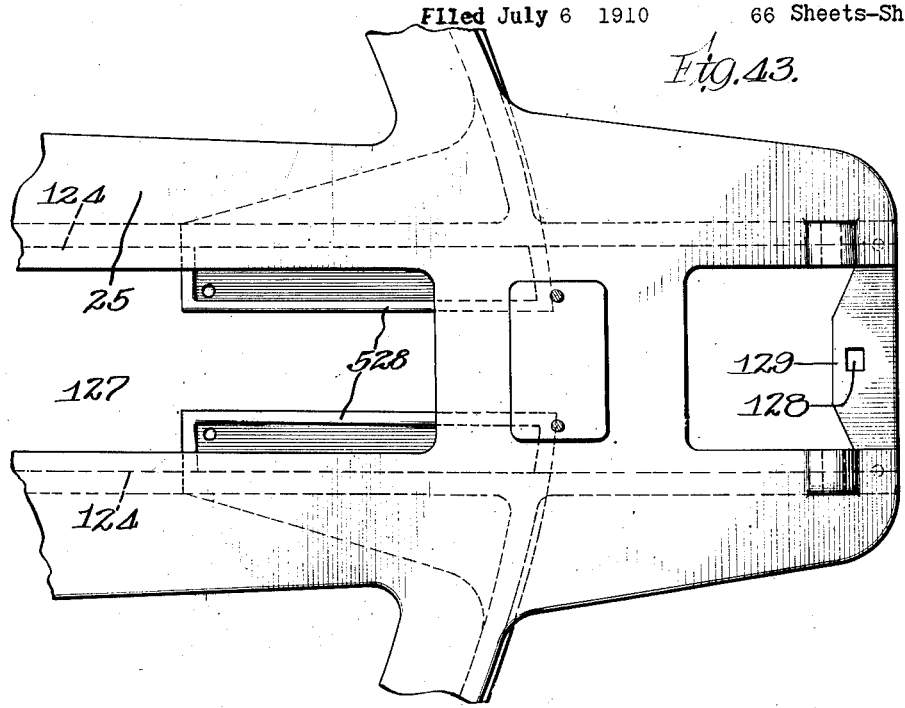

Fig. 43 is a fragmentary plan view of the ram slide support 25.

Figure 44:
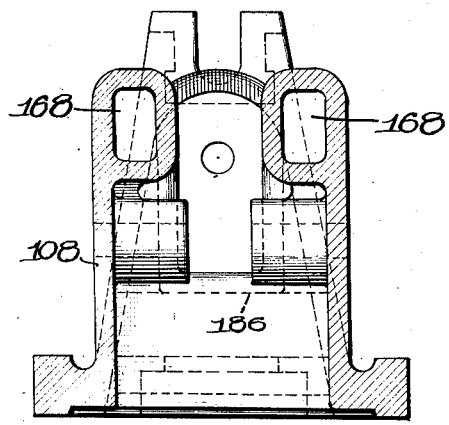

Fig. 44 is a transverse sectional view of the ram on the line A—A of Fig. 40, looking in the direction indicated by the arrows.

Figure 45:
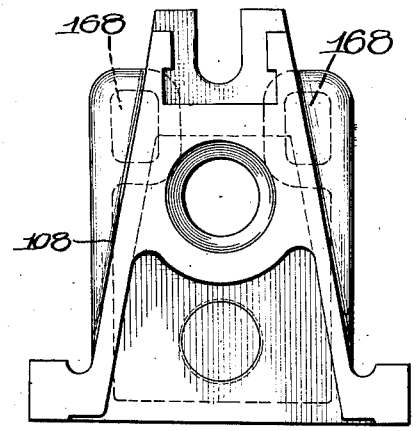
Figure 62:
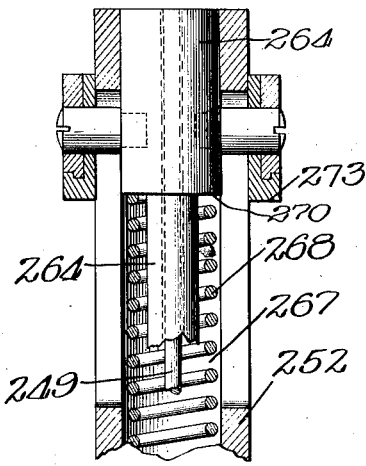
Figure 64:
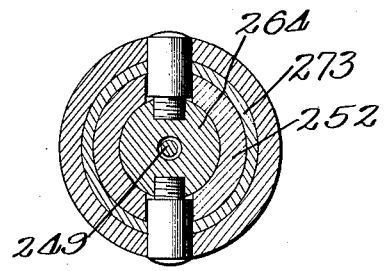
Figure 63:
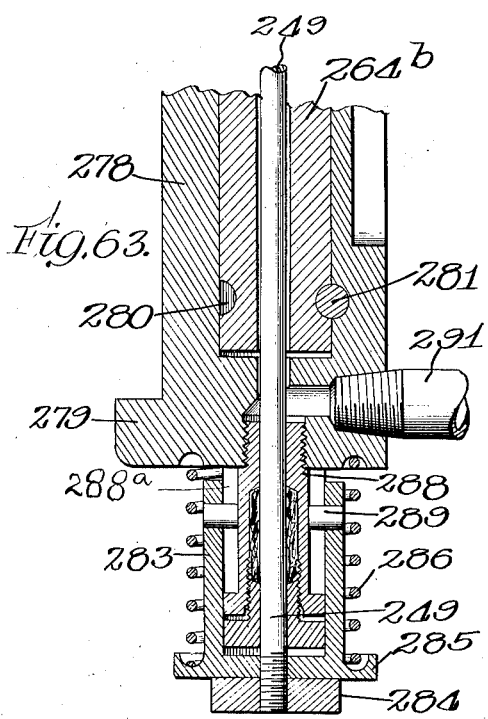
Figure 65:
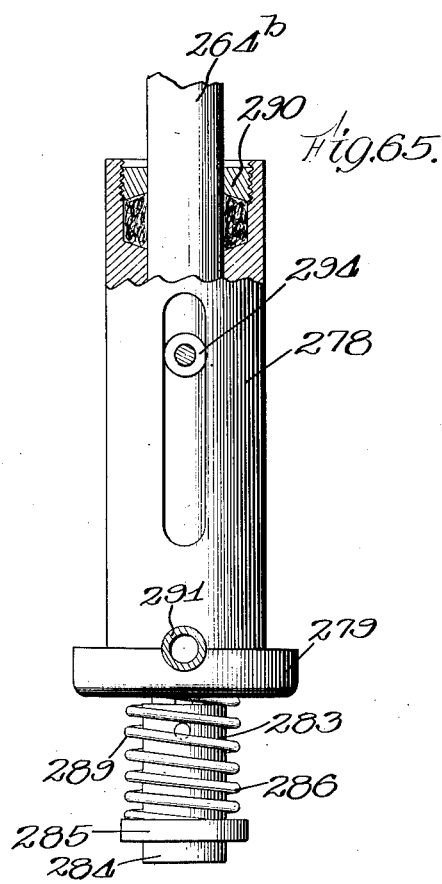

Fig. 45 is an end elevation of the ram.

Fig. 46 is a plan view, partly in section, showing the neck molds and a part of their operating connections, and showing a part of the cut-off mechanism in its relation to the neck molds just after it has operated to cut off the surplus metal.

Fig. 47 is a side elevation of the gathering end of the ram and of the cut-off mechanism shown in Fig. 46.

Fig. 48 shows a sectional detail of the neck molds.

Fig. 49 is a vertical, sectional detail of the blank mold.

Fig. 50 is a perspective view of the cut-off knife and plate.

Fig. 51 is an enlarged detail showing the operation of the mechanism actuating the cut-off knife.

Fig. 52 is a perspective view of the inclined plane or cam which operates the cut-off knife.

Fig. 53 is a side elevation of a section of the air cam section of the central drum, showing the mounting and location of various of the air valve operating cams.

Fig. 54 is a plan view of the ram swinging cam, showing two ram swinging slides, that at the right hand of the figure being in the position corresponding to the position of the ram when the neck molds are about to deliver the blank to the spindle, and that on the left of the figure being in the position corresponding to the position of the ram after it has been swung forwardly after delivering the blank to the spindle or blow-pipe.

Figs. 55, 57 and 58 in the order named constitute a complete longitudinal sectional view of the spindle (except for the part of the lower end which is shown in elevation) with the blank sealed in the blowing end of the spindle.

Fig. 56 is a vertical sectional view through the upper end of the spindle at right angles to Fig. 55.

Figs. 55ª to 58ª, both inclusive, show a continuous sectional view of the spindle with its various parts in the position which they occupy when the spindle jaws are open.

Fig. 59 is an enlarged detail on the line 59—59 of Fig. 6, looking in the direction indicated by the arrows.

Fig. 60 is a vertical sectional detail taken radially of the machine showing various cams, cam slides and gears, which are shown in the corresponding view in Fig. 6.

Fig. 61 is a plan view of one of the spindle rotating slides.

Fig. 61ª is a perspective view of the spindle lifting bell crank lever.

Figs. 62 to 65 are enlarged details of various parts of the spindle.

Fig. 66 is a plan view of the spindle raising and lowering cam and two of the slides actuated thereby.

Fig. 67 is a plan view of the spindle rotating cam and slides.

Fig. 68 is a plan view of the spindle swinging cam and slides.

Fig. 69 is an enlarged detail showing, in front elevation, the finishing mold carrier, the spindle lifting bell crank lever and part of the centering device.

Fig. 70 is a plan view of the spindle centering device including the slide which operates it, and a fragment of the cam which actuates the slide.

Fig. 71 is a perspective view of one of the centering levers or jaws.

Figure 72:
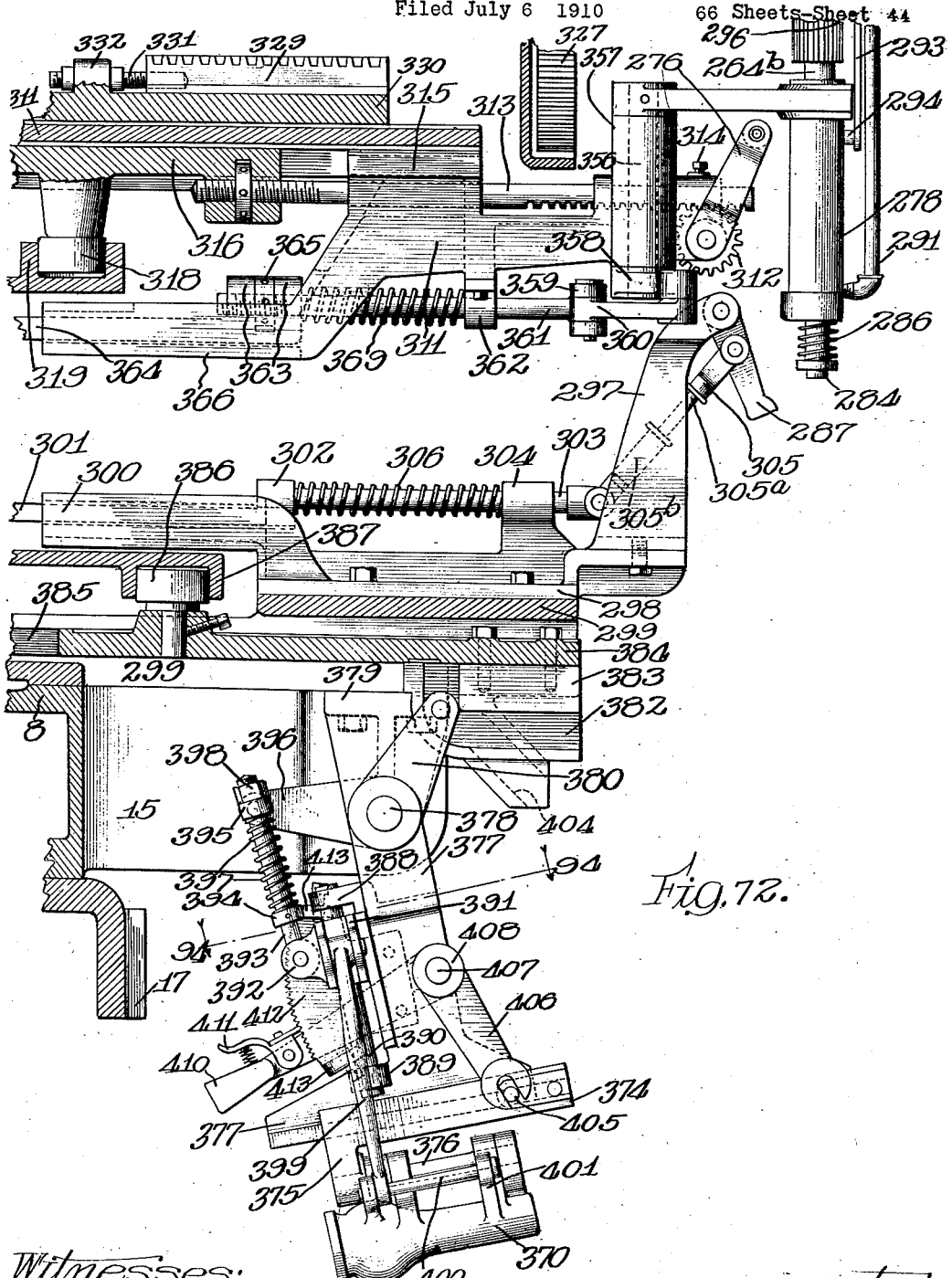

Fig. 72 is an enlarged detail, partly in section and partly in side elevation, of the centering device, the finishing mold, parts of their respective actuating mechanisms, and parts of one of the slides and cams actuating one of the plungers of the spindle.

Fig. 73 is a plan view of certain details relating to the spindle swinging mechanism.

Fig. 74 is a detail, partly in plan view and partly in section, of parts of the mechanism of the centering device.

Fig. 75 is a transverse sectional view on the line A—A of Fig. 74, looking in the direction indicated by the arrows.

Fig. 76 is a plan view of the mechanism which actuates the second plunger of the spindle.

Fig. 77 is a plan view of the yoke of the spindle centering device.

Fig. 78 is a perspective view of the cam which actuates the mechanism shown in Fig. 76.

Figure 79:
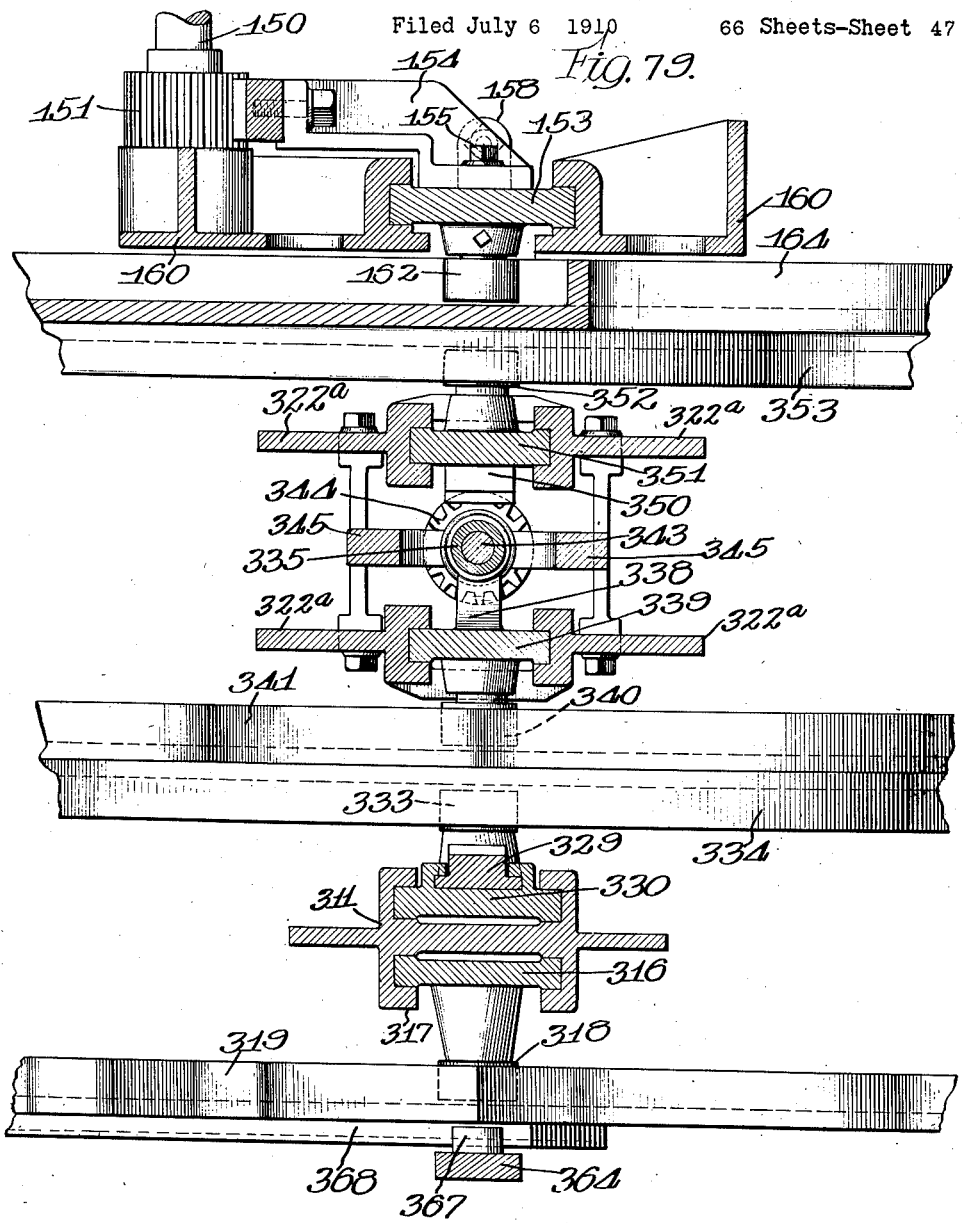

Fig. 79 is an enlarged vertical sectional view, looking towards the center of the machine, the section being taken through certain of the cams and cam actuated mechanisms in their relative positions at one point in the revolution of the machine.

Figure 80:
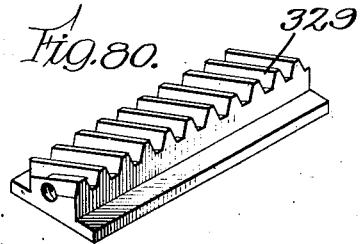

Fig. 80 is a perspective view of one of the diagonally toothed rack bars.

Fig. 81 is a detail of the joint mechanism between the main air pipe of the machine and the air trunk.

Fig. 82 is a transverse section on the line a—a of Fig. 81, looking in the direction indicated by the arrows.

Fig. 83 is a detail of a gear-shaft coupling.

Fig. 84 is a horizontal sectional view through the air section of the central drum, showing the final blowing cam. Fig. 84$^a$ is a section through the blank.

Fig. 85 is a vertical sectional view of the blank after the initial air chamber has been formed therein.

Fig. 86 is a vertical sectional view of the blank after it has received its initial puffs of air.

Fig. 87 is a vertical sectional view of the blank after it has been swung out by the blow-pipe.

Fig. 87$^a$ is a vertical sectional view of the blank swung out and further expanded by air from the blowing mechanism.

Fig. 88 is a vertical sectional view of the blank as finally delivered by the machine.

Fig. 89 is a transverse sectional view through the cam section of the central drum, illustrating particularly in plan view, the cam actuated mechanism for operating the secondary plunger of the spindle, and showing also, in dotted lines, the cam-way for the finishing mold cam.

Fig. 90 is a horizontal section through the machine, illustrating particularly the cam-way and cam-actuated mechanism for operating the yoke or spindle centering device, which is shown partly in plan view.

Fig. 91 is an enlarged detail, partly in section, through the finishing mold carrier.

Fig. 92 is an enlarged detail of a part of the mechanism for opening and closing the finishing molds.

Fig. 93 is an elevation of one of the finishing mold sections.

Fig. 94 is an enlarged detail of the finishing mold carrier on the line 94—94 of Fig. 72, looking in the direction indicated by the arrows.

Fig. 95 is a perspective view of the cam block for operating the mechanism for dipping and raising and for opening and closing the finishing molds.

Fig. 96 is another perspective view of the cam block shown in Fig. 95.

Fig. 97 is an enlarged vertical section through the bottom spider and one of the uprights or posts mounted thereon.

Fig. 98 is an enlarged plan view of one of the pads on the bottom spider, upon which one of the upright posts is mounted.

Fig. 99 is a vertical sectional detail through the blower nozzle.

Fig. 100 is a plan view of the blower nozzle.

Fig. 101 is a plan view of the air section of the central drum, showing the various cams and cam-actuated valve mechanisms.

Fig. 102 is a perspective view of one of the air valve cams.

Fig. 103 is a sectional detail, showing how the air valve cams are secured in the slots provided for them on the air section of the central drum.

Fig. 104 is a plan view of the air section of the central drum with the top spider removed, and showing the cams for actuating the uppermost of the high pressure valves.

Fig. 105 is a horizontal section through the air section of the central drum, showing the cams for actuating the relief valve.

Fig. 106 is a fragmentary sectional detail through the air-cam section of the central drum and through the top spider, showing the various air chambers.

Fig. 107 is a cross-sectional view on the line 107—107 of Fig. 109.

Fig. 108 is a vertical sectional view on the line 108—108 of Fig. 106, looking in the direction indicated by the arrows.

Fig. 109 is a sectional detail, illustrating the spring stops on the ram carriage.

Fig. 110 is a detail in plan view, showing the nipple 456 in Fig. 106.

Fig. 111 is a horizontal sectional view on the line 111—111 of Fig. 106, looking in the direction indicated by the arrows, but extending entirely across the central drum or column and showing the cams for actuating the lower of the high pressure air valves.

Fig. 112 is a horizontal section through the air section of the central drum, showing the cam for actuating the vacuum valve.

Fig. 113 is a sectional detail through the high pressure air valves and their actuating mechanism.

Fig. 114 is a front elevation of the high pressure and low pressure air valve casings.

Fig. 115 is a fragmentary vertical sectional view on the line A—A of Fig. 10, looking in the direction indicated by the arrows.

Fig. 116 is a like view on the line B—B of Fig. 10.

Fig. 117 is a like view on the line C—C of Fig. 10.

Fig. 118 is a horizontal sectional view on the line A—A of Fig. 116, looking in the direction indicated by the arrows.

Fig. 119 is a horizontal sectional view on the line A—A of Figs. 115 and 117, looking in the direction indicated by the arrows.

Fig. 120 is a vertical sectional view through the upper spider, on the line A—A of Fig. 119, looking in the direction indicated by the arrows.

Fig. 121 is a horizontal sectional view on the line B—B of Fig. 116, looking in the direction indicated by the arrows.

Fig. 122 is an enlarged detail, partly in horizontal section, looking downward toward the lower spider and illustrating particularly the mold slide and associated parts.

Fig. 123 is a plan view of the ram actuating slide.

Fig. 124 is a perspective view of the ram dog slide.

Fig. 125 is a view from below of the ram actuating slide.

Fig. 126 is a fragmentary detail of a portion of the spindle.

Fig. 127 is an end view, looking into the closed jaws of the spindle.

Fig. 128 is a horizontal sectional view through the spindle, on the line 128—128 of Fig. 56, looking in the direction indicated by the arrows.

Fig. 129 is a perspective view of the secondary plunger tip.

Fig. 130 is a horizontal sectional view through the spindle, on the line 130—130 of Fig. 56.

Fig. 131 is an elevation of one of the jaws or thimbles of the spindle.

Figs. 132 to 142, inclusive, show the successive steps in forming a bulb with my machine.

Fig. 143 is a longitudinal sectional view through the spindle with the parts in the position assumed when the blank is sealed in the spindle and showing certain connected and spindle actuating parts.

Fig. 144 is a like view showing the parts in the position assumed when the spindle jaws are open.

General description.

Before entering on a detailed description of the mechanism, a general statement as to the construction and operation of the particular embodiment of my invention shown in the accompanying drawings may serve to make the detailed description more readily understood.

The entire machine rests on four wheels (Fig. 8), so that it may be readily moved to and from the furnace. Pivoted to the axles of these wheels are four levers, and connecting each pair of levers is a shaft or journal arranged parallel to the axles of the wheels. Upon these shafts rests the base or base-plate of the machine. By means of counterweights and gears operated by a hand-wheel, as will be hereafter more fully described in detail, these levers may be swung vertically on the axles of the wheels so as to lift or lower the machine as an entirety, the axles being the fulcrums for the levers. By this means the machine may be brought to any desired level with reference to the level of metal in the glass furnace or pot.

Supported on the base of the machine, and extending to the top of the machine, is a central column or drum, built up in sections, as will be more fully explained, and provided around its periphery with a series of stationary cams.

Surrounding this central column are two spiders, one arranged near the base of the central column or drum and another arranged near its top. The upper spider is connected with and supported by the lower spider by means of a series of hollow supports or posts and these two spiders, with the connecting posts, constitute a framework which is supported on suitable bearings and continuously rotates around the central column, being driven by a suitable motor and gearing. A main gear wheel is provided with a hollow shaft which extends centrally from the bottom to the top of the machine and carries a cam-plate. This central shaft is timed, in the particular mechanism shown, to rotate six times as rapidly as the rotating frame consisting of the upper and lower spiders and their connecting posts.

Each pair of posts (six pairs being shown) is arranged to carry one complete glass working unit. The upper element of each unit is the glass gathering mechanism, the middle element is the spindle and blowing device and its operating mechanism, and the lower element is the finished mold and its operating mechanism.

With the machine adjusted to the proper height and position with relation to the furnace, its operation, in general terms, is as follows:

With the spiders and the central vertical shaft rotating, the cam carried by the rotating central shaft engages and actuates the "ram slide" six times during each complete revolution of the spiders. This is so timed that as each "ram" carrying the gathering device arrives in front of the working opening of the furnace or pot, the mechanism actuated by the movement of the "ram slide" moves the "ram" forwardly and downwardly until the gathering device is inserted in the molten metal, whereupon, by other cam mechanism, the "vacuum valve" is opened and the fluid metal is sucked up to the capacity of the gathering device. As the ram retreats, the cut-off automatically cuts off the surplus metal, preferably while the gathering device is still in the furnace or pot, so that the metal so cut off drops back into the pot, but outside of the gathering ring, the ram retreats from the working opening, and delivers the gathered metal to the spindle, which, by means of mechanism actuated by a stationary cam on the central drum, has been brought to a position in exact axial alignment with the gathering mechanism. Before delivery from the gathering mechanism to the spindle, the "vacuum valve" is automatically closed and air is admitted back of the metal in the gathering mechanism so that there will be no strain upon or distortion of the blank when it is delivered to the spindle from the gathering mechanism.

While the ram has been travelling to and from the furnace or pot, the gathering mechanism, including the ram, has ceased rotation about the central axis of the machine, although the spiders, the upper one of which carries the gathering mechanism, rotate continuously and, when the gathered metal or blank has been gathered, the gathering mechanism resumes its travel with the spiders around the axis of the machine and when the blank has been delivered to the spindle, the gathering mechanism is swung forwardly on the upper spider until it is returned to its original position, whereupon it travels uniformly with the spiders until it again comes opposite the working opening.

The spindle receives from the gathering device that end of the blank from which the surplus metal has been sheared, so that the sheared end of the blank becomes the extreme end of the neck of the finished article. As this neck is subsequently broken off and finished, the "shear" cannot possibly mar the surface or appearance of the finished article.

As soon as the spindle receives the blank, as above described, the neck of the blank is squeezed or "sealed" against the jaws of the spindle, initial puffs of air are blown into the blank, preliminarily enlarging it and distributing the metal, and then the spindle swings downwardly and then back and forth in a series of graduated oscillations or pendulum movements, air under pressure being admitted in controlled puffs to the interior of the blank through the spindle. Then the finishing mold rises and closes about the blank, whereupon the spindle rotates upon its longitudinal axis, thereby rotating the blank in the mold and, at the same time air under pressure is blown into the blank, so that the blank is blown to finished form in the mold with the metal properly distributed. As the blank at this stage is still plastic and, in its heated condition has expanded the air blown into it, air under a properly graduated pressure is further admitted to the blank as the mold is about to open and release it, so as to prevent any collapsing of the glass because of the cooling of the heated and expanded air within it.

When the molding of the blank is completed, the mold opens and releases the blank or bulb and automatically dips into a tank of water, from which it subsequently rises to receive the next blank, the jaws at the end of the spindle open and deliver the blown glass article, and the spindle swings into upright position to receive the next blank.

In the particular machine shown, the described operations of the spindle, the opening and closing of the vacuum and air ports, and the operations of the finishing mold, are controlled by the stationary cams arranged around the periphery of the central stationary column or drum, and in such relation to each other that the described operations occur in proper sequence.

With the machine shown, fitted with its full quota of glass working units, six complete bulbs will be gathered, blown and delivered in each complete rotation of the spiders.

It will thus be seen that the detailed description of the machine naturally falls under the following heads:

The frame work;
The raising and lowering mechanism;
The driving mechanism;
The gathering mechanism;
The spindle mechanism;
The mold operating mechanism;
The cams; and, incidentally,
The oiling mechanism, bearings, cooling device, and similar details.

*The frame work.*

Referring to Figs. 1, 4, 7 and 8, 1, 1, 1, and 1ª are four wheels running in pairs on tracks 2, 2ª. Each pair of wheels is connected by an axle 3 and 3ª. 4, 4 and 4ª, 4ª are levers, the levers 4ª being pivoted to the axle 3ª and the levers 4 being pivoted to the axle 3. The long arms of these levers are supported in desired position by counterweights 5, in a manner which will be described in describing the raising and lowering mechanism. 6 are shafts secured at each end in the levers 4 and 4ª, respectively, and extending between the levers through brackets or bearings 7 in the base plate 8 of the machine, which, therefore, rests upon and is directly supported by the shafts 6. Rigidly secured to the base plate 8 is the bottom section 9 of the central stationary drum or column. This bottom section 9 is formed with a circular track or bearing surface 10 (Figs. 4 and 7) and with annular pockets 11 and 12 on each side of the bearing surface 10, constituting oil cups which can be cleaned by removing plugs 13 and 14. 15 is the lower spider which rotatably surrounds the lower section 9 of the central drum and rests upon roller bearings 16 which run on the track 10. The rollers 16 are mounted upon pins which are keyed into a continuous ring 16ª (Fig. 4) and are provided at their outer ends with thrust bearings consisting of two plates or washers mounted on the pin or shaft of each roller and having anti-friction balls mounted between said washers. The lower spider 15 is provided with a peripheral gear 17 (Fig. 1). Rigidly secured to the upper edge of the lower section 9 of the central drum is the cam section 18 of the central drum (Figs. 3 and 4), which carries various cams which will hereafter be more fully described. Secured to the cam section of the central drum is the air-cam section 19 (Figs. 2 and 3) and secured to the air-cam section is the top section 20. The air-cam section 19 of the central column is shown provided with five parallel horizontal grooves for receiving cams for actuating various of the air valves. The particular machine illustrated utilizes the upper one of these grooves for cams to actuate the air valve nearest to the high pressure chamber; the next groove for cams actuating the high pressure air valve communicating directly with the spindle; the third groove for cams actuating the low pressure air valve; the fourth groove for cams actuating the air relief valve; and the bottom groove for cams actuating the vacuum valve.

Snugly surrounding the top section 20 of the stationary central drum is the top spider 21. The top spider 21 rotates with a bushing 531 which rotatably surrounds the top section of the central drum or column. 22 are hollow posts which support the top spider and are bolted to the top and bottom spiders (Fig. 97), so that when the bottom spider is driven by means of the circular gear 17, the bottom spider 15, top spider 21 and posts 22 constitute a frame work which rotates around the central stationary column. Rotatably surrounding the top section 20 of the central column, are six rings 23 (Figs. 1 and 2), each carrying a bracket 24 for attachment to one of the ram carriages 109 (Fig. 35), because, when the machine is fitted with its full complement of six units, each unit includes one ram and each ring connects with one ram carriage, but, owing to the fact that in each complete cycle of operation the travel of each ram and carriage with the spiders is arrested for a period while the other five rams continue to travel, each ram carriage must have a separate rotatable connection with the central drum.

Non-rotatably secured to the top section of the central column is the stationary ram slide support 25 (Figs. 1 and 2). Extending through the center of the central column, and rotating concentrically therewith is a hollow shaft 26, geared, in the machine illustrated, to rotate six times as rapidly as the spiders, and having non-rotatably secured to its upper end the ram slide cam plate 27.

The shaft 26 is supported on a thrust bearing provided by a flanged bushing 26ª, the flange of which rests upon the upper end of the top section 20 of the central column (Fig. 2). 25ª is a key securing the ram slide support to the upper end of the top section 20 of the central column (Fig. 2).

The main gear wheel 103 is keyed to the rotatable central shaft 26 by a key 103ª (Fig. 4) and its hub 103ᵇ rests on the flange of a plate 103ᶜ which is bolted to the lower end of the shaft 26.

Extending through the hollow shaft 26 is a rod 137 which operates the device for locking the ram slide, as will be hereafter more fully described.

*The raising and lowering mechanism.*

The raising and lowering mechanism will be most readily understood from Figs. 4, 7, 8, 9, 18, 19 and the large details shown in Figs. 22, 23, 24, 25 and 26. Each of the levers 4 and 4ª is provided at the extremity of its long arm, with an anti-friction roller 28 (Figs. 1, 8 and 18). These anti-friction rollers rest on castings or brackets 29 (Fig. 8, 18, 19 and 26). Each of these brackets 29 is fitted over a screw-threaded rod 30, rests upon a shoulder near the bottom end of the rod, and is held in position in any suitable manner, as, for example, by means of a pin 31 extending through the bracket 29 and through the rod 30 (Fig. 18). These rods are held apart near their lower ends by a transverse spreader or rod 32, extending through the lower ends of the screw-threaded rods and, preferably, consisting of two members longitudinally adjustable with relation to each other, as, for example, by means of a sleeve or turnbuckle 33. Each end of the spreader 32 is provided with a collar 34 either formed thereon or pinned thereto and also carries an idler 35. The screws or rods 30 which thus support the long arms of the levers 4, 4ª are in turn supported in the following manner (Figs. 9 and 18, 24 and 25): On the base plate 8 are formed two flanges 36 and 37 which are spaced apart from each other and the inner horizontal faces of which are substantially parallel with each other. Threaded on each of the rods 30 between the flanges 36 and 37 is a nut 38 so that, but for the assistance of the counterweights 5, supported in a manner to be described later, the threaded rods 30 and the load carried by them would be supported by the nuts 38 and flanges 36. By properly counterweighting the apparatus there need be no appreciable weight upon either the nuts 38 or the flanges 36, and the nuts 38 serve, when screwed one way or the other, to disturb the equilibrium and to adjust the machine up or down as required.

Non-rotatably fitted to each nut 38 is a gear-wheel 39 (Figs. 18 and 25) which meshes with a worm gear 40 supported by a bracket 41 attached to the flange 37.

The outer ends of the worm gear shafts 42 (Figs. 9 and 20) are supported in bearings 43 in brackets 44, and are provided with bevel gears 45 which mesh with bevel gears 46 on the transverse shaft 47 supported in the bearings 48 in the brackets 44. One of the worm gear shafts 42 is coupled directly to an extension shaft 49 supported in bearings 50 and 51 on a bracket 52. This extension shaft is provided with a bevel gear 53 (Fig. 27) which meshes with a bevel gear 54 on a shaft 55 fitted with a hand-wheel 56 (Figs. 1, 9 and 27). It will thus be seen that by rotating the hand-wheel 56 the motion will be transmitted through the gears 54, 53, 46, 45 and shafts 42 to the worm gears 40 to the gear-wheels 39 and nuts 38. Whereupon the nuts 38, located upon the screw-threaded, non-rotatable rods 30 when so rotated, will raise or lower the rods 30, as desired.

As the interior of the lower section 9 of the central drum constitutes a closed air chamber, the openings through which the shafts 42 extend (Fig. 9) may be conveniently closed as follows (Figs. 9 and 20):

On each shaft 42 is secured a collar 57 and is movably mounted a plate 58 adapted to make sufficiently tight contact with a seat 59 formed on the lower section 9 of the central drum. Interposed between the plate 58 and the collar 57 is a spring 60. The shafts 42 are made in two sections, joined by a coupling 61, so that when the outer section of the shaft 42 is inserted through the wall of section 9 of the central drum, the plate 68, spring 60 and collar 57 are adjusted thereon in such position that when the two sections of the shaft 42 are coupled together, the spring 60 is sufficiently compressed to hold the plate 58 snugly to the seat 59. Of course, any air pressure inside of the section 9 tends to hold the plate to its seat.

*The counterweights.*

The weight of the machine supported on the levers 4, 4ª, as above described, is counterbalanced by weights 5 (Figs. 1, 4, 7 and 19). These weights, two in number, are arranged one on each side of the machine. Each weight is supported on the end of a rope 62 which passes over an idler 63 on the base plate 8, thence down and around one of the idlers 35 on the spreader 32 (Figs. 18 and 19), thence up to a point where it is secured to a bracket 64 on the base plate 8. Thus, it will be seen that while the weight of the machine transmitted through the levers 4, 4ª and castings 29 tends to force the screw-threaded rods 30 downwardly, the counterweights 5, acting through the ropes 62, tend to raise the rods 30 and, acting through the casting 29 against the extreme ends of the long arms of the levers 4, 4ª, tend to lift the machine. Thus by virtue of the more efficient leverage through which the counterweights 5 act, the weight of the entire machine can be exactly counterbalanced by relatively small weights and the force applied through the nuts 38 need be only sufficient to overcome the equilibrium so established and, therefore, the entire machine can be raised and lowered, as desired, with but little effort.

The machine is adjusted to or from the furnace in the following manner:

One of the supporting wheels 1ª is partly a cog-wheel, meshing with a rack or cog track 65 on the track 2ª (Figs. 8 and 9). The wheel 1ª is also provided with a gear 66 meshing with a worm (Fig. 21) on a shaft 68 carried by a bracket 69, the upper end of which shaft is provided with a bevel gear 70 meshing with a bevel gear 71 on the shaft 72 supported on the upper end of the bracket 69 and operated by the crank 73. Obviously, by turning the crank 73, the machine will be moved backwards and forwards with relation to the furnace.

The main air trunk 74 (Fig. 1) may be readily connected with the machine so as to form a tight joint in the following manner:

The main air pipe 75 of the machine is fitted at its outer end with a flanged sleeve 76 fitting snugly thereover (Fig. 81). The flanged face of this sleeve 76 is adapted to make a snug joint with the flanged plate 77 which connects with the air trunk 74 and fits against the furnace wall 78. The main air pipe 75 is provided with perforated lugs 79 on each side of the main air pipe. Fitted through each pair of lugs 79 on the same side of the air trunk is a rod 80 having one end provided with a collar 81 and the other end secured to the flange of the sleeve 76. Interposed between the flange of the sleeve 76 and the nearest of the lugs 79 is a spring 82 so arranged that when the machine is away from the furnace the springs 82 on each side of the air pipe 75 will hold the sleeve 76 in its outermost position, but when the machine is moved up to the furnace upon the tracks 2, 2ª, the flanged face of the sleeve 76 will be brought snugly against the flanged face of the plate 77 and, as the machine is brought to its final position, the air pipe 75 will move forward within the sleeve 76 which is held stationary by its abutment against the plate 77, and thereby the springs 82 are compressed and the flanged faces of the sleeve 76 and the plate 77 are held snugly in contact with each other, the weight of the machine, of course, effectively holding the springs 82 under compression.

In Fig. 83 I have shown a convenient shaft coupling for connecting the two ends of the shaft 47 (Fig. 9), this coupling consisting of two flanged plates, one firmly secured to each of the sections of the shaft 47, one of said flanged plates 83 being provided with curved slots 84 through which extend screws or bolts 85 into the other flanged plate of the coupling, thus providing a ready adjustment for any lost motion or differential between the nut-operating gears on the two sides of the machine.

*The driving mechanism.*

It will be understood that the vertical adjustment just described, is readily accomplished by hand. By the driving mechanism, I mean the motor and system of gears whereby the force is applied which operates the glass working appliances. Throughout this specification the description of various details of the mechanism relates, so far as the specific structure goes, merely to the particular embodiment of my ideas and inventions which is shown in that one of the machines which I have built which is disclosed in the accompanying drawings. Such disclosure and description, however, is merely by way of illustration of what, as the result of my experience to this time, I at present consider the preferred embodiment of my inventive ideas, but such specific disclosure and description are not intended as a limitation upon my invention or upon my claims. This is especially so as to the mechanism which has so far been described in detail and also as to the driving mechanism which I am about to describe, for, obviously, power may be transmitted from any suitable motor by various power-transmission devices without in any way departing from my invention.

In the specific machine shown in the drawings, I provide an electric motor 86 having on its shaft a pinion 87 (Figs. 8 and 9). This pinion 87 meshes with a gear 88 on a shaft 89 supported in bearings 90 on a bracket 91 carried by the base plate 8. The inner end of the shaft 89 has a bevel gear 92 which meshes with a bevel gear 93 supported on the lower end of a stud shaft 94 carried by a bracket 95 which is supported by the base plate 8, (Fig. 31). On the upper end of the stud shaft 94 is a gear 96 meshing with a gear 97 on a countershaft 98 supported in bearings 99 and 100 attached to the base plate 8 and carrying on its upper ends a pinion 101. The gear 96 also meshes with an idler gear 102 supported in bearings from the under side of the base plate 8 (Figs. 4 and 8), which idler gear in turn meshes with what I have termed the main gear wheel 103 which rotates about the vertical axis of the machine. Keyed to this gear wheel 103 is the hollow shaft 26 which extends through to the top of the machine and carries the cam plate 27. The pinion 101 which projects above the base plate 8 (Fig. 32) meshes with the peripheral gear 17 on the lower spider (Figs. 1, 4, 7, 9, and 32) and is partially enclosed in a housing 104 which is provided with flanges 105 by which the housing is bolted to the base plate 8. As previously noted, these various gears just described, in the specific machine illustrated, are so arranged that the main-gear wheel 103 rotates six times to one complete revolution of the spider driving gear 17.

With the machine constructed as shown in the drawings, but provided with its full complement of six glass working units, the main gear 103 actuates the dipping or glass gathering mechanism six times during each complete revolution of the machine, that is, whenever each glass working unit comes opposite the furnace; and the mechanism driven by the rotation of the spider driving gear 17 actuates all of the glass working mechanism which is not actuated by the rotation of the main gear wheel 103. The other gear wheels merely serve to transmit motion from a single motor to these two principal gears so as to have the required differential movement between them. The single mechanism operating six times in each rotation of the machine to actuate the glass gathering mechanism simplifies the structure.

*The gathering mechanism—the ram.*

The gathering mechanism consists, broadly, in a device which I call the ram, which at required intervals, is projected or dipped into the metal in the furnace or pot, sucks up the required quantity of metal, cuts off the surplus metal, drops it where it will not cool or interfere with the fluid metal at the gathering point in the pot, and delivers it as a blank to the spindle which thereafter retains the gathered metal or blank until it is delivered when the work of the machine is completed.

This gathering mechanism is shown in different views, assembled on the machine, at the upper right hand and left hand corners of the general view (Fig. 1), in Figs. 2 and 5, and in various details in Figs. 11, 12, 13, 14, 15, 16, 33, 34, 35, 36, 37, 38, 39, 40, 41, 42, 43, 44, 45, 46, 47, 48, 49, 50, 51 and 52.

While this mechanism is, of course, adapted to gather glass from any type of furnace or pot, its adaptability for entering the working opening of a pot or furnace makes it particularly valuable as compared with that type of gathering machine in which the metal has to be brought out of the furnace proper to the machine, as, for example, by means of a rotating tank, a segment of which projects outside of the furnace, because with the body of metal to be worked from kept constantly inside of the furnace, there is no difficulty in keeping the metal in a properly fluid state at all times and there is decided economy of fuel, when it is considered that metal must be kept at a temperature well above 2000 degrees Fahrenheit to be worked successfully.

In the accompanying drawings, the glass pot or furnace is conveniently shown at 106, the working chamber being preferably provided with a familiar ring 107 of refractory material which floats on the metal and is preferably located back of the front wall of the working chamber so that the surplus metal when cut off from the gathering mechanism, as hereinafter described, will drop outside of the working ring so as not to chill the metal in the ring. The furnace is, of course, no part of my present invention and is merely shown conventionally in the drawings, for, in order to operate my machine continuously and most conveniently I use with it a continuously melting furnace either of the tank type or pot type, whereby a body of metal suitable for working is constantly maintained at the desired level just inside of the working opening of the furnace.

A gathering device is carried by the ram 108 which, in turn, is supported upon the ram carriage 109 which slidably rests upon the top spider. The ram carriage, ram, and the parts carried thereby I term collectively the "gathering mechanism". The ram 108 slides back and forth in a housing 110 and the ram is provided on its upper surface with a rack-bar 111 (Figs. 13 and 15). This rack-bar meshes with a gear-wheel 112 keyed to a sleeve 112ª rotating on a stationary shaft 113 secured on the side walls of the housing 110 (Figs. 5, 12, 13 and 15), while on each side of the gear wheel 112 are pinions 114, formed on or keyed to the sleeve 112ª, but with fewer teeth than the gear wheel 112 (Fig. 12). The ram 108 slides upon the ram carriage 109 diagonally to the vertical and radially to the machine. Slidingly mounted in the top of the ram housing 110 is a slide 115 which carries two rack-bars 116 arranged to mesh with the pinions 114 at each side of the gear wheel 112. This slide 115 is shown as arranged to move horizontally and radially backward and forward (Figs. 12 and 13). As it moves backwardly, it rotates the pinions 114 through their engagement with the rack-bars 116, and simultaneously rotates the gear-wheel 112 which, engaging the rack-bar 111 on the ram, projects the ram forwardly and downwardly; but owing to the differential between the pinions 114 and the gear wheel 112, the ram travels farther and more rapidly than the slide 115 which actuates it. The slide 115 connects, by means of a roller 117 on a stud 118 with the ram dog slide 119, the roller 117 fitting in a groove or cam-way on the under side of the ram dog slide, the inner wall of which groove, in what may be termed the position of rest, registers with and provides a continuation of an annular flange extending around the edge of the ram slide support 25 (Figs. 11 and 13), which flange, engaging the roller 117 and thereby limiting the radially inward movement of slide 115, retains the ram in the machine. The ram dog slide 119 runs on slide-ways 120 provided on the under side of the ram slide 121 and is detachably connected with the ram slide 121 by means of the dog 122, (Figs. 12, 13 and 14). The ram dog 122 is mounted on a horizontal pivot at the forward end of the ram dog slide, and is provided with a lip 122ª, a lug 122ᵇ and a pocket 122ᶜ. The spring 123 normally holds the ram dog in the position shown in Figs. 12 and 13, in which position the forward end of the dog which is preferably bevelled as shown, engage a notch 121ª on the under side of the ram slide 121, the forward end of the slide 121 being slotted to permit the travel of lug 122ᵇ of the ram dog (Fig. 123). The ram slide 121 is supported on slide-ways 124 formed on the under side of the ram slide support 25. With the parts in the position shown in Fig. 13, any movement of the ram slide 121 will cause the ram dog slide 119 to move uniformly with it. This ram slide 121 is provided with a roller 125 on the stud 126, which roller engages a cam or cam-way in the shape of a groove on the under side of the ram slide cam plate 27. This roller 125 extends upwardly through a slot 127 in the ram dog slide support 25, and the cam on the under side of the ram slide cam plate 27 is so arranged that once in each revolution of the ram slide cam plate 27 the roller 125 will be carried thereby to the rear of the slot 127 thereby correspondingly carrying back the ram slide 121, the ram dog slide 119, the slide 115 and rack-bars 116, rotating the pinions 114 and the gear wheel 112 and thereby the ram is projected forwardly and downwardly and dipped into the working chamber of the furnace. The further rotation of the ram slide cam plate 27 returns the roller 125 to the forward end of the slot 127 and reverses the movement of the ram.

When it is desired that the ram shall be held against radial movement, the ram dog 122 is moved forwardly and downwardly out of engagement with the notch 121ª in in the ram slide 121 and until its lip 122ª engages a hole 128 in a bracket 129 supported on the extreme forward end of the ram slide support 25. This is accomplished by means of a lever 130 pivoted at 131 to the ram slide support 25, one arm of which lever is adapted to force the dog 122 out of engagement with the ram slide 121 and into the hole 128 and to hold it in that position (Fig. 13). The other arm of the lever 130 is connected by means of a link 132 with one arm of a three-armed lever 133, which is pivoted to a bracket 134 upon the ram slide support 25 (Fig. 13), another arm of which lever is connected by a link 135 (Fig. 11) with an arm 136 rigidly secured to the rod 137 arranged at the axis of the machine. This rod 137 extends from the top to the bottom of the machine (Figs. 2 and 7) and is provided at its lower end with an arm 138 (Figs. 8 and 29) from the end of which rod or link 139 extends to a bell-crank lever 140 (Figs. 1 and 27) pivoted to a bracket 141 on the base plate 8, the other arm of which lever is connected by a link 142 with a bell crank 140$^a$ from which a link 142$^a$ connected with the short arm of a lever 143 pivotally mounted upon the casing 144 containing the shaft 55 of the raising and lowering mechanism. By means of a quadrant 145 on the casing 144 and a spring actuated dog 146, the lever 143 is locked at each extreme position of adjustment. It will thus be seen that by moving the lever 143 forward, the ram dog 122 will be moved and locked out of engagement with the ram slide 121, leaving the ram slide 121 free to be actuated by the ram slide cam plate 27, without operating the ram 108. At other times, the ram slide 121, and the ram dog slide 119, constitute in effect a single slide. To prevent any operation of this dog disengaging or safety device at a time when any of the automatic mechanism would tend to operate the ram or ram carriage, a plate 147 is provided (Figs. 11 and 13) on a part of the periphery of the ram slide cam plate 27. This plate projects in the path of the arm 133$^a$ of lever 133, so that the lever 133 may neither be operated to lock nor to disengage the dog 122 when the apparatus is in any part of the machine's cycle of rotation where the plate 147 projects either above or below the path of the lever arm 133$^a$.

When it is desired to disengage the ram dog 122 from the hole in the bracket 128 the above described levers are so operated that the free arm of the lever 130 engaging the lug 122$^b$ on the ram dog 122 will force the ram dog 122 upwardly and out of engagement with the hole in bracket 129 and the spring 123 will assist this movement and complete it and will then hold the ram dog 122 in engagement with the notch on the under side of the ram slide 121.

*The ram swinging device.*

We now come to a consideration of the mechanism whereby the gathering mechanism automatically ceases to travel with the upper spider in its rotation about the axis of the machine while the ram is moved radially forward into the furnace and back, and then automatically resumes travel with the spiders around the axis of the machine, and is then swung ahead more rapidly than the spiders, until it regains its original position.

It should be borne in mind that the ram slide support 25 is non-rotatably secured to the top section 20 of the stationary central drum so that the ram slide 121 and the ram dog slide 119 never rotate about the axis of the machine, but their movement is limited to a back and forth radial movement produced by the action of the cam on the ram slide cam plate 27 against the roller 125. Consequently when the roller 117 comes into position in the slot on the under side of the ram dog slide 119, then, if the ram dog 122 is in operative engagement with the ram slide 121, the ram carriage 109 must temporarily stop in its rotation about the axis of the machine. As the ram carriage 109 is connected with the top section of the central column or drum by means of a bracket 24 on one of the rings 23, which loosely surround the top section 20 of the drum, it is evident that the gathering mechanism may remain temporarily stationary while the spiders 15 and 21 continue to rotate.

On the bottom of the ram carriage 109 is a segmental rack 148 (Figs. 34 and 13) meshing with a gear 149 on a shaft 150, carried by the rotating frame. This shaft also carries a pinion 151 geared down from the gear 149 and meshing with a rack-bar 152 secured to a slide 153 by means of a bracket 154 which is bolted to the rack-bar 152 and is adjustably bolted to the slide 153 (Figs. 2, 3, 33 and 38), by means of bolts 155 passing through slots 156 in the bracket 154, and is adjusted by the set screws 157 threaded through lugs 158 on the slide 153 (Fig. 38). The slide 153 runs on slide-ways 159 on a bracket 160 which is attached by bolts 161 to two of the upright posts 22. On the bottom of the slide 153 is a roller 162 engaging a cam-way or groove 163 upon the ram carriage swinging cam 164, which is attached by bolts 165 to the cam section 18 of the central drum. The result of this arrangement is that as the posts 22 rotate with the spiders around the stationary drum, the cam-way 163, engaging the roller 162 on the slide 153 moves the slide 153 radially away from the center of the machine from the position shown in Fig. 33, thereby rotating the pinion 151, the shaft 150 and the gear 149. The gear 149 meshing in the segmental rack-bar 148 moves the rack-bar and the ram carriage to which the rack-bar is attached backwardly with relation to the gear wheel 149, but as the gear wheel 149 is mounted on a frame-work which is swinging forwardly around the axis of the machine, the result is merely to temporarily arrest the rotation of the ram carriage around the center of the machine, the various gears just described being so proportioned as to bring about this result. After the gear wheel 149 has arrived at or near the end of the segmental rack 148, the roller travels for a short time in a symmetrical part of the camway 163, thus causing the gathering mechanism to resume travel with the spiders and then (Fig. 34), the cam 163 (Fig. 38) starts the slide 153 radially back towards the center of the machine, whereupon, the rack 152 engaging the pinion 151 reverses the rotation of the pinion 151, the shaft 150 and the gear 149, whereupon the gear 149 engaging the segmental rack 148 swings the rack 148, the ram carriage 109 secured thereto, and all parts carried thereby, forward circumferentially to their original positions with relation to the rotating frame, in which positions they are maintained by the cam 163 until the ram again arrives in front of the working opening (Fig. 33).

Of course, the cam 163 is so arranged and timed, as clearly shown in Fig. 54, that the ram carriage is not swung forward until the gathering mechanism has completed its operations and delivered the blank to the spindle, as will hereafter be more fully described.

The ram carriage is provided with laterally extending bearing flanges 512. To compensate for lost motion and to insure bringing the ram to an exact position on the top spider when the ram is carried backwardly with relation to the spider, i. e., when it is stationary with relation to the furnace, I provide a stop device 513 (Figs. 33, 107 and 109). This stop consists of the housing indicated at 513 containing a spring 514, a headed pin 515 seated against the spring and projecting from the housing, and an adjustable nipple 516. The spring 514 forces the pin 515 outwardly until the shoulder formed by the head on the pin 515 seats against the nipple 516. Whenever the ram carriage is swung backwardly on the top spider, the pin 515 will be brought against the upwardly projecting end of one of the bolts or screws 517, by which alternate upright posts 22 are secured to the top spider. This relative position of the ram carriage and top spider corresponds to the position in which the neck molds of the gathering device on the ram 108 are in axial alignment with the spindle 234, when the spindle has been centered to receive the blank from the neck molds. By means of the nipple 516 this stop device is adjusted to bring the ram carriage 109 to this point.

*The gathering device.*

We next come to consider the mechanism carried by the ram, whereby the metal is collected from the furnace.

Upon the furnace end of the ram is mounted a blank mold holder 166 fitting snugly into a port 167 at the end of passageways 168 in the ram and secured in position by set screws 169 (Fig. 16). Snugly fitted into this holder 166 is a blank mold 170 secured in position by screws 171 and comprising an air chamber 172 and a blank mold chamber 173, from which ports 174, exaggerated and shown in the form of a slot, communicate with the chamber 172 and through the passage 175 in the holder 166 to the passages 168 in the ram (Figs. 15, 16 and 49).

The lower edge of the blank mold is bevelled or flared at 176, as is clearly shown in Fig. 49. Surrounding the lower portion of the blank mold 170 and projecting downwardly therefrom are the divided neck molds 177. Each half 177 is mounted on the end of the long arm of a bell crank lever 178 and 178$^a$ (Fig. 46), said levers being pivotally mounted upon and supported by a stud or pivot 179. These neck molds are removably secured by screws 180 to the ends of the levers 178 and 178$^a$ (Fig. 48), and when closed around the blank mold (Fig. 16), the inner bevelled surface 181 of the neck molds tapers downwardly and inwardly from the bevelled surface 176 of the blank mold, thereby co-operating with the lower end of the blank mold to constitute a mold for forming the neck 182 on the blank (Fig. 84$^a$), whereby the blank may be mechanically suspended from the gathering mechanism. An opening or port 183 formed by the lower edges of the neck molds constitutes the port into which the metal is drawn from the furnace when the end of the ram 108 dips into the working chamber of the furnace.

184 (Figs. 13 and 36) is a vacuum chamber in the ram carriage communicating with the vacuum chamber of the upper spider, by passages which will be later more fully described, in which, by suitable mechanism, an exhaust or partial vacuum is produced as required. As the ram reaches the forward end of its travel and dips the open end of the neck molds into the metal in the furnace, the port 185 communicating with the rear end of a chamber 186 of the ram (Figs. 13, 35 and 40) comes into register with the port 187 of the exhaust chamber 184 (Fig. 13) and the vacuum valve between vacuum chambers in the upper spider and the ram carriage is opened, thereby creating a partial vacuum or exhaust in the chamber 186 of the ram and in the passages 168 communicating therewith and communicating also through the holder 166 with the blank mold 170 and the neck molds 177, with the result that the molten metal is drawn into and fills the mold chamber formed by the blank mold and the neck molds. As these molds are cool, as compared with the temperature of the metal, the blank, while remaining plastic, becomes sufficiently set before air is admitted to the chamber 186, the passages 168 and the chamber 172 (Fig. 16) to be sustained by its engagement with the interior of the neck molds sufficiently for the purposes of the next step.

As the ram starts to retreat from the working chamber, the cut-off mechanism, which will be later described, swings across the face of the neck molds, cutting off the surplus metal and dropping it back, either in the furnace between the working ring 107 and the front wall of the working chamber, or entirely outside of the furnace, as may be desired and in accordance with the adjustment of the parts. As the ram carrying the gathered blank withdraws from the furnace, the port 185 in the ram passes out of register with the exhaust port 187 and comes into register with the slot 188 communicating with an air chamber 189 in the ram carriage (Figs. 13 and 36), whereupon air rushes into the chamber 186 and passages 168 in the ram and into chamber 172 of the blank mold and the blank is no longer supported by atmospheric pressure but is held by mechanical engagement with the neck molds, so that it will be freely delivered from the neck molds to the spindle when the neck molds open and release the neck of the blank.

However, in case it is desired that reliance shall not be wholly placed upon purely mechanical support, certain further features may be used if desired, as follows:

Thus the ram carriage may be so constructed that just before the ram is ready to deliver the blank to the spindle, the port 185 in the ram (Fig. 35) passes from the slot 188 onto the flange 190 and is closed thereby. At the same time a port in the ram near the lower end of the chamber 186 (Fig. 13) comes into register with the exhaust port 187. This port is closed by an inwardly seating valve 191 normally held to its seat by a spring 192 and also by external atmospheric pressure whenever there is a partial vacuum in the chamber 186. This valve, it will be noted, is adapted to be unseated by the exhaust in the chamber 184, but as the chamber 186 and the connecting passages in the ram have been filled with air since the blank was gathered and before the valve 191 has come into register with the exhaust port 187 and the interval which then follows before the blank is delivered from the neck molds to the spindle is very short, there will be only a slight, partial vacuum developed in the chamber 186 and connecting passages because of the operation of the valve 191.

*The neck mold control.*

The neck molds are opened and closed in the following manner (Figs. 13, 34, 35 and 46):

Links 193 and 194 are pivotally connected with the short arms of the neck mold levers 178ª and 178, respectively, and are in turn connected by a vertical pivot to a clevis 195 on one end of a link 196, which is connected by a horizontal pivot with a link 197, connected in turn by a horizontal pivot with one arm 198 of a bell crank lever rotating on a horizontal pivot 199 extending across and mounted in the ram. The other arm 200 of this bell crank lever is connected by a horizontal pivot with a link or casting 201 to which is secured the end of a rod 202 (Figs. 13 and 46). This rod 202 extends longitudinally through the ram and is pivoted to a plunger 203 which extends through a web 204 in the ram (Fig. 35) and through a coil spring 205 which is seated at one end against the web 204 and at the other end against a shoulder 206 on the plunger 203. This spring acts to force the plunger 203 outwardly from the ram and, acting through the rod, links and levers described, holds the neck molds in closed position. The outer end of the plunger 203 is provided with a roller 207 which engages a cam 208 rigidly secured to the stationary central column. When the mechanism carrying the ram around the axis of the machine brings the roller 207 into engagement with the cam 208, the plunger 203 is forced inwardly, operating the rod, links, and levers so as to draw the short arms of the neck mold levers 178 and 178ª towards each other, thereby opening the neck molds and releasing the blank. This occurs just as other mechanism, to be hereafter described, causes the spindle to rise to axial alignment with the neck molds and causes the jaws at the open end of the spindle to open and receive the blank as it is released by the neck molds.

The neck molds so opened are held open by the continued contact of the roller 207 with the cam 208.

*The cut-off device.*

Considering now the cut-off mechanism for removing from the neck molds the surplus metal gathered in the furnace.

This mechanism is shown particularly in Figs. 5, 15, 34, 46 and 51.

The cut-off knife 209 is secured to a plate 210 provided with a stud 211 (Fig. 50). This stud is adjusted to the required position with relation to its axis, in a clamp 212 and then is tightly gripped in this clamp by means of a screw 213. This clamp is secured by a screw or bolt 214 to the end of a lever 215 which is swung upon a pivot or screw 216 on the end of the ram. These parts are all so adjusted and proportioned that when the lever 215 is swung back and forth the cutting edge of the knife 209 will just nicely clear the port 183 in the neck molds 177, so that the gathered metal will be cut off substantially flush with the under face of the neck molds. The lever 215 is connected by a pivot 217 (Figs. 46 and 47) with a rod 218 leading to the mechanism which actuates the cut-off. This mechanism is best shown in Figs. 15 and 51.

The rod 218 is provided with a collar 219 and extends into a sleeve 220. A pin 221 extends transversely through the end of the rod 218 with its sleeve 220 and through slots 222 in each side of the sleeve 220. A spring 223 surrounds the end of the rod 218 and is seated between the collar 219 and one end of the sleeve 220 so as to normally hold the pin 221 seated at the lower ends of the slots 222 (Fig. 51). The upper end of the sleeve 220 is rigidly fastened to a rod 224 which passes through a flange or lug 225 secured to the side of the ram, and is provided with a collar 226. The rod 224 passes through a spring 227 which is seated at one end against the collar 226 and at the other end against the flange 225, spring 227 normally holding the parts of the cut-off device in the positions shown in Figs. 15 and 51. The upper end of the rod 224 is screwed into a sleeve 228, the other end of which sleeve is pivoted at 229 to one arm of a bell crank lever 230. The bell crank lever 230 is pivotally mounted at 231 upon the side of the ram. The other arm of the bell crank lever 230 is provided with a roller 232.

In Figs. 15 and 51 the ram is shown in its forward position when it is dipping into the pot. As the ram retreats from the pot after gathering the metal, the roller 232 on the bell crank lever 230 soon contacts with and rides upwardly upon an inclined plane 233 secured to the ram carriage 109 (Fig. 15). The result of this is that the bell crank 230 is rocked, the rods 224 and 218 are moved forwardly, the lever 215 is swung forwardly and the knife is carried across the under face of the neck molds, cutting off the surplus metal.

By adjustment of the parts, this surplus metal may be cut off at any desired point after the ram leaves the working ring in the furnace.

The height of the inclined plane 233 is such that the incline ends when the rocking of the lever 230 has carried the knife to the position shown, for example, in Fig. 47, in which position it is held until the ram again moves forwardly and, as the roller 232 descends the inclined plane 233, the spring 227 is permitted to expand and draw the lever 215 back to the position shown in Fig. 15, which position it reaches shortly before the ram dips in the metal.

It will be seen that the sleeve 220 and spring 223 constitute a safety device. The expansive force of the spring 223 is such that the resistance met by the knife in cutting off the surplus metal will not ordinarily materially compress the spring 223, but if the knife meets with any substantial resistance which might, for example, suffice to buckle the rods connecting the bell crank 230 with the lever 215, the spring 223 will be compressed and the rod 218 will slide upwardly in the sleeve 220 and all danger of buckling or other damage will be avoided.

It will be observed that by virtue of the expansion of the spring 205 and the parts actuated thereby (Figs. 13, 35 and 46) the neck molds will be held closed, but, owing to the fact that the plunger 203 (Figs. 33, 34 and 35) is forced inwardly by the cam 208 against the expansion of the spring 205, except when the ram is in line with the notch 208$^a$ in the cam 208, the neck molds are held open at all times, except during the period when the travel of the ram carriage and gathering mechanism with the spiders is arrested, which period corresponds to the time when the ram is in line with the notch 208$^a$ in the cam 208, which notch permits the plunger 203 to be forced outwardly from the ram by the spring 205 sufficiently to close the neck molds.

*The spindle.*

This mechanism is shown particularly in Figs. 1, 3, 4, 5, 6, 55, 55$^a$, 56, 56$^a$, 57, 57$^a$, 58, 58$^a$, 59, 60, 61, 62, 63, 64, 65, 66, 67, 68, 69, 70, 71, 72, 73, 74, 75, 76, 77, 78, 79, 143, 144.

As to the spindle itself, attention is particularly called to Figs. 55 to 58$^a$, which should be read together and Figs. 143 and 144. Figs. 55, 57 and 58 together show one continuous sectional view of the blow-pipe or spindle with the blank in place. Figs. 55$^a$, 56$^a$, 57$^a$ and 58$^a$ also show one continuous sectional view of the spindle with the spindle jaws open.

The function of the gathering mechanism is merely to gather the blank from the furnace and deliver it so that its sheared end will be received by the blow-pipe in the spindle.

The function of the spindle is to take the blank so gathered, partially blow it and swing it out so as to give it a shape which shall preferably approximate the shape of the finished article, distribute the metal evenly through the walls of the blank and, finally, rotate the blank in the paste lined mold and do such further blowing of the blank as shall cause the blank to take the shape of the mold and as shall keep the blank from collapsing until it has sufficiently set to hold its desired shape or finished form, and to then release and deliver the blown article. Such are the functions of the spindle when operating to attain all the advantages which are possible when my invention is utilized to the fullest degree, but, of course, my invention may be practiced so as to attain only a part of these results or so as to attain them only in less degree.

The spindle is built up upon the spindle shell 252. About midway of its length the spindle shell has screwed onto it a collar 253 (Fig. 57), provided with flanges 254 and 255 and with a slotted extension 256 which is tapered at its outer end to fit into a lock nut 257. The spindle is supported on rollers 258 carried on the ends of the arms of a bell crank lever 259, said arms constituting a yoke (Fig. 61ᵃ). Above and below the bell crank lever the spindle shell 252 is journalled within sleeves or bearings 260 and 261 on the ends of the arms of the bracket 235.

The sleeve or spindle extension 238 is fitted over the upper end of the spindle shell 252 (Figs. 55 and 56) and secured thereto by the screws or studs 246, which are threaded into the extension or sleeve 238 and extend inwardly through and beyond the spindle shell 252. Screwed into the upper end of the sleeve 238 are the shoulder studs or hinge pins 237 upon which the jaws 236 are pivoted or hinged. Fitted over the upper end of the spindle shell 252 and the lower end of the extension or sleeve 238 is the sleeve 241, the upper end of which carries the bracket arms 240 and is slotted to receive the outer ends of the screws 246. Near its lower end the sleeve 241 is slotted at 277 to receive the screws 262, which extend inwardly through a slot 263 in the spindle shell 252 and are screwed into the middle section 264 of the main plunger. The spindle shell 252 is reduced in diameter at its upper end within the shell 241 to provide a shoulder 265 and a spring chamber within the shell 241 to receive the spring 244, which is seated at one end on the shoulder 265 on the spindle shell and at the other end against an inwardly extending flange or shoulder 266 on the sleeve 241. The expansion of this spring tends to move the sleeve 241 and the spindle shell 252 with relation to each other in such direction that the hinge pins 237 carried by the spindle shell extension 238 and the bracket arms 240 carried by the shell 241 will approach each other, thereby holding the jaws 236 closed.

In Figs. 55, 55ᵃ and 56, the jaws 236 on the spindle are shown provided, as a matter of convenience, with removable ends or thimbles 248. These thimbles are removably held in position by button-headed pins 527 provided with conical ends 528 and pressed by springs 529 into conical seats 530 in the thimbles 248.

Mounted within the spindle shell 252 is a plunger, shown in the drawings as made in three sections,—the middle section 264, the upper section 264ᵃ and the lower section 264ᵇ. The middle section 264 and the lower section 264ᵇ are screwed together (Fig. 57), as a matter of convenience in machining and assembling. At 267 (Fig. 57) the plunger section 264 is reduced to form a chamber for the spring 268 which surrounds the reduced part of plunger section 264, is seated at its lower end on a washer 269, which rests on a shoulder at the bottom of the chamber 267 and is seated at its upper end against a shoulder 270 on the plunger section 264. The tendency of this spring is to force the plunger outwardly with relation to the spindle shell. The upper end of the plunger section 264 is provided with a nipple 270ᵃ of rubber or Babbitt metal. The lower end of the plunger section 264ᵃ is provided with a conical tip 271 adapted to be seated in the nipple 270ᵃ to make an air-tight joint therewith. About midway of its length the plunger section 264ᵃ is provided with guideways 272 to receive the extreme inner ends of the screws 246, the lower ends of these guide-ways constituting stops to limit the longitudinal movement of the plunger section 264ᵃ with relation to the spindle shell 252.

Upon the upper end of the plunger section 264ᵃ is mounted the main plunger tip 242, having a central opening flaring inwardly and downwardly.

Slidingly mounted upon the exterior of the spindle shell 252 is a collar 273 which is secured to the plunger section 264 by screws 262 which extend through slots 263 in the spindle shell 252.

In the operation of the machine, when the spindle is at its lowermost position, that is, in the reverse position from that shown in Figs. 55, 57 and 58, rollers 275ᵃ on the ends of the arms of a yoke 276 engage the collar 273, as shown in dotted lines at the top of Fig. 57, and move it, thereby moving the plunger so as to compress the spring 268 and, by the continued travel of the plunger, bring the screws or pins 262 in contact with the bottoms of the slots 277 in the sleeve 241; whereupon the continued travel of the plunger moves the sleeve 241 backwardly, carrying with it the arms 240 and pulling open the jaws 236. During this operation, the plunger section 264ᵃ remains in position at the end of the spindle, being held there by gravity, while the extreme ends of the screws 246, engaging the bottoms of the slots or ways 272, keep the plunger section 264ᵃ from dropping out of the spindle.

On the outer end of the plunger section 264ᵇ is mounted a sleeve or shell 278 provided with a flange 279. A groove is milled at 280 in the end of the plunger section 264ᵇ (Fig. 58) and a pin 281 is driven through the shell or sleeve 278, so as to loosely engage the groove 280, whereby the plunger section 264ᵇ is rotatably connected with the shell 278, but may not be withdrawn therefrom.

When the spindle is in upright position and about to receive the blank from the neck molds, the arms of the yoke 276 engage the flange 279, as shown in dotted lines in Fig. 58, and move the shell 278. When this occurs, the jaws are opened precisely the same as when the yoke 276 engages the collar 273, but, owing to the fact that the spindle is now in upright position, the downward movement of the plunger permits the plunger section 264ᵃ to drop by gravity until the shoulder 282 on the main plunger tip 242 rests upon the upper end of the spindle shell extension 238 (Fig. 55ᵃ). This occurs before the screws 262 engage the bottoms of the slots 277 on the shell 241 and, consequently, the plunger section 264ᵃ and the plunger tip 242 carried by it drop down from the top of the spindle before the jaws begin to open. The continued downward travel of the yoke 276 pulling on the flange 279 (Fig. 58) pulls the plunger 264 downwardly until the jaws are open and the parts are in the positions shown in Figs. 55ᵃ, 56ᵃ, 57ᵃ and 58ᵃ.

Centrally arranged within the spindle is the second plunger or rod 249 secured at one extreme end to the cap 283 and to the lock nut 284 and carrying at the other end the secondary plunger tip 250. At the end of the rod 249 away from the tip 250, is the cap 283 provided with a flange 285 and surrounded by a spring 286, which is seated at one end upon the flange 285 and at the other end against the bottom of the shell or sleeve 278. The expansion of this spring pulls the rod 249 downwardly or outwardly with relation to the spindle, whereby the secondary tip 250 is drawn to the position with relation to the plunger tip 242 shown in Fig. 55ᵃ, and so as to open the central passage through the plunger tip 242, but at the instant when it is desired to force the secondary plunger tip 250 into the plastic blank, the cam operated lever 287 (shown in dotted lines in Fig. 58) forces the rod 249 upwardly, whereby the secondary plunger tip 250 is seated to close the opening through the main plunger tip 242, and is brought to the position shown in Fig. 56.

The function of the auxiliary or secondary plunger tip 250 is a multiple one: By squeezing the neck of the blank between the plunger tip 242 and thimbles 248, it insures a tight seal between the blank and the spindle so that there will be no leakage of air and the controlled quantity of air automatically admitted to the spindle will operate effectively upon the blank. Forcing the relatively cold auxiliary plunger tip 250 into the neck of the blank, the exterior of which is seated against the relatively cold main plunger tip 242, tends to stiffen the neck of the blank so that the blank is more securely held by the spindle during the subsequent manipulations, and the air admitted to the spindle operates more effectively to elongate the blank; and by thus forming a recess or air chamber in the blank, the subsequently admitted air pressure is more effectively applied.

The shell 278 constitutes an air chamber, closed at one end by a stuffing box 288, which stuffing box is provided with slots or ways 288ᵃ for the pin 289 on the cap 283, which serve to limit the outward movement of the rod 249 away from the spindle. At the other end the shell 278 is provided with a stuffing box 290 surrounding the plunger section 264ᵇ. Air is conducted to the bottom of the shell 278 by the air pipe 291, having a flexible connection by the hose 292 with a source of compressed air, and an air passage is provided around the rod 249 from the bottom of the shell or sleeve 278 through the main plunger tip 242.

293 is an arm bolted to one of the bracket arms 261 and provided with a pin 294 which extends into a slot in the wall of the shell 278, said slot, however, not extending through the wall of the shell. By virtue of this arrangement, it will be observed that, while the plunger carrying the shell 278 may be moved longitudinally with relation to the bracket sleeve 261, and may be rotated within the shell 278, the shell 278 is held against rotation by the arm 293 and pin 294, so as to protect the air pipe 291 and hose 292.

At 296 the spindle shell 252 is provided or formed with a pinion which, by meshing with gears to be hereafter described, serves to rotate the spindle shell 252 within the bearings or journals afforded by sleeves 260 and 261 on the arms of the bracket 235 and also within the jaws or yoke of the bell crank lever 259, thereby at the same time rotating all of the parts mounted upon and connected with the spindle shell 252, except the shell or air chamber 278, which is held against rotation in the manner described above.

The lever 287, which operates the second plunger or rod 249 (Fig. 58) is shown with its operating mechanism in Figs. 1, 3, 4, 6 and 7, but is most clearly shown in Figs. 72 and 76. This lever is pivotally mounted on a bracket arm 297 at one end of a plate 298, which is bolted to a box 299, which, in turn, is rigidly secured to the lower spider 15. The rear of the plate 298 is provided with slide-ways 300, in which a slide 301 moves radially in the machine Fig. 76. The slide 301 is provided with a lug 302, to which is secured a rod 303 which slides through a lug 304 on the plate 298 and connects with the lower end of a link 305, which is pivoted to the lever 287. The spring 306 surrounds the rod 303 between the lugs 302 and 304 and normally holds the parts in the position shown in Fig. 72.

As a matter of safety, to prevent buckling of the mechanism, the link 305 comprises a stem 305$^a$, which slides within a sleeve 305$^b$ and is provided with transverse pins sliding in slots in the sleeve 305$^b$, a spring 305$^c$ surrounding the stem 305$^a$ and holding it in its normal position.

Secured to the cam section 18 of the central drum is a cam-plate 307 interposed in the path of the inner end of the slide 301, which carries a roller 308 (Figs. 76 and 78). As the plate 298 rotates with the lower spider the roller 308 engages the inclined face of the cam-plate 307, so that the slide 301 and the rod 303, carried by it, are moved radially outward from the center of the machine, compressing the spring 306 and swinging the lever 287 to the position shown in dotted lines at the bottom of Fig 58. This is further illustrated in plan view in Fig. 89.

The yoke 276, which operates to open and close the jaws carried by the spindle, is shown in Figs. 1, 3 and 6. The mechanism which operates it is shown in enlarged detail in Figs. 60 and 69. The yoke 276 is keyed to a horizontal pivot 309, which rotatably extends through a lug 310 (Fig. 69) on a bracket 311, which is immovably secured to two of the uprights connecting the upper and lower spiders.

Keyed to this same pivot 309 is a pinion 312 (Figs. 6 and 69). A rack-bar 313 is guided through the lug 310 and in mesh with the pinion 312 and in sliding engagement with the key 314 to keep the rack-bar from turning (Fig. 69). This rack-bar is also guided at 315 (Fig. 72) in the rear part of the bracket 311 and is screwed into one end of a slide plate 316, which runs in slide-ways 317 on the under side of the rear end of the bracket 311. The slide-plate 316 carries a roller 318, which travels in a cam-way or groove on a cam plate 319 which is rigidly secured to the cam section 18 of the central drum. It will be seen that as the cam-plate 319 moves the slide-plate 316 readily to or from the center of the machine, the rack-bar 313, engaging the pinion 312, will rock the arms of the yoke 276 upwardly or downwardly, as the case may be.

When the spindle is in upright position, the downward movement of the yoke arms 276 will cause them to engage the flange 279 on the spindle (Figs. 58 and 1), while, when the spindle is swung downwardly, as shown at the left hand of Fig. 1, the upward movement of the yoke arms 276 will cause them to engage the collar 273 on the spindle (Fig. 57), the operation in either event resulting in opening the jaws at the end of the spindle.

*The spindle swinging mechanism.*

The swinging or rotation of the spindle about a horizontal axis is accomplished by the following mechanism (see particularly Figs. 6, 59 and 60):

The bracket 235 is provided with a hub or hollow shaft 320 (Figs. 6 and 60) extending through a sleeve or journal 321 formed or cast on the bracket 322 (Fig. 59), which is bolted to two of the upright posts 22.

Secured to the rear end of the hollow shaft or hub 320 is a collar 323, which engages the inner face of the bearing 321 on the bracket 322 and holds the bracket 235 from displacement outwardly. Keyed on the hub 320 of the bracket 235, at the outer face of the bracket 322, is a pinion 324, the casting or bracket 322 being cored out to form a housing around the larger part of the periphery of the pinion 324 (Fig. 59). Journalled within a bracket 325, secured to and depending from the bracket 322, is a shaft 326 having keyed to its outer end a gear 327 and to its inner end a spirally toothed pinion 328, which is, in turn, in mesh with the diagonally arranged teeth on the rack-bar 329 secured to a slide-plate 330 and adjustably connected therewith by means of a screw 331 which is screwed into the slide-plate 330 and engages a lug 332. The slide-plate 330 is provided with a roller 333 running in a groove or cam-way in the cam-plate 334, which is bolted to the cam-section 18 of the central drum or column.

It will be seen that as the action of the cam plate 334 moves the slide-plate 330 radially to or from the center of the machine, the rack-bar 329 engaging the pinion 328 will rotate the shaft 326 and the gear wheel 327, which, meshing with the pinion 324, will rotate the bracket 235 upon its horizontal axis, thereby swinging the spindle with the bracket 235 upon the horizontal axis of the bracket 235.

*The spindle raising and lowering device.*

Slidable within the shaft 320 of the bracket 235 is a sleeve 335 provided at its inner end with collars 336 and 337 engaging opposite sides of a lug or support 338 carried on a slide-plate 339 (Fig. 60). The slide-plate 339 is provided with a roller 340, engaging a cam-way in a cam-plate 341, which is rigidly secured to the cam section 18 of the central drum or column. This is the device which rocks the bell crank 259, shown in perspective in Fig. 61ª, by which the spindle is supported and is bodily raised or lowered. The outer end of the sleeve 335 is provided with notches which engage the rollers 258ª on two of the arms of the bell crank 259, the bell crank being pivotally mounted on the pivot 342 in the bracket 235 (Fig. 6).

The spindle rotating device.

Rotatably mounted within the sleeve 335 is a shaft 343 (Figs. 6 and 60) provided on its innermost end with a spirally toothed pinion 344 and supported in a journal or bearing 345 formed on the bracket 322. On its opposite end the shaft 343 carries a bevel gear 346, which meshes with a bevel gear 347, shown in dotted lines in Fig. 2ª. The bevel gear 347 is keyed to one end of the vertical shaft 348, which is journalled in one of the arms of the bracket 235. The outer end of the shaft 348 carries a gear wheel 349, in a housing 349ª which gear wheel meshes with the pinion 296 on the spindle. The spiral gear 344 (Fig. 60) on the shaft 343 meshes with a rack-bar 350 carried by the slide-plate 351, which is provided with a roller 352, engaging a cam-way or groove in the cam plate 353, which is rigidly secured to the cam section 18 of the central drum or column.

As the engagement of the cam 353 with the roller 352 causes the slide-plate 351 to move radially inward or outward from the center of the machine, in the slide-ways 354, the rack-bar 350 rotating the spiral gear 344, will cause the shaft 343 to rotate and, thence through the train of gears 346, 347, 349 and 296, the spindle will be rotated upon its longitudinal axis.

The spindle centering device.

For the purpose of bringing the spindle into exact axial alignment with the neck molds when the spindle swings up to receive the blank and also for the purpose of holding the spindle in axial alignment with the finishing or paste mold while the blank is being finished, I provide what I call the centering device (Figs. 59, 69, 70, 71, 72, 74, 77 and 90) and attention is particularly called to Figs. 69, 70, 72 and 90.

This device consists of a pair of centering arms 355, each arm being keyed to a separate vertical shaft 356. The shafts 356 are vertically and rotatably mounted in vertical bearings 357 provided on the bracket 311, which is bolted to two of the upright posts 22 which rotate with the spiders (Figs. 70 and 72). Keyed to the lower ends of the shafts 356 are lever arms 358 (Figs. 69, 70 and 74). These lever arms 358 are respectively connected with a cross-head 359 by means of links 360. This arrangement of lever arms, links and cross-head I have, for convenience, termed the yoke (Fig. 77).

The cross-head 359 is pinned to a rod 361 which slides radially of the machine through a lug 362 bolted to the under side of the bracket 311 (Fig. 72). The inner end of this rod 361 passes through lugs 363 on a slide-plate 364 and is screwed through a nut 365 which is rotatably mounted between the lugs 363 (Fig. 3). The slide-plate 364 reciprocates in slide-ways 366 carried by the bracket 311, and is provided at its inner end with a roller 367 arranged to successively engage cams 368 (Figs. 6 and 90) secured to the cam section 18 of the central drum. Interposed between the forward lug 363 on the slide-plate 364 and the lug 362 on the bracket 311 is a spring 369 which surrounds the rod 361 and which normally forces the slide-plate backwardly or inwardly toward the center of the machine so as to hold the centering jaws open.

The operation of this device is such that as the rotation of the spiders carries the roller 367 in contact with either of the cams 368, the slide 364 is forced radially outward from the center of the machine, compressing the spring 369 and carrying the stem 361, cross-head 359 and links 360 forwardly, thereby rocking the lever arms 358, shafts 356 and the centering arms 355, and bringing the centering arms to the position shown in Fig. 70, where they are clamped around the spindle (Figs. 70 and 72), in which position the spindle is rotatably held in axial alignment with the position occupied by the finishing mold when it rises to receive the blank,—which is the position indicated on the left-hand side of Fig. 1, or it is held in axial alignment with the neck molds so as to receive the blank, which is the position indicated on the right-hand side of Fig. 1 and in Figs. 70 and 72.

The finishing mold.

This mechanism will be most readily understood from Figs. 1, 4, 7, 69, 72 and 91 to 96, inclusive.

In the particular machine shown in the drawings I have illustrated the use of my invention in connection with a paste mold, consisting of two half molds 370 (Fig. 93) provided with vents 371 and 372 and shown in the illustrations as adapted for the making of electric light bulbs. Each mold section is provided with a perforated lug or hinge 373. The bracket 374 (Fig. 72) is provided with a shoulder 375 into which, at right angles, is secured a pin 376 (Figs. 69 and 91). The hinges or perforated lugs on the mold sections are hingingly mounted upon the pin 376. Preferably the openings in the hinges 373 are tapered from the top downwardly, so that an externally tapered bushing may be slipped over the pin 376, and the hinges of the mold sections 370 in that event will be slipped over and rotate upon the tapered bushing. This, however, is a familiar structure forming no part of by present invention.

The bracket 374 is mounted upon the mold carrier 377 in such manner as to be slidably adjustable thereon longitudinally of the bracket 374 (Fig. 72). The mold carrier 377 is, in turn, mounted on bearing studs 378, secured to hangers 379, which are bolted to the flanges 299a of the box 299 (Fig. 69), which, in turn, is bolted to the lower spider 15. Formed upon the mold carrier 377 is an arm 380 provided with a roller 381 arranged to run in a cam groove 382 formed in a cam block 383 which is secured to a slide-plate 384 (Figs. 69 and 72). The slide-plate 384 reciprocates radially of the machine in slide-ways 385 formed in the box 299 and is provided with a roller 386 engaging a groove or cam-way in the cam-plate 387, which is rigidly secured to the cam section 18 of the central drum. The co-operation of the roller 386 and cam plate 387 results in reciprocating the slide-plate 384 radially of the machine, and the co-operation between the roller 381 on the arm 380 and the groove 382 on the block 383 are such that, as the slide-plate 384 is drawn inwardly toward the center of the machine, the arm 380 is rocked and, in turn rocks the mold carrier 377, so as to bring the mold carrier 377 and the parts carried thereby into the position shown in dotted lines in Fig. 4.

Secured between lugs 388 and 389 on the mold carrier 377 is a rod 390, upon which is slidably mounted a cross-head 391 (Figs. 72 and 91). Pivoted to a lug 392 on this cross-head is a rod 393, provided at one end with a collar 394, and extending at the other end through a lug 395 on the arm 396. A spring 397 surrounds the rod 393 and is seated at opposite ends against the lugs 394 and 395, respectively. A nut 398 on one end of the rod 393 engages the lug 395 on the arm 396.

The cross-head 391 has two rods or links 399 pivoted to it, one on each side, which rods are, in turn, pivotally connected with hinge pins 400 secured in lugs 401 on the mold sections 370, respectively (Figs. 72 and 91). The hinge pins 400 and the links 399 are also slidable with relation to each other lengthwise of the hinge pins 400.

The arm 396 is one arm of a bell-crank (Fig. 92) which rotates upon one of the studs 378. The opposite arm 402 of this bell crank is provided with a roller 403 running in a way or groove 404 in the cam block 383, but on the side thereof opposite to the cam-groove 382. Consequently, the reciprocation of the slide-plate 384, in addition to operating the arm 380 to swing the carrier 377 on its horizontal axis 378, also moves the bell crank arms 402 and 396 to compress the spring 397 against the collar 394 so as to force the rod 393 and the cross-head 391 forwardly, thereby, through the links 399, closing the mold sections.

The purpose of interposing the spring 397 is mainly a matter of safety in case a piece of hardened glass, or other non-yielding obstruction, should interfere with the closing of the mold sections.

Upon the reverse movement of the parts, the rocking of the lever arm 396 carries the lug 395 against the nut 398 and positively draws the rod 393 and the cross-head 391 backwardly, thereby opening the mold sections.

The contour and relations between the cam-grooves 382 and 404 in the cam-block 383 (Figs. 95 and 96) are such that the vertical parts of these cam-ways and the horizontal parts immediately adjoining the vertical parts are parallel with each other, but while the horizontal part of the cam-way 382 continues to be horizontal to the end of the cam-block 383, the cam-way 404 extends downwardly forward (Fig. 72).

The result of this arrangement is that when the rearward movement of the slide-plate 384 initially rocks the arm 380 so as to bring the mold carrier 377 to a horizontal position, bringing the molds 370 to a vertical position, the molds will remain open for a short part of the rearward travel of the slide-plate 384, but when the slide-plate 384 continues its rearward travel, without further affecting the arm 380, the arm 402 of the bell crank will be forced downwardly by the cam-way 404, thereby rocking the bell crank, forcing the cross-head 391 ahead and closing the molds 370. By virtue of this arrangement the molds are brought to a vertical position while open, are closed upon the blank at the proper moment, and open horizontally to release the blank before being dipped downwardly into the water tank.

For the purpose of adjusting the vertical position of the mold, the bracket 374 is longitudinally slidable upon the mold carrier 377, as heretofore noted, and is provided with a pin 405, engaging the slotted end of one arm 406 of a bell crank lever, the shaft 407 of which rotates in a bearing 408 on the mold carrier 377, and the opposite arm of which 409 is provided with a handle 410 and a spring-locked dog 411, which engages the teeth of a segmental rack 412. The lugs 413 and set screws 414 serve as stops to limit the movement of the arm 409 (Figs. 72 and 91).

It will be observed that the finishing mold operating mechanism operates not only to raise, open and close the mold at the proper times to receive and release the blank or bulb, but also serves to dip and raise the mold, so that at the proper point in the rotation of the machine the mold, after releasing the bulb will be automatically dipped into the water tank 415 (Figs. 1, 7 and 9), this tank being preferably formed with extensions 416 to provide for the radial swinging of the mold from its vertical position downwardly and back again as it comes out of the tank preparatory to receiving the next blank. The mechanism is so timed, of course, that the mold is open when it passes through the water tank.

The air control.

The air control involves five features, to-wit:

(1) The supply of air for cooling purposes;

(2) The partial vacuum utilized for gathering metal from the pot or furnace;

(3) The high pressure air;

(4) The low pressure air; (the two latter being used in the blowing steps of manipulating the glass) and (5) The air pressure relief.

Air cooling.

The air for cooling purposes enters through the air trunk 74 and main air pipe 75 (Fig. 1) whence it is conducted to the air chamber 417 in the lower section 9 of the central column. 8$^a$ (Fig. 8) indicates the port through the base plate with which the air pipe 75 connects. This chamber is formed by fitting a sheet metal drum 418 with the lower section 9 of the central column (Fig. 5), thereby providing an annular air chamber, into which project the strengthening webs 419. The lower spider 15 is cored to form an air chamber 420 (Figs. 4 and 97), which extends entirely around the interior of the lower spider and communicates, by ports 421 through its inner wall, with ports 422 in the main air chamber 417. The ports 421 in the lower spider 15 and the ports 422 in the lower section 9 of the central column are so staggered, with relation to each other, that the air chamber 420 in the spider 15 is in constant communication with the air chamber 417 in the central column.

The lower spider 15 is provided with raised bosses or pads 423 to receive the uprights or posts 22. These posts are hollow and the pads 423 are formed with cored openings 424. Cast in the lower spider 15 are bosses 425, from which webs 426 radiate between the openings 424. The bottoms of the uprights or posts 22 are formed with similar bosses 427, from which webs 428 radiate, providing therebetween openings which register with the openings 424. Each upright 22 is secured to the lower spider by a bolt 429 extending through one of the bosses 425 and screwed into the boss 427 on the bottom of the upright or post. Other bolts are passed through the top spider and screwed into threaded openings 430 in the top of each of the posts 22 (Fig. 97).

Each of the posts 22 is provided near its upper end, on its outer face, with a port 431 leading from its interior, and curved air pipes 432 are clamped at opposite ends to these openings and are provided with hollow upright extensions 433, into which perforated nozzles 434 are secured by screws 435 (Figs. 33 and 97).

When the ram carriage swings forwardly, after the neck molds have delivered the blank, it comes to a position where the open neck molds are above the nozzle 434 and are cooled by the air blown from the nozzle 434, until the ram reaches the point where it dips into the furnace, while the spiders, continuing to rotate, carry the nozzle 434 away from proximity to the ram (Fig. 33 and 34).

Of course, air for cooling purposes can be taken from the lower spider or from the the posts 22 in any desired or convenient manner.

Air for working the blank.

The air cam section 19 of the central column is provided with three continuous annular air chambers (Figs. 101, 104 and 106): The chamber 436 is the vacuum chamber, 437 is the low pressure chamber and 438 is the high pressure chamber. As these chambers are in a stationary part of the structure, pipes to supply the same with a vacuum or with air at the required pressure may be tapped into them at any convenient point, as at 436$^b$, 437$^b$ and 438$^b$ (Fig. 111).

Each of these air chambers is provided with an annular port 439, 440 and 441, respectively (Figs. 101, 104 and 106). Parallel with each of these annular ports are annular packing grooves 442, filled with packing material, two of these grooves being arranged between each of the ports 439, 440 and 441 (Fig. 106).

The top spider 21 is provided with corresponding chambers, to-wit; a vacuum chamber 443, a low pressure chamber 444 and a high pressure chamber 445, provided with segmental ports 446, 447 and 448, connecting respectively with the ports 439, 440 and 441, so that each of these chambers in the rotating upper spider is kept in constant communication with the corresponding chamber in the air section of the stationary central column (Figs. 10 and 106).

The under face of the upper spider is formed with downwardly extending annular projections, which fit into the packing grooves 442, and with bearing faces which rest upon the upper bearing face or surface of the air cam section of the central column. In this way communication between adjacent chambers is sealed (Figs. 2 and 106).

At 449 and 450 (Fig. 106) the under surface of the upper spider 21 is formed with an annular groove and at some convenient point bosses are formed which extend, one of them across the chamber 443 and the other across chambers 443 and 444, and holes are drilled leading from the top of the upper spider 21, through these bosses and through the webs 451 and 452, respectively (Fig. 106), into the annular grooves 449 and 450, respectively. This arrangement serves a double purpose; first, a convenient means for supplying oil to the bearing surfaces between the upper spider and upper surface of the air section of the central column; and, second, provides a vent, so that in case of any leakage from either of the chambers 443, 444 or 445, past the packing rings in the grooves 442, such leakage will escape to the exterior of the machine and will not enter the next adjacent air chamber and will not, in any way, disturb the air pressure therein.

*The vacuum control.*

From the vacuum chamber 443 in the upper spider, (Fig. 106), a port 453 communicates with an auxiliary vacuum chamber 454, from which a port 455, through a nipple 456, communicates with the vacuum chamber 184 in the ram carriage 109, through the groove 518 and port 457 in the ram carriage (Figs. 35 and 36), when the vacuum valve 460 is open. This nipple 456 is provided with a stem 458, around which is seated a spring 459, which normally holds the vacuum valve 460 to its seat, so as to close the port 453 (Fig. 106). The valve 460 is provided with a stem 461 extending through the boss 462, which connects the webs 451, 463 and 464 of the upper spider. A packing nut 465 surrounds the stem 461, making a tight joint. Pivotally mounted on the bracket 466 on the under side of the upper spider 21 is a bell crank 467, the short arm of which 468 engages the lower end of the valve stem 461. The lower end of the long arm of the bell crank lever 467 carries a roller 469 rotating on a pin 470, which is locked in position by the screw 471. A cam 472 secured to the air-cam section of the central column projects into the path of the roller 469, so that as the spider rotate, the engagement of the roller 469 with the cam 472 rocks the bell crank lever 467, lifting the valve stem 461, opening the vacuum valve 460, thereupon exhausting air through the passages 175 and 168 (Fig. 16), the chamber 186 in the ram, the ports 185 and 187 in the ram and ram carriage, respectively, the chamber 184 in the ram carriage, the port 457 in the ram carriage and the port 455 in the nipple 456 in the upper spider 21. This occurs when the neck molds at the end of the ram are dipped into the metal in the pot, and results in drawing the required metal up into the blank mold and neck molds.

The ram carriage is provided on its under side with a transverse groove 518, some part of which is always in register with the vacuum port 455 (Fig. 36). From this slot the port 457 leads to the vacuum chamber 184 in the ram carriage.

As the roller 469 passes the cam 472, the spring 459 reseats the valve 460 and closes the port 453.

*The high pressure air.*

From the high pressure chamber 445 in the upper spider 21 (Fig. 113) a port 473 communicates with a passage 474 in a valve casing 475, which is secured to the under side of the web 464 of the upper spider. The passage 474 leads to a valve chamber 476, which is closed by a plug 477 and is provided with a bushing 478, in which is provided an air port normally closed by the valve 479. To insure the accurate seating of this valve, I provide a washer 480, having a conical point 481, which bears upon the center of the valve 479 and is under pressure from the spring 482. The stem 483 of the valve 479 extends through a chamber 484 and through the valve casing 475 and also through a spring 485 seated in a chamber 486 in the valve casing 475.

Mounted to reciprocate within the chamber 486 is a plunger 487, which is normally held out of contact with the valve stem 483 by the spring 485. A pin 488, extending into a slot 489 in the plunger 487 holds the plunger 487 from being forced out of the chamber 486 by the spring 485. The plunger extends through a stuffing box 490 and is provided at its outer end with a roller 491. Projecting in the path of the roller 491 are various cams 492. Leading from the chamber 484 to a valve chamber 494 is a passage-way 493. The valve chamber 494 is provided with a plug 495, a nipple 496, a valve 497, a washer 498 and a spring 499, substantially the same as the corresponding parts in the valve chamber 476.

The chamber 500 in a nipple 496 communicates with a pipe 501 which leads to the hose 292, leading to the air pipe 291 on the spindle. The stem 502 of the valve 497 extends into a chamber 503 in the valve casing 475, through a spring 504. A plunger 505 is arranged to reciprocate within the chamber 503, extends through a stuffing box 506, is held in place by a pin 507, and is held normally out of contact with the valve stem 502 by the spring 504. This plunger 505 is provided with a roller 508 and cams 509 extend in the path of the roller 508, said cams being secured to the air section of the central drum.

The cams 492 and 509 may be arranged in such relation to each other that a cam 492 will contact with the roller 491 and pass out of contact with the roller 491 just before a cam 509 contacts with the roller 508. The result of this arrangement is that when a cam 492 contacts with the roller 491, the plunger 487 is driven sharply forward and quickly opens the valve 479, thereby permitting high pressure air from the air chamber 445 to fill the chamber 484, the passage 493 and the chamber 494. As a cam 492 passes out of contact with the roller 491, the plunger 487 will be quickly moved out of contact with the valve stem 483 by the spring 485 and the valve 479 will be sharply closed, leaving the chamber 484, passage 493 and chamber 494 filled with a definite quantity of air under a definite, predetermined pressure. Immediately thereafter, one of the cams 509 contacting with the roller 508, opens the valve 497 and, thereupon, a definitely measured quantity of air under a predetermined pressure expands through the pipe 501 and communicating pipes and hose, into the spindle, and through the spindle into the plastic blank which has been received by the jaws of the spindle from the neck molds, thereby subjecting the blank to a definite puff of air under definite pressure. This operation is repeated whenever required. Whenever it is so desired, the cams 492 and 509 will be arranged that the valves 479 and 497 may be simultaneously opened.

*The low pressure air.*

The low pressure air chamber in the upper spider is, at intervals, cored or extended down through the high pressure chamber (Fig. 116) and is in communication with valves and chambers arranged in a valve casing 510 secured to the under side of the upper spider (Fig. 114) said valves being arranged and actuated, if desired, exactly as the high pressure valves shown in Fig 113, and communicating through branch pipes 511 with the air pipe 501 leading to the spindle.

The low pressure air valve casings and valves are in structure and operation essentially the same as the high pressure valves and casings, except that from the chamber in the low pressure valve casing corresponding to the chamber 494 in the high pressure casing (Fig. 113), a port leads through a lug 519, with which lug the pipe 511 is connected, and in the low pressure casing the chamber corresponding to the chamber 500 in the high pressure casing, opens directly to the atmosphere through a lug or nozzle 520, so that the upper valve indicated at 521 in Fig. 114 controls the flow of air from the low pressure chamber and the lower valve indicated at 522 in Fig. 114 opens a vent or outlet to the atmosphere from the pipes 501 and 511.

In practice, I use about ten pounds per square inch for high pressure and about five ounces per square inch for low pressure. The pressure supplied to the air chambers can, of course, be controlled by any suitable pressure regulating device.

I have obtained best results by admitting the air in puffs to the spindle, either in measured quantities by opening the valves 479 and 497 in succession, or directly, by simultaneously opening said valves, and then quickly opening the relief valve 522, so as to relieve all pressure in the interior of the blank. This appears to produce a more equal distribution of glass in the finished article if the pressure is applied and relieved during the stages when the glass is still very soft. For example, when the spindle has received the blank and is still in upright position, I admit successively two or three puffs of high pressure air to the spindle, the air pressure being relieved through the relief valve between each puff, and the blank tending to sink down and flatten out upon itself in a mushroom-like shape after each puff. I believe that this allowing of the glass to settle back after each puff not only produces a more even distribution of glass in the walls of the bulb, but, by allowing the cooler glass to settle back towards the hotter part of the blank, produces a more even distribution of heat in the blank, whereby the ultimate result of an even distribution of glass throughout the walls of the bulb is more readily obtained.

When the shaping of the blank has been substantially completed in the finishing molds and the blank is rapidly becoming set, although still somewhat plastic, I admit full, direct high pressure, whereby the blank is blown to its final form and is internally supported in the mold, but just as the mold is about to open, since the blank or bulb may still be sufficiently plastic to be distorted by the continued internal application of high pressure air, when no longer externally supported by the mold, and on the other hand, may still be sufficiently plastic to collapse if internal pressure is entirely withdrawn, I shut off the high pressure and admit the low pressure only which low air pressure is insufficient to now expand the bulb, but is sufficient to support it. Under these conditions, the finishing mold opens and the bulb, upon being exposed to the external atmosphere, becomes finally set without collapsing, before the jaws on the spindle open and deliver the completed bulb.

Referring to Fig. 53, 492 are cams for opening the first or upper high pressure valve, 509 are cams for opening the high pressure valve leading to the air pipes communicating with the spindle, 523 are the cams for opening the relief valve 522 to the atmosphere, and 472 is a cam for opening the vacuum valve, and 533 are the low pressure valve cams.

It must be understood that the particular arrangement of valve-actuating cams, as shown, for instance, in Figs. 84, 101, 104, 105 and 111 is not essential and is largely arbitrary as the exact position of these cams on the periphery of the drum or column, and also with relation to each other, may be changed as conditions or experience may suggest or require the arrangement illustrated merely being one typical arrangement which I have found to be effective.

Various devices, some of which have been indicated, are used to provide an ample supply of oil to the various bearing surfaces, it being my purpose, so far as possible, to supply oil at the top of the machine and allow it to feed by gravity over the various bearings.

Thus, for example, the topmost of the rings 23 (Fig. 2) is shaped to provide an annular channel, from which oil will feed by gravity down between the rings 23 and the top section 20 of the drum and also between the upper spider and the surfaces upon which it bears.

The annular grooves 11 and 12 serve to keep a supply of oil around the roller bearings upon which the lower spider rotates; and, as indicated in Fig. 43, oil pockets, such as 532 may be provided at convenient points, from which oil pockets the oil will drip through oil holes into the various slide mechanisms, but these are matters of minor importance, as various devices to this end can be used.

With the machine constructed and the parts adjusted in the specific arrangement shown in the drawings, a typical operation of the parts of one unit during one complete cycle or revolution of the spiders, beginning just before the rotation of the spiders brings the ram to the position shown in Fig. 3, is as follows:

(1) As the rotation of the spiders brings the ram opposite the beginning of the notch 208ª in the cam 208 (Fig. 33), the roller on the end of the stem 203 being released from contact with the cam 208, the stem 203 is forced backwardly by its actuating spring and the neck molds close (Fig. 33).

(2) At the same time the roller 117 is carried by the travel of the spiders into the transverse slot on the under side of the ram dog slide 119 and as the ram reaches a point in radial alignment with the notch 208ª, as shown in Fig. 33, the cam-way on the under side of the rotating ram slide cam plate 27, in engagement with the roller 125, forces the ram slide 121 radially inward toward the center of the machine, thereby causing the ram to travel forward and downwardly into the working opening of the furnace.

(3) Simultaneously with the last mentioned movement, the cam actuating the ram swinging mechanism has, through said mechanism, arrested the rotation of the ram about the axis of the machine.

During the time that the ram ceases to rotate about the center of the machine, the following movements occur:

(4) As the ram enters the working chamber of the furnace, the bell crank 230 is carried by the ram away from engagement with the inclined plane or cam 233, whereupon the actuating spring of the cut-off device swings the cut-off knife back to the position shown in Fig. 15.

(5) Following the swinging back of the cut-off knife the neck molds enter the metal in the pot or furnace; and (6) The rotation of the spiders brings the lever arm 467 (Fig. 106) in contact with the vacuum cam 472 on the central drum, thereby opening the vacuum valve 460 and creating an exhaust which draws the metal up into the chamber formed by the blank mold and the neck molds.

(7) The cam on the ram slide cam plate 27 forces the ram slide 121 radially outward thereby causing the ram to withdraw from the furnace and to move radially inward on the machine.

(8) As the ram moves backward, the bell crank 230 rises on the plane 233 (Fig. 15) and the cut-off knife is swung across the face of the neck molds to the position shown in Fig. 47, cutting off the superfluous metal and dropping it clear of the gathering ring.

(9) Also, as the ram retreats, the port 185 leading into the chamber 186 in the ram (Figs. 13 and 35) is carried out of register with the port 187 leading from the vacuum chamber 184 in the ram carriage, and the lever 467 (Fig. 106) passes out of contact with the vacuum cam, so that the vacuum valve is automatically closed.

(10) As the backward movement of the ram carries the port 185 into register with the slot 188 in the ram carriage, air rushes in through the port 185 to the chamber 186 and passages 168 in the ram and behind the blank which is now suspended in the neck molds by the neck which has been formed on the blank.

(11) As the ram completes its return travel, the parts have assumed about the position shown in Fig. 34.

(12) About simultaneously with the completion of the radially inward movement of the ram, the spindle swinging cam actuates the spindle swinging mechanism so that the spindle comes to the vertical position shown at the right hand side of Fig. 1.

(13) As the spindle reaches the vertical position, the centering arms 355 clasp it (Figs. 1 and 6) and the spindle and ram arrive at the relative position shown in Fig. 5.

At this point the parts are in the position shown in Fig. 34, the spindle and neck molds being in axial alignment with each other, the centering device determining the exact vertical position of the spindle, while the stop 515 abutting the pin 517, when the ram swinging mechanism has ceased its work of stopping the rotation of the ram, insures that the ram shall be stopped at the point where the neck molds are in alignment with the spindle. The ram now resumes its travel with the spiders and the ram swinging mechanism remains for a time stationary; that is to say, it is not operating to move the ram.

(14) As the ram and spindle now rotate together about the axis of the machine, the bell crank actuating cam causes the bell crank 259 to raise the spindle vertically to the position shown in Fig. 16 and practically simultaneously therewith the yoke operating cam rocks the yoke lever 276 downwardly against the flange 279 on the bottom of the spindle, causing the spindle jaws to open, as shown in Fig. 55ª.

(15) At the same time, the resumed rotation of the ram around the axis of the machine has caused the roller on the end of the plunger 203 to rise upon the cam 208, thereby causing the neck molds to open immediately after the spindle jaws have opened, whereupon the blank drops into the plunger tip 242 of the spindle.

(16) At this point the yoke actuating cam raises the yoke out of contact with the flange 279 on the bottom of the spindle, whereupon, the spindle jaws are closed by their actuating spring, and, at the same time, the cam actuating lever 287 (Fig. 72) causes the lever 287 to strike the lower end of the secondary plunger 284 in the spindle, so that as the spindle jaws close upon the blank, the plunger tips 242 and 250 simultaneously move towards the thimbles 248 on the spindle jaws 236 and the secondary plunger tip 250 is not only forced into the plastic blank 243, but closes the central port through the plunger tip 242, so that none of the glass of the blank will be squeezed into said port (Fig. 55). The blank is thus tightly sealed between the plunger tip 242 and the thimbles on the spindle jaws so that no air can escape around the blank, an air chamber is started in the blank, and the blank is stiffened and chilled immediately adjacent to the plunger tip.

(17) At about this time, the mold carrier actuating device operates to lift the paste mold out of the water tank, after which they again swing downwardly to be out of the way of the spindle when its swings downwardly.

(18) Immediately after the blank is sealed in the end of the spindle, the cam actuating the lever 287, permits the lever 287 to be carried out of contact with the lower end of the secondary plunger 249, whereupon the expansion of the spring 286 unseats the secondary plunger tip 250 from the port in the plunger tip 242, thereby leaving a clear air passage through the spindle to the interior of the blank.

(19) While the spindle still remains in vertical position with its jaws uppermost, the high pressure air valves 479 and 496 are simultaneously opened and closed admitting a short puff of high pressure air into the blank.

(20) Immediately following this puff, the relief valve 522 opens, the air pressure in the blank is relieved, and the expanded and relatively cool part of the blank settles back on the warmer portion of the blank.

(21) At this point, I give another short puff of high pressure air to the vertically held blank, the puff being immediately relieved by the immediate opening of the relief valve.

(22) At this point the ram swinging cam actuates the ram swinging mechanism and swings the ram forward to the relative position on the spider shown in Fig. 33, where the open neck molds and the blank molds are immediately above the blast of air projected through the air-pipe extension 433, which position they occupy until the ram again comes opposite to the working opening of the furnace.

(23) At about this point, the spindle rotating cam causes the spindle to rotate on its longitudinal axis first in one direction and then in the reverse direction, and another puff of air is admitted to the blank and immediately relieved.

(24) Following this third puff of air the spindle swinging cam causes the mechanism actuated by it to swing the spindle downwardly on the horizontal axis of the bracket 235 and as it starts to swing downward another puff of air is admitted to the interior of the blank and immediately relieved.

(25) The spindle is now caused to swing backwards and forwards in a series of gradually reduced oscillations or pendulum-like movements, whereby the blank is swung out.

(26) The open molds now rise preparatory to receiving the blank.

(27) As the oscillations of the spindle stop another puff of air is admitted to the blank and relieved, and the centering device clasps the spindle and holds it in axial alignment with the finishing molds.

(28) The molds now close about the blank.

(29) While the blank is contained in the molds, the spindle still carrying the blank rotates constantly first in one direction and then in the reverse direction.

(30) While the spindle is rotating the blank in the closed mold, the low pressure air valve is gradually opened by a suitably formed cam, so as to gradually admit low pressure air to the interior of the blank and then the high pressure air valves are both opened wide and the blank is subjected to the maximum air pressure which the machine supplies, which pressure is continued until just before the finishing molds open.

(31) At this point, just before the finishing molds open, the air valves are closed so that the blank will not be subjected to further pressure after the molds open, but, as the blank is now substantially set as a finished bulb, the relief valve is not opened when the air valves are now closed, so when the finishing molds open, the compressed air admitted to the blank or bulb is still confined there and, while it serves to support the walls of the bulb and prevent any collapse when these walls are no longer supported by the finishing mold, the air so confined does not further expand the bulb. This may be due, in part, to the fact that the enclosed compressed air has been highly heated and expanded while the blank was confined in the mold and is rapidly cooling and contracting when the blank or bulb is exposed to the outer air, so that it just sufficiently supports the still somewhat plastic bulb from collapsing until it is definitely set.

(32) The finishing molds now open and descend into the water tank and shortly thereafter the jaws on the spindle open and deliver the finished bulb, and the cycle of rotation has been completed.

The foregoing cycle of operation is explained merely for the purpose of giving a statement of a typical operation of the machine when all of the features explained are used, but it will be readily seen that these steps may be varied within a wide range, even if the machine be used complete with all the parts named. Such variations, however, are merely matters of shop expedience and convenience as experience or differing conditions may suggest, and, in particular, the manner, character and frequency of the puffs of air used, and the particular times at which they are admitted to the interior of the blank are matters as to which a wide range of variation is permissible. So far as the mechanisms of my invention are concerned, these are matters of no moment.

Considering as an entirety the machine illustrated in the drawings and above described, it will be noted that for an automatic glass-working machine which shall do all the work necessary from gathering the metal to delivering the finished article, this machine is simple in construction, has many less parts than other machines designed to do similar work and is simple and reliable in action. But, notwithstanding these features, it has a capacity for doing a wider range of work in the automatic manufacture of glass than is possible with other machines and, if used to simply gather glass and blow it into an iron mold, many of the parts above described may be dispensed with, thereby still further simplifying the structure.

It will be noted, also, that where springs are used in my machine, they are mostly used to operatively actuate the mechanisms with which they are associated, so that such mechanisms are always under tension to do their work, and yet, if they encounter unexpected resistances, such as a hardened blank or other obstruction in the mechanism, the fact that they are spring actuated to do their work enables them to yield to such obstructions without injury to the mechanism.

It will thus be noted that the positive movements are largely movements whereby a mechanism is withdrawn from its work and against the action of its actuating spring. This feature I consider a great advantage in a machine of this character and I have used it wherever possible.

I again repeat, however, that the particular machine illustrated and described is merely a typical embodiment of all of the features I have above described, but the specific construction described herein is merely by way of illustration and not by way of limitation or narrowing of my claims, as, obviously, a great many changes in construction and design can be made without departing from my invention, and, obviously, also, various of the features described can be omitted, leaving the machine still operative to usefully do certain of the work described and such changes are contemplated by me and would not involve any departure from my invention.

So far as the broad features of my invention are concerned, it will be understood that there is no significance in the particular way shown in the drawings for supplying what I have conveniently called the gathering mechanism with the metal for forming the blank. The essential thing, as to the features of my invention which involve the gathering mechanism, is that the gathering mechanism shall be charged with the necessary quantity of the metal, but obviously while this may be conveniently done in the manner shown, by means of a partial vacuum created in the gathering mechanism, any method or means for supplying the molten metal to what I have conveniently called the gathering mechanism is within the contemplation of my invention, In Figs. 132 to 142, I have shown the successive steps in the formation of an electric light bulb with my machine.

In Fig. 132 the gathering mechanism is shown just dipping in the metal in the pot, the cut-off knife 209 being drawn back and the metal partially filling the blank forming molds. In Fig. 133 the blank forming molds are filled with the metal, the gathering mechanism is withdrawing from the pot or furnace, and the cut-off knife is shearing off the surplus metal at the feed-in opening in the neck molds. In Fig. 134 the upper end of the spindle mechanism is shown in alignment with the neck molds, with the spindle jaws 248 open. The neck molds 177 are also shown as open and the blank 243 is dropping by gravity into the upper end of the reversed spindle or blowpipe. In Fig. 135 the spindle jaws have clamped and spread out the collar formed on the blank 243 so that the blank is securely sealed between the spindle jaws 248 and the plunger tip 242, and the second plunger tip 250 has risen and formed the initial chamber in the blank 243. In Fig. 136 the second plunger tip 250 has withdrawn from the opening in the plunger tip 242 and the initial puff of air under pressure has been admitted, partially expanding the blank 243 in an upward direction. In Fig. 137 the air pressure has been relieved and the expanded part of the blank 243 is shown as settling back by gravity. In Fig. 138 the blank 243 is shown as still further expanded by air under pressure. In Fig. 139 the blank has been swung outwardly and downwardly, elongating it as shown. In Fig. 140 the blank has been further expanded by air pressure and is ready to be received in the finishing molds. In Fig. 141 the blank is shown as fully expanded in the finishing molds; and Fig. 142 shows the finished bulb.

While I have conveniently referred to a certain part of the mechanism as the spindle, it should be understood that this is primarily merely a convenient term of designation and does not necessarily limit the claims including that feature to a structure which has a capacity for rotation about its vertical axis.

I do not here claim either specifically the part which I have called the spindle or any combinations thereof which do not include the gathering mechanism, nor do I here specifically claim the cut-off mechanism shown, nor the devices for controlling the air and vacuum supply to the machine, nor the forming molds, nor the raising and lowering mechanism, reserving the right to file divisional applications as to these various inventions considered by themselves or in combinations not including the gathering mechanism. The present application is confined to the gathering mechanism and to various combinations and sub-combinations involved in the gathering mechanism itself and in the combination of the gathering mechanism with some one or more of the other features shown and described, as is more fully set forth in the claims.

I claim:

1. The combination with a moving support, of gathering mechanism carried thereby, means for arresting the travel of said gathering mechanism with said support during the continuance of the movement of said support, and means for returning the gathering mechanism to a position on said support occupied by it before its travel was so arrested.

2. The combination with a moving support, of gathering mechanism supported thereby, means for arresting the travel of the gathering mechanism during the continuance of the movement of said support, and means for returning the gathering mechanism to its original position upon said support.

3. The combination with a continuously moving support, of gathering mechanism arranged to travel therewith, means for intermittently arresting the travel of the gathering mechanism with said support, and means for automatically returning the gathering mechanism to its original position with relation to said support.

4. The combination with a support continuously travelling in one direction, of a gathering mechanism arranged to travel therewith, automatically operated means for periodically arresting said travel of the gathering mechanism while the travel of said support continues, and automatically operated means for periodically returning the gathering mechanism to its original position upon said support.

5. The combination with a support continuously travelling in one direction, of a gathering mechanism arranged to travel therewith, automatically operated means for periodically arresting said travel of the gathering mechanism while the travel of said support continues, and automatically operated means for periodically causing the gathering mechanism to resume its travel with said support and for later returning the gathering mechanism to its original position upon said support.

6. The combination with a continuously rotating support, of a gathering mechanism supported thereon, movable thereon and arranged to travel therewith about the same axis, of means for periodically arresting said travel of the gathering mechanism while the rotation of said support continues, and means for periodically returning said gathering mechanism to its original position upon said support.

7. The combination with a continuously rotating support, of a gathering mechanism supported thereon, movable thereon and arranged to travel therewith about the same axis, of automatically actuated means for periodically arresting said travel of the gathering mechanism while the rotation of said support continues, and automatically actuated means for periodically returning said gathering mechanism to its original position upon said support.

8. The combination with a melting furnace, of a support arranged to continuously travel in front of said furnace, a gathering mechanism supported on and arranged to travel with said support, means for periodically arresting said travel of the gathering mechanism when opposite a certain point in said furnace, and means for returning the gathering mechanism to its original position on said support and for causing it to resume its travel with said support.

9. The combination with a glass furnace provided with a working opening, of a support arranged to travel continuously past said working opening, a gathering mechanism carried by said support, automatically actuated means for periodically arresting the travel of said gathering mechanism with said support, and automatically actuated means for periodically returning said gathering mechanism to its original position on said support and for causing it to resume its travel with said support.

10. The combination with a glass furnace provided with a working opening, of a continuously rotating support arranged in front of the working opening of said furnace, a gathering mechanism carried by and arranged to travel with said support, automatically actuated means for periodically arresting the travel of said gathering mechanism with said support and for periodically returning said gathering mechanism to its original position upon said support and for causing said gathering mechanism to resume its travel with said support.

11. The combination with a rotatable support, of means for rotating said support, gathering mechanism supported on said support, a stationary cam, and mechanism carried by said support and actuated by said cam whereby at times during the rotation of said support the travel of said gathering mechanism with said support will be arrested and thereafter said gathering mechanism will be returned to its original position on said support and will be caused to resume its travel therewith.

12. The combination with a continuously rotating support, of a stationary cam, gathering mechanism supported on and arranged to travel with said support, a rack bar connected with said gathering mechanism, a slide carried by said support and arranged to be actuated by said cam during the rotation of said support, and gearing actuated by the operation of said slide when said slide is actuated by said cam, said gearing meshing with said rack bar, all arranged to periodically arrest the travel of said gathering mechanism and to thereafter return the gathering mechanism to its original position on said support.

13. The combination with a continuously travelling support, of a stationary cam, gathering mechanism supported on and arranged to travel with said support, a rack bar connected with said gathering mechanism, a slide carried by said support and arranged to be actuated by said cam during the rotation of said support, and gearing actuated by the operation of said slide when said slide is actuated by said cam, said gearing meshing with said rack bar, all arranged to periodically arrest the travel of said gathering mechanism and to thereafter return the gathering mechanism to its original position on said support.

14. The combination with a continuously traveling support, of gathering mechanism supported thereon, movable thereon and arranged to travel therewith, a rack bar carried by said gathering mechanism, a stationary cam, a slide plate carried by said support, means on said slide plate arranged to engage said cam so as to actuate said slide plate, a rack connected with said slide plate, a shaft provided with a pinion in mesh with said last-named rack, and a second pinion carried by said shaft and in mesh with the rack bar on the gathering mechanism, all so arranged that during the continuous rotation of said support the travel of said gathering mechanism with said support will be periodically arrested, after which said gathering mechanism will be periodically returned to its original position on said support and will resume its travel with said support.

15. The combination with a continuously rotating support, of gathering mechanism supported thereon and movable thereon, a stationary cam, a slide carried by said rotating support and provided with means contacting with said cam, whereby said slide will be periodically moved radially to and from the axis about which said support rotates, and gearing interposed between said slide and said gathering mechanism, whereby the travel of said gathering mechanism with said support will be periodically arrested during the continued rotation of said support and said gathering mechanism will then be returned to its original position on said support and will be caused to resume its travel with said support.

16. The combination with a continuously rotating support, of a stationary support about which said first-named support rotates, gathering mechanism supported on and arranged to travel with and to be movable upon said first-named rotating support, said gathering mechanism being also rotatably connected with said stationary support, a cam carried by said stationary support, a slidable plate carried by said rotating support, radially slidable thereon and provided with means contacting with said cam, whereby during the rotation of said rotating support said slide will be periodically moved radially upon said rotating support, a rack bar carried by said slide, a rack bar carried by said gathering mechanism, a shaft carried by said rotating support and provided with two gears or pinions, one of which meshes with the rack bar connected with said slide plate and the other of which meshes with the rack bar on said gathering mechanism.

17. The combination with a continuously moving support, of gathering mechanism supported thereon, parts of said gathering mechanism being slidable outwardly upon said support, and means whereby during the continued travel of said support, said parts of said gathering mechanism will be periodically moved outwardly from said support and returned to their original positions.

18. The combination with a continuously moving support, of gathering mechanism supported thereon, parts of said gathering mechanism being slidable in a direction other than the line of travel of said support, and automatically actuated means for periodically sliding said parts of the gathering mechanism outwardly with reference to said support and for returning the same to their original positions with relation to said support.

19. The combination with a continuously rotating support, of gathering mechanism supported thereon and arranged to travel therewith, parts of said gathering mechanism being slidable with relation to said support, of automatically actuated means for periodically sliding parts of said gathering mechanism radially outward with relation to said support and for returning the same radially inward to their original positions with relation to said support.

20. The combination with a continuously rotating support, of gathering mechanism supported thereon and arranged to travel therewith, parts of said gathering mechanism being slidable with relation to said support, of automatically actuated means for periodically sliding said parts of said gathering mechanism radially outward and downward with relation to said support and for returning the same radially inward and upward to their original positions with relation to said support.

21. The combination with a furnace provided with a working opening, of a continuously moving support arranged to travel past said furnace, gathering mechanism travelling with and supported on said support, and means for periodically projecting parts of said gathering mechanism along a straight line into said working opening and for withdrawing the same from said working opening.

22. The combination with a furnace provided with a working opening, of a continuously moving support arranged to travel past said furnace, gathering mechanism travelling with and supported on said support, and means for periodically arresting the travel of said gathering mechanism with said support and for causing the same to resume its travel with said support, and means for projecting parts of said gathering mechanism into said working opening and for withdrawing the same from said working opening while the travel of the gathering mechanism with said support is arrested.

23. The combination with a glass furnace provided with a working opening, of a continuously rotating support arranged in front of said opening, gathering mechanism arranged to travel with and supported on said support, means for periodically arresting said travel of the gathering mechanism and for causing the gathering mechanism to resume such travel, and means for projecting parts of the gathering mechanism into said working opening and for withdrawing the same therefrom while said travel of the gathering mechanism is so arrested.

24. The combination with a glass furnace provided with a working opening, of a continuously rotating support arranged in front of said opening, gathering mechanism arranged to travel with and supported on said support, means for periodically arresting said travel of the gathering mechanism and for causing the gathering mechanism to resume such travel, and means for periodically projecting parts of said gathering mechanism radially of said machine outward and downward into said working opening and for withdrawing the same therefrom while said travel of the gathering mechanism is so arrested.

25. The combination with a continuously rotating support, of a ram carriage mounted thereon and arranged to travel therewith, a ram movable on said carriage radially of said support, automatically actuated means for periodically arresting the travel of said ram carriage with said support and for causing said ram carriage to resume said travel, and automatically actuated means for moving said ram radially outward from said support and back again while the travel of said ram carriage is so arrested.

26. The combination with a continuously rotating support, of a ram carriage supported thereon and arranged to travel therewith, automatically actuated means arranged to periodically arrest said travel of said ram carriage, to thereafter cause said ram carriage to resume said travel and to restore said ram carriage to its original position on said support, and automatically actuated means for projecting said ram radially outward from said support and for returning said ram to its original position on said ram carriage during the time that said travel of the ram carriage is so arrested.

27. The combination with a continuously rotating support, of a ram carriage, a ram slidable thereon radially of said support, and means actuated by the rotation of said support for periodically moving said ram radially outward and back with relation to said support.

28. The combination with a rotatable support, of a ram slidable thereon radially to the axis of rotation of said support, gathering mechanism carried by said ram and means, actuated by the rotation of said support, for reciprocating said ram.

29. The combination with a support, of a ram carriage, having a vacuum chamber and a port leading from said chamber, means for producing a partial vacuum in said chamber, a ram slidable on said carriage and provided with a chamber and a port leading therefrom and adapted to be brought into register with said port in the carriage, gathering means on said ram in communication with the chamber in said ram, and automatic means for periodically and slidingly reciprocating said ram upon said carriage whereby said ports are successively brought into and out of register.

30. The combination with a travelling support, of a ram carriage movable thereon, a ram slidable upon said carriage transversely of the line of travel of said carriage, and means actuated by the travel of said support for periodically reciprocating said ram.

31. The combination with a furnace provided with a working opening, of a travelling support, a ram carriage carried thereby and adapted to travel therewith, a ram movable on said carriage, gathering mechanism carried on said ram, means for arresting the travel of said carriage during the travel of said support and for causing said carriage to resume said travel, means for projecting said ram into said working opening and for withdrawing the same therefrom while the travel of said carriage is so arrested, and means co-operating with the gathering mechanism carried on said ram, whereby the gathering mechanism will gather molten metal from said furnace when the ram is so projected into said working opening.

32. The combination with a glass furnace provided with a working opening, of a support arranged to continuously rotate in front of said furnace about a vertical axis, a ram carriage movably mounted upon and arranged to travel with said support, a ram slidable upon said carriage radially of said support, gathering mechanism carried by said ram, means for periodically arresting the travel of said carriage with said support and for causing said carriage to resume said travel and to be returned to its original position on said support, means for periodically projecting said ram radially downward and into said working opening and back again while the travel of said ram carriage is so arrested, and means co-operating with said gathering mechanism to gather molten metal in said gathering mechanism when the ram is so projected into said working opening.

33. The combination with a glass furnace, of a travelling support, gathering mechanism movable on said support, means providing a vacuum chamber, automatically actuated mechanism for periodically moving said gathering mechanism on said support into and out of said furnace, and means actuated by the travel of said gathering mechanism for opening communication between said gathering mechanism and said vacuum chamber.

34. The combination with a glass furnace, of a travelling support, gathering mechanism movably supported thereon, a passage in said gathering mechanism communicating with the gathering end thereof, mechanism automatically actuated by the travel of said support for periodically projecting the gathering end of said gathering mechanism into said furnace and for withdrawing it therefrom, automatically actuated means for producing a partial vacuum in said passage in the gathering mechanism when the gathering end thereof is dipped in the molten metal in said furnace, whereby said gathering mechanism is caused to gather a quantity of metal from said furnace, means for destroying said partial vacuum when the gathering mechanism has been withdrawn from the furnace, and means for at once entirely releasing from the gathering mechanism, the metal so gathered.

35. The combination with a glass furnace, of a support, gathering mechanism movably supported thereon and comprising a neck mold arranged to form a supporting projection on the gathered blank, a passage in said gathering mechanism communicating with the gathering end thereof, automatically actuated mechanism for periodically projecting the gathering end of said gathering mechanism into said furnace and withdrawing it therefrom, automatically actuated means for producing a partial vacuum in said passage in the gathering mechanism when the gathering end thereof is dipped in the molten metal in said furnace, whereby said gathering mechanism is caused to gather a quantity of metal from said furnace, means for automatically destroying said partial vacuum as the gathering mechanism has been withdrawn from the furnace, and means for at once wholly releasing from the gathering mechanism, the metal so gathered.

36. The combination with a continuously moving support, of gathering mechanism mounted thereon, movable thereon and adapted to travel therewith, said gathering mechanism comprising a ram and a gathering device carried thereby, said ram being provided with a passage communicating with said gathering device, a glass furnace, means for periodically arresting the travel of said gathering mechanism and for causing said gathering mechanism to resume said travel and to be returned to its original position on said support, means for moving the part of said ram carrying said gathering device into said furnace and back again while the travel of said gathering mechanism is so arrested, and automatically actuated means for creating a partial vacuum in said passage in the ram when the gathering device carried by the ram is inserted in the furnace.

37. The combination with a continuously moving support, of gathering mechanism mounted thereon, movable thereon and adapted to travel therewith, said gathering mechanism comprising a ram and a gathering device carried thereby, said ram being provided with a passage communicating with said gathering device, a glass furnace, means for periodically arresting the travel of said gathering mechanism and for causing said gathering mechanism to resume said travel and to be returned to its original position on said support, means for moving the part of said ram carrying said gathering device into said furnace and back again while the travel of said gathering mechanism is so arrested, automatically actuated means for creating a partial vacuum in said passage in the ram when the gathering device carried by the ram is inserted in the furnace, and means for destroying said partial vacuum when the gathering mechanism has been withdrawn from the furnace.

38. The combination with a continuously moving support, of gathering mechanism mounted thereon, movable thereon and adapted to travel therewith, said gathering mechanism comprising a ram and a gathering device carried thereby, comprising a neck mold, said ram being provided with a passage communicating with said gathering device, a glass furnace, means for periodically arresting the travel of said gathering mechanism and for causing said gathering mechanism to resume said travel and to be returned to its original position on said support, means for moving the part of said ram carrying said gathering device into said furnace and back again while the travel of said gathering mechanism is so arrested, automatically actuated means for creating a partial vacuum in said passage in the ram when the gathering device carried by the ram is inserted in the furnace, and means for destroying said partial vacuum when the gathering mechanism has been withdrawn from the furnace.

39. The combination with a glass furnace, of a continuously travelling support, gathering mechanism mounted thereon, movable thereon and adapted to travel therewith, said gathering mechanism comprising a ram carrying a gathering device and provided with a passage communicating with said gathering device, automatically actuated means for periodically arresting the travel of said gathering mechanism, causing said gathering mechanism to resume said travel and to be returned to its original position on said support, automatically actuated means for moving the part of the ram carrying said gathering device into the furnace and back again, means for creating a partial vacuum in a passage communicating with said passage in the ram, a valve controlling communication between said passages, and cam actuated mechanism carried by said support and arranged to be periodically actuated by the travel of said support to open said valve when said gathering device is in said furnace.

40. The combination with a glass furnace, of a continuously travelling support, gathering mechanism mounted thereon, movable thereon and adapted to travel therewith, said gathering mechanism comprising a ram carrying a gathering device and provided with a passage communicating with said gathering device, automatically actuated means for periodically arresting the travel of said gathering mechanism, causing said gathering mechanism to resume said travel, and to be returned to its original position on said support, automatically actuated means for moving the part of the ram carrying said gathering device into the furnace and back again, means for creating a partial vacuum in a passage communicating with said passage in the ram, a valve controlling communication between said passages, cam actuated mechanism carried by said support and arranged to be periodically actuated by the travel of said support to open said valve when said gathering device is in said furnace, and means for automatically cutting off from said gathering device any surplus metal gathered thereby.

41. The combination with a glass furnace, of a stationary support arranged in front of said furnace and provided with a vacuum chamber, a movable support provided with a vacuum chamber and arranged to continuously rotate about said stationary support, gathering mechanism mounted upon, movable on and adapted to travel with said rotating support, said gathering mechanism comprising a ram carrying a gathering mold and provided with a passage communicating with said mold and periodically in communication with the vacuum chamber in said rotating support, a cam secured to said stationary support, mechanism carried by said rotating support and arranged to be actuated by engagement with said cam to periodically arrest the travel of said gathering mechanism with said rotating support, to cause the gathering mechanism to resume said travel and to be returned to its original position on said rotating support, means arranged to move said ram radially of said rotating support and downwardly so as to cause the part thereof carrying said gathering device to enter said furnace, and to return said ram to its original position while the travel of said gathering mechanism is so arrested, means for creating a partial vacuum in the chamber in the stationary support, a valve controlling communication between the chamber in the stationary support and the chamber in the rotating support, a cam on said stationary support, and valve operating mechanism carried by said rotating support and arranged to open said valve when said valve operating mechanism is caused to contact with said cam by the movement of said rotating support at the time when said gathering device is in said furnace.

42. The combination with a furnace, of a continuously travelling support, gathering mechanism carried thereby and comprising a ram, of means for periodically moving said ram into and out of said furnace, said means comprising a cam supported separately from said travelling support, and mechanism coacting with said ram and arranged to be actuated by relative movement between said cam and said mechanism.

43. The combination with a furnace, of a support, a ram mounted upon said support, and automatically actuated means for periodically moving said ram into said furnace and back again, said means comprising cam actuated mechanism co-operating with said ram, a support, a cam carried by said last-named support, said first-named and last-named supports being movable with relation to each other in such manner that when such relative movement causes said cam actuated mechanism to engage with said cam, said mechanism will be actuated to operate said ram in the manner above specified.

44. The combination with a furnace, of a rotating support, a ram supported thereon, and means for periodically moving said ram into said furnace and back again, said means comprising mechanism for so operating said ram and a travelling cam which periodically actuates said mechanism to operate said ram in the manner described.

45. The combination with a furnace, of a continuously moving support, a ram carried thereby, and means for periodically moving said ram into said furnace and back again, said means comprising ram operating mechanism and a cam which periodically operates to actuate said mechanism so as to operate the ram in the manner above described.

46. The combination with a furnace, of a continuously moving support, a ram carried thereby, and means for periodically moving said ram into said furnace and back again, said means comprising a support, a cam carried thereby, ram actuating mechanism interposed between the ram and said cam, all co-operating so that at the required periods the travel of the first-named support brings the ram into operative relation with the ram operating mechanism and the travel of the second named support brings the cam into co-operative relation with the ram operating mechanism, whereby the ram is operated in the manner specified.

47. The combination with a furnace, of a continuously moving support, a ram carried thereby, and means for periodically moving said ram into said furnace and back again, said means comprising a stationary support, ram operating mechanism carried thereby, a rotating cam support, and a cam supported thereby, all so arranged that when the travel of the first-named rotating support brings the ram into operative relation with the ram operating mechanism the travel of the second named rotating support will bring the cam into such operative relation with the ram operating mechanism as to operate the ram in the manner specified.

48. The combination with a furnace, of a continuously moving support, a ram carried thereby, and means for periodically moving said ram into said furnace and back again, said means comprising a stationary support, a slide carried thereby and adapted to be brought in operative relation with the ram, a second rotating support, a cam carried thereby and arranged to be brought periodically in engagement with said slide and to move said slide radially outward and back, thereby operating the ram in the manner specified.

49. The combination with a furnace, of a continuously moving support, a ram carried thereby, and means for periodically moving said ram into said furnace and back again, said means comprising a stationary support about which said rotating support turns, a slide carried thereby and slidable radially of the machine, said slide adapted to be brought in operative engagement with said ram, a second rotating support rotating concentrically with the first named rotating support, and a cam carried thereby in operative engagement with said slide.

50. The combination with a furnace, of a continuously moving support, a ram carried thereby, and means for periodically moving said ram into said furnace and back again, said means comprising a stationary support about which said first-named support rotates, a slide carried thereby and slidable radially thereon and adapted to be brought into operative engagement with said ram, a second rotatable support rotating concentrically with the first named rotatable support, a cam carried thereby and in operative engagement with said slide, all so arranged that when the rotation of the first named rotating support brings the ram into operative engagement with said slide, the rotation of said second-named rotating support will cause said cam to move said slide radially outward and back, thereby operating the ram in the manner specified.

51. The combination with a furnace, of a continuously moving support, a ram carried thereby, and means for periodically moving said ram into said furnace and back again, said means comprising a stationary support about which said rotating support turns, a rotating cam support rotating concentrically with said first-named rotating support and in operative engagement with said slide, a second slide adapted to be locked to said first named slide, said second slide being so located that the ram is brought in operative engagement therewith at one point in the rotation of the first-named rotating support, at which time the rotation of said cam support will cause said cam to actuate said slide so as to operate said ram in the manner described.

52. The combination with a furnace, of a rotating support, gathering mechanism mounted thereon and comprising a ram, means for periodically moving said ram into and out of said furnace, said means comprising a stationary support about which said rotating support turns, a rotating cam support rotating concentrically with said first-named rotating support, a slide carried by said stationary support and slidable radially thereon, a cam carried by said cam support and in operative engagement with said slide, a housing carried by said gathering mechanism, a slide mounted on said housing and slidable thereon radially of the machine and adapted to be brought into operative relation with said first-named slide, and gearing interposed between said last-named slide and said ram, all so arranged that when said first-named slide and said last-named slide are brought into operative relation with each other by the rotation of said first-named rotating support, said cam will move both of said slides radially inward and outward, thereby operating the ram through said gears, so as to cause the ram to move into and back from said furnace, as above specified.

53. The combination with a furnace, of a rotating support, gathering mechanism mounted thereon and comprising a ram, means for periodically moving said ram into and out of said furnace, said means comprising a stationary support about which said rotating support turns, a rotating cam support rotating concentrically with said first named rotating support, a slide carried by said stationary support and slidable radially thereon, a cam carried by said cam support and in operative engagement with said slide, a housing carried by said gathering mechanism, a slide mounted on said housing and slidable thereon radially of the machine and adapted to be brought into operative relation with said first-named slide, a pair of rack bars secured to said last-named slide, a shaft mounted in said housing, a gear-wheel rotatably mounted upon said shaft, pinions secured to said gear-wheel and rotatable upon said shaft and in mesh with said rack bars, and a rack bar on the ram in engagement with said gear-wheel.

54. The combination with a rotatable support, of a ram carriage mounted thereon, a ram slidable on said carriage radially of said support, and means for holding the ram in position, said means comprising a rack bar arranged longitudinally on the ram, a shaft supported on the ram carriage, a gear-wheel upon said shaft and in mesh with said rack bar, a pinion secured to said gear-wheel on said shaft, a slide supported by said ram carriage and slidable thereon radially of said support, a rack bar on said slide and in mesh with said pinion, and a stationary abutment arranged to serve as a stop to limit the radial inward movement of said slide, all so arranged that any radial outward movement of the ram will be transmitted through said rack bars, gear and pinion to said slide, so as to cause said slide to move radially inward until stopped by said stationary abutment.

55. The combination with a rotatable support, of a ram carriage mounted thereon, a ram slidable on said carriage radially of said support, and means for holding the ram in position, said means comprising a rack bar arranged longitudinally on the ram, a shaft supported on the ram carriage, a gear-wheel rotatable upon said shaft and in mesh with said rack bar, a pinion secured to said gear-wheel and rotatable on said shaft, a slide supported by said ram carriage and slidable thereon radially of said support, a rack bar on said slide and in mesh with said pinion, and a stationary abutment arranged to serve as a stop to limit the radial inward movement of said slide, all so arranged that any radial outward movement of the ram will be transmitted through said rack bars, gear and pinion to said slide, so as to cause said slide to move radially inward until stopped by said stationary abutment, said stationary abutment being in the form of an annular shoulder arranged concentrically with said rotatable support.

56. The combination with a rotatable support, of a ram carriage carried thereby, a ram slidable upon said carriage radially of said support, a stationary abutment arranged concentrically with said rotating support, a slide supported by said ram carriage and slidable radially of said support and adapted to engage said stationary abutment, and connections between the ram and said slide whereby a radially outward movement of the ram will cause said slide to move radially inward toward said abutment and a radial outward movement of said slide will cause the ram to move radially inward.

57. The combination with a rotatable support, of a ram carriage carried thereby, a ram slidable upon said carriage radially of said support, a stationary abutment arranged concentrically with said rotatable support, a slide supported by said ram carriage and slidable radially of said support and adapted to engage said stationary abutment, and connections between the ram and said slide whereby a radially outward movement of the ram will cause said slide to move radially inward toward said abutment and a radial outward movement of said slide will cause the ram to move radially inward, said abutment being provided with a slot extending radially inward, means adapted to constitute a continuance of said abutment across said slot, said means being radially movable in said slot and being arranged to periodically engage said slide, and mechanism for periodically reciprocating said slide engaging means in said slot and while in engagement with said slide.

58. The combination with a rotatable support, of a ram carriage supported thereby, a ram movable on said carriage radially of said support, a stationary abutment arranged concentrically with said support and provided with a slot, a slide supported by said ram carriage and slidable thereon radially of said support, connections between said ram and said slide, whereby radial movements of said slide will produce radial movements of the ram, a second slide slidable within said slot in said stationary abutment, said first-named slide being periodically brought into engagement with said second-named slide, and means for periodically reciprocating said second-named slide in said slot when said slides are in operative engagement with each other.

59. The combination with a stationary support of a movable support rotating about said stationary support, a ram carriage mounted on said rotating support, a ram mounted on said carriage and slidable thereon radially of said support, a slide supported by said carriage and slidable thereon radially of said support, connections between said slide and said ram whereby radial movements of said slide will produce radial movements of said ram, a stationary abutment carried by said stationary support and arranged concentrically with said rotating support, means on said slide adapted to abut the periphery of said abutment, said abutment being provided with a radial slot, a second slide slidable within said slot, said first-named slide being periodically brought into operative engagement with said second-named slide by the rotation of said rotatable support, a cam rotating upon a shaft at the axis of the machine and arranged in engagement with said last-named slide, so as to reciprocate said last-named slide in said slot whenever said slides are in operative engagement with each other.

60. The combination with the rotatable support, the ram carriage, the ram, the slide carried by said ram carriage and the gearing between said slide and said ram, of the stationary ram slide support, the ram slide, operative connections between said slides and the rotating cam arranged to periodically reciprocate said ram slide, substantially as set forth.

61. The combination with the rotating support, the ram carriage, the slide thereon and the gearing between said slide and said ram, of the ram dog slide with which the slide on the ram carriage is periodically brought into operative engagement, the ram slide support, ram slide, separable connections between the ram dog slide and ram slide, and the rotatable cam in operative relation with the ram slide, whereby the rotation of the cam periodically reciprocates the ram slide, ram dog slide and slide on the ram carriage, thereby operatively reciprocating the ram.

62. The combination with the stationary support, the rotatable support continuously rotating about said stationary support, the ram dog slide radially slidable upon said stationary support, and the mechanism arranged to be periodically actuated by the radial reciprocation of the ram dog slide, of the ram slide, the ram dog carried by the ram dog slide and adapted to be moved into and out of locking engagement with the ram slide, and the rotating cam in operative engagement with the ram slide, whereby the ram slide is periodically reciprocated radially of the rotating support.

63. The combination with the stationary support, of a slide adapted to be radially reciprocated thereon, a ram dog slide also adapted to be radially reciprocated thereon, a dog mounted upon said ram dog slide and adapted to be moved into and out of locking engagement with the ram slide, of means for locking said dog out of engagement with the ram slide and for throwing said dog back into locking engagement with said ram slide at will.

64. The combination with the stationary support, of a rotatable support, a slide adapted to be radially reciprocated on the stationary support, a ram dog slide also adapted to be radially reciprocated thereon, a dog mounted upon said ram dog slide and adapted to be moved into and out of locking engagement with the ram slide, of means for locking said dog out of engagement with the ram slide and for throwing said dog back into locking engagement with said ram slide at will, and means for preventing the operation of said dog actuating means during a definite part of each complete rotation of said rotatable support.

65. The combination with a stationary central column, of a spider rotating about said column, a ram carried by said spider and radially movable thereon, a ram slide support secured to said central column, mechanism for operating said ram, a rotating cam arranged to actuate said mechanism, and means for controlling the operative connections between said cam and the ram, said means comprising a ram slide radially movable on said ram slide support and in operative engagement with said cam, a ram dog slide radially movable upon said ram slide support and periodically in operative connection with the ram, a dog pivoted on the ram dog slide and adapted to be held in operative engagement with the ram slide, a lever arranged to be operated at will to move said dog out of engagement with the ram slide or to move said dog towards engagement with the ram slide, and connections for actuating said lever.

66. The combination with a stationary central column, of a spider rotating about said column, a ram carried by said spider and radially movable thereon, a ram slide support secured to said central column, mechanism for operating said ram, a rotating cam arranged to actuate said mechanism, and means for controlling the operative connections between said cam and the ram, said means comprising a ram slide radially movable on said ram slide support and in operative engagement with said cam, a ram dog slide radially movable upon said ram slide support and periodically in operative connection with the ram, a dog pivoted on the ram dog slide and adapted to be held in operative engagement with the ram slide, a lever arranged to be operated at will to move said dog out of engagement with the ram slide or to move said dog towards engagement with the ram slide, connections for actuating said lever, and means interposed in the path of one of the arms of said lever to prevent operative movement of said lever during a definite part of each complete rotation of said spider.

67. The combination with a stationary central column, of a spider rotating about said column, a ram carried by said spider and radially movable thereon, a ram slide support secured to said central column, mechanism for operating said ram, a rotating cam arranged to actuate said mechanism, and means for controlling the operative connections between said cam and the ram, said means comprising a ram slide radially movable on said ram slide support and in operative engagement with said cam, a ram dog slide radially movable upon said ram slide support and periodically in operative connection with the ram, a dog pivoted on the ram dog slide and adapted to be held in operative engagement with the ram slide, a three-armed lever arranged to be operated at will to force the dog out of engagement with the ram slide and to lock it out of engagement or to move it back toward its normal position of engagement with the ram slide, connections for operating said lever, and means for preventing the operation of said lever during a certain part of each complete rotation of said rotatable support, said means comprising a device rotating on the axis of the machine and provided with a shoulder in engagement with one of the arms of said lever during a part of each complete rotation of the cam.

68. The combination with a stationary casing containing a vacuum chamber, of means for creating a partial vacuum in said chamber, a movable support provided with a vacuum chamber in communication with the vacuum chamber in said stationary casing and with a supplemental vacuum chamber leading therefrom, gathering mechanism provided with passages in communication with the supplemental vacuum chamber in said movable support, a valve controlling communication between the vacuum chamber in the stationary casing and the vacuum chamber in said movable support, a valve actuating device carried by said movable support and adapted to open said valve, and a cam on said stationary casing, arranged in the path of said valve actuating device, all so arranged that the movement of said movable support will periodically bring said valve actuating device into engagement with said cam, thereby periodically opening said vacuum valve and creating a partial vacuum in the passages in said gathering mechanism, and means for moving said gathering mechanism into a body of molten metal at such times, so that the metal is drawn into the gathering mechanism by the partial vacuum so produced in the gathering mechanism.

69. The combination with a continuously traveling support of gathering mechanism carried thereby, and a traveling cam moving at a different speed from said support and arranged to periodically actuate said gathering mechanism.

70. The combination with a furnace, of a continuously traveling support, gathering mechanism carried thereby, a second support traveling at a different speed from said first support, and means carried by said second support for periodically actuating said gathering mechanism to gather metal from said furnace.

71. The combination with a furnace, of a continuously traveling support, gathering mechanism carried thereby, means for periodically actuating said gathering mechanism to gather metal from said furnace, said means comprising a traveling cam moving at a higher speed than said traveling support.

72. A gathering device comprising a blank mold, sectional neck molds arranged to cooperate with the blank mold to form a supporting rib or neck on the blank, said blank mold being provided with a chamber in communication with the blank-forming chamber of said molds, means for periodically reciprocating said molds forwardly into and backwardly out of a furnace, means for producing a partial vacuum in said chamber when the molds are in the furnace, whereby metal will be drawn into the molds, and means for periodically opening the neck molds to release said rib after the molds have been withdrawn from the furnace and while the blank is sufficiently plastic for blowing.

73. The combination with gathering means, of cut-off means, blank working mechanism, and means for delivering to the working mechanism the sheared end of the blank formed in the gathering means.

74. The combination with gathering means, of cut-off means, blowing mechanism, and means for delivering to the blowing mechanism the sheared end of the blank formed in the gathering means.

75. The combination with gathering means, of cut-off means, blank blowing mechanism, and means for transferring from the gathering means to the blowing mechanism the blank formed in the gathering means, the sheared end of said blank being delivered to and engaged by the blowing mechanism.

76. The combination with gathering means and blank working means, of means for actuating the gathering means to periodically gather a definite quantity of metal to form a blank, means for automatically bringing the gathering means and the working means into alignment with each other and for automatically causing the gathering means to deliver the gathered blank to the working means.

77. The combination with a traveling support, of glass gathering means, working means for receiving a gather of glass from the gathering means, and developing the gather to a desired form, said gathering means and working means being mounted on said support, means for automatically and periodically bringing said gathering means and working means into axial alignment, means for causing the gathering means to deliver the gather to the working means, and means for actuating the working means to receive the gather and develop it to desired form.

78. The combination with means for gathering metal and forming the same into a blank provided with a collar, of means for mechanically working said blank, means for causing the gathering means to automatically deliver the blank to the working means, and means for producing an air tight seal between the blank and the working means.

79. The combination with blank forming means, of means for receiving the blank therefrom and for automatically swinging out the blank.

80. The combination with blank forming means, of means for receiving the blank therefrom and for automatically swinging out the blank under air pressure.

81. The combination with glass gathering and blank forming means, of glass working means arranged to receive the blank so formed, said means comprising mechanism for providing an air tight seal between the blank and said working means and for mechanically producing a recess in the interior of said blank.

82. The combination with glass gathering and blank forming means, of glass working means arranged to receive the blank so formed, said means comprising mechanism for providing an air tight seal between the blank and said working means and for mechanically producing a recess in the interior of said blank and for then supplying successive puffs of air under pressure to the interior of said blank.

83. The combination with glass gathering and blank forming means, of glass working means arranged to receive the blank so formed, said means comprising mechanism for providing an air tight seal between the blank and said working means and for mechanically producing a recess in the interior of said blank and for then supplying successive puffs of air under pressure to the interior of said blank, and for swinging out said blank.

84. The combination with gathering mechanism comprising means for automatically gathering a blank, of a spindle, means for automatically aligning said spindle with said gathering mechanism, means for automatically actuating the gathering mechanism to release the blank, and means for actuating the mechanism carried by the spindle to receive and hold the blank so released.

85. The combination with gathering mechanism adapted to gather metal and to form the same into a blank, of a spindle, means carried thereby adapted to receive the blank from the gathering mechanism, means for swinging said spindle about a horizontal axis, means for automatically aligning said spindle with the blank forming means of said gathering mechanism, means for actuating the gathering mechanism to release the blank, and means for actuating the mechanism carried by the spindle to receive and hold the blank.

86. The combination with gathering mechanism comprising means adapted to gather metal and to form the same into a blank, of a spindle comprising mechanism to receive the blank from the gathering mechanism, means for automatically aligning said spindle and said gathering mechanism with relation to each other, means for moving the spindle longitudinally toward the gathering mechanism to receive the blank, means actuating the gathering mechanism to release the blank, and means actuating the mechanism carried by the spindle to receive and hold the blank when so released by the gathering mechanism.

87. The combination with a movable support, of gathering mechanism carried thereby and comprising separable jaws, of means for closing said jaws, means for actuating the gathering mechanism to gather metal and to form the same into a blank, means for opening the jaws on said gathering mechanism to release the blank so formed, means for providing a blast of cool air, and means for swinging the gathering mechanism upon said support so as to bring the open jaws on said gathering mechanism into said blast of cool air after the blank has been released from the gathering mechanism.

88. In a glass working machine, the combination with means for gathering metal and forming the same into a blank, of means for taking the blank so formed and swinging it out and blowing it, finishing molds, means for closing the finishing molds about the blank when swung out and partially blown, and means for rotating the blank within the closed molds and for blowing it to final form in said molds.

89. In a glass-working machine, the combination of a traveling support, a receptacle for receiving metal, carried thereby, means for arresting the travel of said receptacle without arresting the movement of the support, and for periodically causing the receptacle to travel at a higher speed than said support.

90. In a glass-working machine, the combination with a traveling support of a receptacle for receiving metal, carried thereby, means whereby said receptacle and said support may be caused to periodically travel at differential speeds.

91. In a glass-forming machine, the combination with a traveling support, of a receptacle for receiving metal, and actuating means whereby one of said elements may be caused to travel at a higher speed than the other of said elements.

92. In a glass-working machine, the combination with a traveling support, of a receptacle for receiving metal, and means whereby said support may periodically travel forward with relation to said receptacle and said receptacle may then be caused to travel forward with relation to said support.

93. In a glass-working machine, the combination with a continuously traveling support, of a receptacle carried thereby and arranged to receive metal, and means whereby at regular intervals said support will be caused to travel forward with relation to said receptacle, said receptacle will then be caused to travel forward with relation to said support, and said elements will then continue to travel forward together at a uniform speed.

94. In a glass-working machine, the combination with a traveling support, of means for receiving the glass to be worked, said means being carried by said support, and mechanism whereby said receiving means may be caused to stop without arresting the travel of said support, may be caused to travel in the direction of movement of said support but at a higher speed, and may be caused to travel uniformly with said support.

95. In a glass-working machine, the combination with a continuously rotating support, of means carried thereby and arranged to receive the glass to be worked, mechanism whereby said receiving means will be caused successively to travel at a uniform speed with said support, will be arrested with reference to the movement of said support, will resume rotation at a higher speed than said support, and will again resume rotation at a uniform speed with said support.

96. A glass working machine, comprising a stationary central drum, a rotatable support rotating upon bearings supported by said central drum, a second rotatable support rotatable about said central drum, vertical supports connecting said two rotatable supports and constituting therewith a rotatable frame-work, means for constantly rotating said frame-work, gathering mechanism, a working spindle and molds, carried by said frame-work, means for actuating said gathering mechanism to gather metal from a source of supply and to form the same into a blank, and mechanism actuated by the movement of said frame-work about said central drum to deliver the blank from the gathering mechanism to the working spindle, to blow and develop the blank while carried by the working spindle and to develop the blank in finished form in the mold mechanism.

97. A glass working machine, comprising a stationary central drum, a rotatable support rotating upon bearings supported by said central drum, a second rotatable support rotatable about said central drum, vertical supports connecting said two rotatable supports and constituting therewith a rotatable frame-work, means for constantly rotating said frame-work, gathering mechanism, blank working mechanism carried by said rotatable frame-work, means for actuating the gathering mechanism to gather metal from a source of supply and to form the same into a blank, and means actuated by the movement of said frame-work around the central drum for causing the gathering mechanism to deliver the blank to the working mechanism and for actuating the working mechanism to develop the blank to finished form.

98. The combination with blank forming mechanism of a stationary central drum, a rotatable frame-work, means for continuously rotating said frame-work about said drum, glass-working mechanism carried by said frame-work, and means actuated by the movement of said frame-work about said stationary drum for causing said working mechanism to receive and transfer from said blank forming mechanism a plastic blank and to work the same into finished form.

99. The combination with a central stationary drum, of a frame-work rotatable about said drum, a vertical shaft rotatable within said drum, a cam carried by said shaft, mechanism for continuously rotating said frame-work and said shaft, gathering mechanism carried by said frame-work, means actuated by the rotation of said cam for causing said gathering mechanism to move into and away from a source of metal supply, and means actuated by the rotation of said frame-work about said drum for causing said gathering mechanism to gather metal from said source of supply, form the same into a blank and deliver the blank.

100. The combination with a central drum, of a lower spider rotatable about said drum and containing an air chamber in communication with a source of air under pressure, an upper spider rotatable about said drum and containing an air pressure chamber in communication with a supply of air under pressure and containing a second chamber in communication with means for creating a partial vacuum, hollow uprights connecting said spiders and in communication with the air chamber in the lower spider, air blast pipes in communication with the interior of said uprights, a vertical shaft rotatable within said drum, a cam secured to the upper end of said vertical shaft, means for continuously rotating the framework formed by said spiders and the connecting upright posts and for continuously rotating said cam at a different speed from the speed of rotation of said frame-work, gathering mechanism carried by and rotatable on said upper spider, said gathering mechanism being provided with passages in communication with the vacuum chamber in said upper spider, a valve controlling communication between said vacuum chamber and said passages, mechanism actuated by said cam for moving parts of said gathering mechanism to and from a source of metal supply, mechanism actuated by the rotation of said frame-work about said drum for periodically opening said vacuum controlling valve, so as to cause the gathering mechanism to gather metal from said source of metal supply, other mechanisms actuated by such rotation for causing the gathering mechanism to periodically deliver the blank formed thereon by the gathered metal and for swinging the gathering end of the gathering mechanism into a blast of cooling air from said uprights, a spindle carried by said rotating frame-work, molds carried by said rotating frame-work, and mechanisms actuated by the rotation of said frame-work about said central drum for causing said working mechanism to periodically receive the blank delivered by the gathering mechanism, for actuating said working mechanism to blow said blank and to swing out said blank and for enclosing the blank within said molds and bringing the same to finished form in said molds and for supplying air under pressure to the interior of said blank in controllable quantities.

101. In a glass forming machine, a receptacle, means for charging the receptacle with molten glass from a tank to form a molten blank, a blow-pipe and means for transferring said blank and detachably connecting the blank to the blow pipe.

102. In a glass forming machine, a receptacle, means for charging the receptacle with molten glass from a tank to form a blank, a blow-pipe, means on the blow-pipe for engaging the blank, and means for removing the blank from the receptacle while on the blow-pipe.

103. In a glass forming machine, a receptacle, means for charging the receptacle with molten glass from a tank, a blow-pipe, means for transferring said charge from the receptacle and connecting the charge to the blow-pipe, and means for blowing the charge to form.

104. In a glass forming machine, a receptacle, means for charging the receptacle with a molten glass blank, a blow-pipe, means for transferring the blank to the blow-pipe, and means for making an initial blow opening in the blank after its engagement with the blow-pipe.

105. In a glass shaping machine, a receptacle, means for charging the receptacle with a molten glass blank, a blow-pipe, means on the blow-pipe for engaging one end of the blank only, leaving the body free, means for transferring the blank to the blow-pipe and means after the transfer for making an initial blow opening in the blank.

106. In a glass forming machine, the combination of a receptacle, means for charging the receptacle with molten glass from a mass, a cut-off operating across the fill-opening of the receptacle, a blowing device, means on the blowing device for engaging the cut-off end of the blank only, leaving the body free, and means for blowing the blank.

107. In a glass working machine, the combination with a support provided with a plurality of chambers, of means for providing differential air pressures in said chambers, a second support movable upon said first support, said second support being provided with corresponding air chambers in communication with said first named air chambers respectively, lines of packing arranged in pairs between said supports and between said chambers, the structure being provided with one or more chambers between said lines of packing and with ports leading from said last-named chambers to a point of discharge, and glass working means in operative communication with said air chambers.

108. The combination with a support provided with a plurality of air chambers and with ports leading from said air chambers respectively, of means for providing differential pressures in said air chambers, a spider rotatable upon said support and provided with corresponding air chambers and with ports leading therefrom to the first named ports respectively, means for rotating said spider upon said support, annular lines of packing arranged in pairs between said chambers and between said support and said spider, the structure being provided with an annular chamber interposed between said lines of packing and at the joint between the spider and the supports, and with a port leading from said last named chamber to a point of discharge, all combined with automatic glass working mechanism in operative communication with said air chambers in the spider.

109. The combination with a support provided with a vacuum chamber and with a supplemental vacuum chamber in communication therewith, of a valve for controlling communication between said vacuum chambers, means for opening and closing said communication at timed intervals, a ram carriage mounted upon said support and movable thereon about the axis of said support, said ram carriage being provided with a transverse chamber and said support being provided with a port leading from the supplemental vacuum chamber to said transverse chamber, a ram mounted upon said ram carriage and movable thereon radially of said support, said ram having a chamber communicating with said groove in the ram carriage, and glass gathering mechanism carried by the ram and in operating communication with said chamber in the ram, substantially as described.

110. The combination with a support provided with a vacuum chamber and provided also with an auxiliary chamber in communication with said vacuum chamber, of a valve controlling communication between said chamber, glass-gathering mechanism carried by said support and provided with passageways adapted to be brought into and out of communication with said auxiliary chamber, of means for controlling communication between said vacuum chamber and said auxiliary chamber, means for periodically actuating said valve, and means for periodically bringing the passages in said gathering mechanism into communication with said auxiliary chamber.

111. The combination with a stationary support, of a moving support mounted thereon and provided with a vacuum chamber and with an auxiliary chamber in communication with said vacuum chamber, of glass-gathering mechanism carried by said moving support and provided with passageways adapted to be brought into communication with said auxiliary chamber, of a valve arranged to control communication between said vacuum chamber and said auxiliary chamber, means for bringing the passages in said gathering mechanism into and out of communication with said auxiliary chamber, and means for periodically actuating said valve, said means being operated by the relative movement between said traveling member and said stationary member.

112. The combination with a tank or holder for molten glass, of a machine for the manufacture of glass articles, comprising, a blowing mechanism, means adapted to project into the tank, gather and bring to the blowing mechanism a charge of glass, and means for shaping that charge into a blank and blowing the blank.

113. The combination with a tank or holder for molten glass, of a machine for making glass articles, comprising a blowing head, means adapted to project into the tank, gather a charge of glass, and deliver the charge into operative relation to the means for blowing head, and blowing the charge.

114. In combination with a tank or holder for molten glass, a machine for the manufacture of glass articles, comprising a blowing head, means adapted to project into the tank, gather and bring a charge of glass into proximity to the blowing head, means for transferring the charge to the blowing head and for making an initial blow opening in the charge, and means for blowing the charge to desired form.

115. The combination with a tank or holder for molten glass, of a machine for making glass articles comprising means for gathering a definite quantity of glass from the tank, means for subsequently shaping that gather into a blowing blank, and for blowing the blank.

116. The combination with a tank or holder for molten glass, of a machine for making glass articles comprising means for gathering a definite quantity of glass from the tank and means for subsequently making an initial blow-opening in the gather.

117. The combination with a tank or holder for molten glass, of a machine for making glass articles comprising means for gathering a definite quantity of glass from the tank, means for subsequently shaping that gather into a blowing blank, means for blowing the blank, and means for transferring the gathered body of glass from the gathering means to the blowing means.

118. The combination with a tank or holder for molten glass, of a machine for making glass articles comprising means for gathering a definite quantity of glass from the tank, means for subsequently making an initial blow opening in the gathered body of glass, and means for transferring the gather from said first named means to said second named means.

119. The combination with a tank or holder for molten glass, of a machine for gathering and shaping glass comprising a traveling glass shaping mechanism and a gathering device traveling therewith adapted to gather a definite charge of glass from the mass, and means for causing the discharge of the gathered glass from the gathering device to the shaping mechanism.

120. The combination of a moving support, of a gathering mechanism carried thereby and movable thereon and adapted to collect a gather of glass at one end thereof, of means for automatically arresting the travel of the gathering end of such gathering mechanism in respect to such support to effect a gather of glass without retarding the movement of said support.

121. The combination with a moving support, of a gathering mechanism carried thereby and movable thereon, of means for automatically arresting the travel of the gathering mechanism in respect to such support to effect a gather of glass without retarding the movement of said support.

122. The combination with a moving support, of a plurality of gathering mechanisms carried thereby and movable thereon, and means for automatically arresting the travel of each gathering mechanism with said support and independently of the other gathering mechanisms, without arresting the movement of said support.

123. The combination with a moving support, of a plurality of gathering mechanisms carried thereby and movable thereon, of automatic means for periodically and independently arresting the movement of each gathering mechanism independently of the other gathering mechanisms, during the continuance of the movement of the support.

124. In a glass-shaping machine, a traveling support, a plurality of metal-receiving devices carried thereby, and means for periodically arresting the travel of each receiving device, independently of the other metal-receiving devices without arresting the movement of the support.

125. A traveling gathering device, a holder for the gather traveling therewith, means for causing the gathering device to move to and from a mass of molten glass, to gather glass from the mass, and means for causing the gathering device to discharge into the holder during the further travel of the two together.

126. A traveling gathering device, a constantly traveling holder for the gather normally traveling with the gathering device, means for causing the gathering device to move to and from a mass of molten glass independently of the holder, to gather glass from the mass, and means for causing the gathering device to discharge into the holder during the further travel of the two together.

AUGUST KADOW.

Witnesses:
JOHN W. KIMBALL,
J. D. ROBINSON.